US010652588B2

(12) United States Patent
Kerofsky et al.

(10) Patent No.: US 10,652,588 B2
(45) Date of Patent: May 12, 2020

(54) INVERSE RESHAPING FOR HIGH DYNAMIC RANGE VIDEO CODING

(71) Applicant: Vid Scale, Inc., Wilmington, DE (US)

(72) Inventors: Louis Kerofsky, San Diego, CA (US); Yuwen He, San Diego, CA (US); Yan Ye, San Diego, CA (US); Arash Vosoughi, San Jose, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 15/761,425

(22) PCT Filed: Sep. 21, 2016

(86) PCT No.: PCT/US2016/052890
§ 371 (c)(1),
(2) Date: Mar. 19, 2018

(87) PCT Pub. No.: WO2017/053432
PCT Pub. Date: Mar. 30, 2017

(65) Prior Publication Data
US 2018/0278967 A1 Sep. 27, 2018

Related U.S. Application Data

(60) Provisional application No. 62/221,585, filed on Sep. 21, 2015, provisional application No. 62/233,422, (Continued)

(51) Int. Cl.
*H04N 19/186* (2014.01)
*H04N 19/98* (2014.01)
(Continued)

(52) U.S. Cl.
CPC ............ *H04N 19/98* (2014.11); *G06T 5/009* (2013.01); *H04N 19/186* (2014.11); *H04N 19/70* (2014.11)

(58) Field of Classification Search
CPC ...... H04N 19/98; H04N 19/186; H04N 19/70; G06T 5/009
(Continued)

(56) References Cited

U.S. PATENT DOCUMENTS

2016/0134872 A1 5/2016 Su et al.

FOREIGN PATENT DOCUMENTS

WO WO 2015/123067 A1 8/2015

OTHER PUBLICATIONS

"Optimizing a Tone Curve for Backward-Compatible High Dynamic Range Image and Video Compression" Mai et al., IEEE Transactions on Image Processing, vol. 20, No. 6, Jun. 2011 (Year: 2011).*
(Continued)

*Primary Examiner* — Christopher S Kelley
*Assistant Examiner* — Asmamaw G Tarko
(74) *Attorney, Agent, or Firm* — Condo Roccia Koptiw LLP

(57) ABSTRACT

Systems, methods, and instrumentalities are disclosed for inverse shaping for high dynamic range (HDR) video coding. A video coding device, e.g., such as a decoder, may determine a plurality of pivot points associated with a plurality of piecewise segments of an inverse reshaping model. The plurality of pivot points may be determined based on an indication received via a message. Each piecewise segment may be defined by a plurality of coefficients. The video coding device may receive an indication of a first subset of coefficients associated with the plurality of piecewise segments. The video coding device may calculate a second subset of coefficients based on the first subset of
(Continued)

coefficients and the plurality of pivot points. The video coding device may generate an inverse reshaping model using one or more of the plurality of pivot points, the first subset of coefficients, and the second subset of coefficients.

20 Claims, 15 Drawing Sheets

Related U.S. Application Data filed on Sep. 27, 2015, provisional application No. 62/242,761, filed on Oct. 16, 2015, provisional application No. 62/248,242, filed on Oct. 29, 2015.

(51) Int. Cl.
  *G06T 5/00* (2006.01)
  *H04N 19/70* (2014.01)
(58) Field of Classification Search
  USPC .................................................. 375/240.26
  See application file for complete search history.

(56) References Cited

OTHER PUBLICATIONS

"Near constant-time optimal piecewise LDR to HDR inverse tone mapping," Chen et al., Proc. SPIE 9404, Digital Photography XI, 94040O (Feb. 27, 2015); doi: 10.1117/12.2080389 Event: SPIE/IS&T Electronic Imaging, 2015, San Francisco, California, United (Year: 2015).*
Barsky et al., "Geometric Continuity of Parametrics Curves: Constructions of Geometrically Continuous Splines", IEEE Computer Graphics & Applications, Jan. 1990, pp. 60-68.
Baylon et al., "Response to Call for Evidence for HDR and WCG Video Coding: Arris, Dolby and InterDigital", Arris Inc., Dolby Laboratories Inc. and Inter Digital Communications, LLC, ISO/IEC JTC1/SC29/WG 11 MPEG2015/M36264, Warsaw, Poland, Jun. 2015, 9 pages.
Baylon et al., "Test Model Draft for HDR Reshaping and Adaptation", ISO/IEC JTC1/SC29/WG11 MPEG2015/m37332, Geneva, CH, Oct. 2015, 14 pages.
Bordes et al., "AHG14: Color Gamut Scalable Video Coding Using 3D LUT", Document No. JCTVC-M0197, Technicolor, Joint Collaborative Team on Video Coding (JCT-VC) of ITU-T SG 16 WP 3 and ISO/IEC JTC1/SC 29/WG11, 13th Meeting: Incheon, KR, Apr. 18-26, 2013, 10 pages.
Boyce et al., "Draft High Efficiency Video Coding (HEVC) Version 2, Combined Format Range Extensions (RExt), Scalability (SHVC), and Multi-View (MV-HEVC) Extensions", Document No. JCTVC-R1013_v1, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, 382 pages.
Chen et al., "Near Constant-Time Optimal Piecewise LDR to HDR Inverse Tone Mapping", Proceedings of SPIE-IS&T vol. 9404, Feb. 2015, 11 pages.
SMPTE, "Derivation of Basic Television Color Equations", RP 177-1993 Reaffirmed 2002, Society of Motion Picture and Television Engineers, NY, US, Nov. 1, 1993, 5 pages.
Ebrahimi et al., "Description of Subjective Evaluation for Evidence (CfE) for HDR and WCG Video Coding", AHG on HDR and WCG, ISO/IEC JTC1/SC29/WG11 MPEG2014/M35481, Geneva, Switzerland, Feb. 2015, 3 pages.
EXR, "OpenEXR", Available on internet http://www.openexr.com/, retrieved on Oct. 9, 2017, 9 pages.
Ferwerda, James A., "Elements of Early Vision for Computer Graphics", IEEE Computer Graphics and Applications, vol. 21, No. 5, Oct. 2001, pp. 22-33.
Fogg, Chad, "Output Code Map SEI", Motion Picture Laboratories Inc., Document: JCTVC-T0102, Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, pp. 1-4.
Francois et al., "Core Experiment 2 on HDR Reconstruction Approaches", Video Subgroup, ISO/IEC JTC1/SC29/WG11 N15456, Warsaw, PL, Jun. 2015, 13 pages.
Francois et al., "Interim Report on the Anchors Generation in View of the CfE for HDR/WCG Video Coding", Technicolor, Dolby, Arris, B-Com, ETRI, Qualcomm, Samsung, Sony, Sharp, ISO/IEC JTC1/SC29/WG11 MPEG2014/M35467, Geneva, Switzerland, Feb. 2015, 6 pages.
Goris et al., "Parameter Based Compatible HDR Proposal", Philips, ISO/IEC JTC1/SC29/WG11 MPEG2014/M35067, Strasbourg, France, Oct. 2014, 4 pages.
Goris et al., "Philips Response to CfE for HDR and WCG", Philips, ISO/IEC JTC1/SC29/WG11 MPEG2015/M36266, Warsaw, Poland, Jul. 2015, 16 pages.
ISO/IEC, "Information Technology—Coding of Audio-Visual Objects—Part 2: Visual", ISO/IEC 14496-2, Dec. 1, 2001, 536 pages.
ISO/IEC, "Information Technology—Coding of Moving Pictures and Associated Audio for Digital Storage Media at Up to About 1.5 Mbit/s—Part 2: Video", ISO/IEC 11172-2:1993,Technical Corrigendum 3, Nov. 1, 2003, 6 pages.
ISO/IES, "Information Technology—Generic Coding of Moving Pictures and Associated Audio Information: Video", ISO/IEC 13818-2, Dec. 15, 2000, 220 pages.
ITU, "Codec for Audiovisual Services AT n×384 kbit/s", H.261, Series H: Audiovisual and Multimedia Systems: Coding of Moving Video, Nov. 1988, 14 pages.
ITU-R, "Parameter Values for the HDTV Standards for Production and International Programme Exchange", ITU-R BT.709-6, Jun. 2015, 19 pages.
ITU-R, "Parameter Values for Ultra-High Definition Television Systems for Production and International Programme Exchange", ITU-R BT.2020, Aug. 2012, 7 pages.
ITU-R, "Reference Electro-Optical Transfer Function for Flat Panel Displays Used in HDTV Studio Production", Recommendation ITU-R BT.1886, BT Series, Broadcasting Service (Television), Mar. 2011, 7 pages.
ITU-T, "Advanced Video Coding for Generic Audiovisual Services", Series H: Audiovisual and Multimedia Systems: Infrastructure of Audiovisual Services—Coding of Moving Video, ITU-T Rec H.264 and ISO/IEC/MPEG 4 part 10, Nov. 2007, 564 pages.
ITU-T, "Video Coding for Low Bit Rate Communication", Series H: Audiovisual and Multimedia Systems: Infrastructure of Audiovisual Services—Coding of Moving Video, H.263, Jan. 2005, 226 pages.
Kochanek et al., "Interpolating Splines with Local Tension, Continuity, and Bias Control", Computer Graphics and Interactive Techniques, vol. 18, No. 3, Jul. 1984, pp. 33-41.
Laksono, Indra, "Hardware Implementation of HDR Video Decoding and Display System", ViXS Systems, ISO/IEC JTC1/SC29/WG11 MPEG2015/M36162, Geneva, Switzerland, Feb. 2015, 6 pages.
Lasserre et al., "Technicolor's Response to CfE for HDR and WCG (Category 1)—Single Layer HDR Video Coding with SDR Backward Compatibility", Technicolor, ISO/IEC JTC1/SC29/WG11 MPEG2014/ M36263r1, Warsaw, Poland, Jun. 2015, 21 pages.
Léannec et al., "Modulation Channel Information SEI Message", Technicolor, Document: JCTVC-R0139r2, M33776, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-13.
Léannec et al., "Usage of Modulation Channel for High Bit-Depth and Floating Point Signal Encoding", Technicolor, Document: JCTVC-R0267, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-12.
Lee et al., "CE2-related: Report of LumaATF with Luma-Driven Chroma Scaling (LCS)", ISO/IEC JTC1/SC29/WG11 MPEG2015/m37245, Geneva, CH, Oct. 2015, 6 pages.
Luthra et al., "Call for 1000 and 4000 nits Peak Brightness test material for HDR and WCG Video Coding", ISO/IEC JTC1/SC29/WG11 MPEG2014/N15099, Geneva, Switzerland, Feb. 2015, 2 pages.

(56) References Cited

OTHER PUBLICATIONS

Luthra et al., "Call for Evidence (CfE) for HDR and WCG Video Coding", ISO/IEC JTC1/SC29/WG11 MPEG2014/N15083, Geneva, Switzerland, Feb. 2015, 46 pages.

Luthra et al., "Requirements and Use Cases for HDR and WCG Content Coding", ISO/IEC JTC1/SC29/WG11 MPEG2014/N15084, Geneva, Switzerland, Feb. 2015, 13 pages.

Luthra et al., "Use Cases of the Scalable Enhancement of HEVC", WG11 Requirements and Video, ISO/IEC JTC1/SC29/WG11 N12955, Stockholm, Sweden, Jul. 2012, 8 pages.

Mai et al., "Optimizing a Tone Curve for Backward-Compatible High Dynamic Range Image and Video Compression", IEEE Transactions on Image Processing, vol. 20, No. 6, Jun. 2011, 14 pages.

Mantiuk et al., "HDR-VDP-2: A Calibrated Visual Metric for Visibility and Quality Predictions in All Luminance Conditions", ACM Transactions on Graphics (TOG)—Proceedings of ACM SIGGRAPH 2011, vol. 30, No. 4, Jul. 2011, 13 pages.

Minoo et al., "Description of the Reshaper Parameters Derivation Process in ETM Reference Software", Arris, Dolby, InterDigital, Qualcomm, Technicolor, JCTVC-W0031, 23rd Meeting: San Diego, USA, Feb. 19-26, 2016, 17 pages.

Hanhart et al., "HDR CfE Subjective Evaluations at EPFL", M36168, Warsaw, Poland, Jun. 2015, 10 pages.

Rusanovskyy et al., "Report on CE2.1.3 Test: Single-Layer HDR Video Coding Based on m36256", Document: ISO/IEC JTC1/SC29/WG11 MPEG2015/M37064, 113th MPEG Meeting, Geneva, CH, Oct. 2015, 13 pages.

Segall et al., "New Results with the Tone Mapping SEI Message", Sharp Labs of America, JVT-U041, 21st Meeting: Hangzhou, China, Oct. 20-27, 2006, 8 pages.

Sharma et al., "The CIEDE2000 Color-Difference Formula: Implementation Notes, Supplementary Test Data, and Mathematical Observations", Color Research & Applications (Wiley Interscience), vol. 30, No. 1, Feb. 2005, pp. 21-30.

Sheikh, Hamid Rahim, "Image Information and Visual Quality", IEEE Transactions on Image Processing, vol. 15, No. 2, Feb. 2006, pp. 430-444.

Smolic, Aljosa, "Informative Input on Temporally Coherent Local Tone Mapping of HDR Video", Disney Research Zurich, ISO/IEC JTC1/SC29/WG11 MPEG2014/M35479, Geneva, Switzerland, Feb. 2015, 1 page.

SMPTE, "High Dynamic Range Electro-Optical Transfer Function of Mastering Reference Displays", SMPTE ST 2084, Aug. 16, 2014, pp. 1-14.

SMPTE, "Mastering Display Color Volume Metadata Supporting High Luminance and Wide Color Gamut Images", SMPTE ST 2086, Oct. 13, 2014, pp. 1-6.

Stessen et al., "Chromaticity Based Color Signals", Philips, ISO/IEC JTC1/SC29/WG11 MPEG2014/M34335, Sapporo, Japan, Jul. 2014, 16 pages.

Tourapis et al., "Exploration Experiment 3 on Objective Test Methods for HDR and WCG Video Coding Evaluation", ISO/IEC JTC1/SC29/WG11 MPEG2014/M35478, Geneva, Switzerland, Feb. 2015, 5 pages.

Tourapis et al., "HDRTools: Software Updates", Apple Inc., ISO/IEC JTC1/SC29/WG11 MPEG2014/M35471, MPEG HDR/WCG AHG Meeting, Lausanne, Switzerland, Dec. 2014, 2 pages.

Wikipedia, "Half-Precision Floating-Point Format", Available online at https://en.wikipedia.org/wiki/Half-precision_floating-point_format , retrieved on Oct. 12, 2017, 5 pages.

Yin et al., "Candidate Test Model for HDR extension of HEVC", Dolby Laboratories Inc. and InterDigital Communications, LLC, ISO/IEC JTC1/SC29/WG11 MPEG2014/ m37269, Geneva, CH, Oct. 2015, 6 pages.

Yin et al., "Comments on Reshaping for HDR/WCG Compression", ISO/IEC JTC1/SC29/WG11 MPEG2015/m37267, Geneva, CH, Oct. 2015, 6 pages.

* cited by examiner

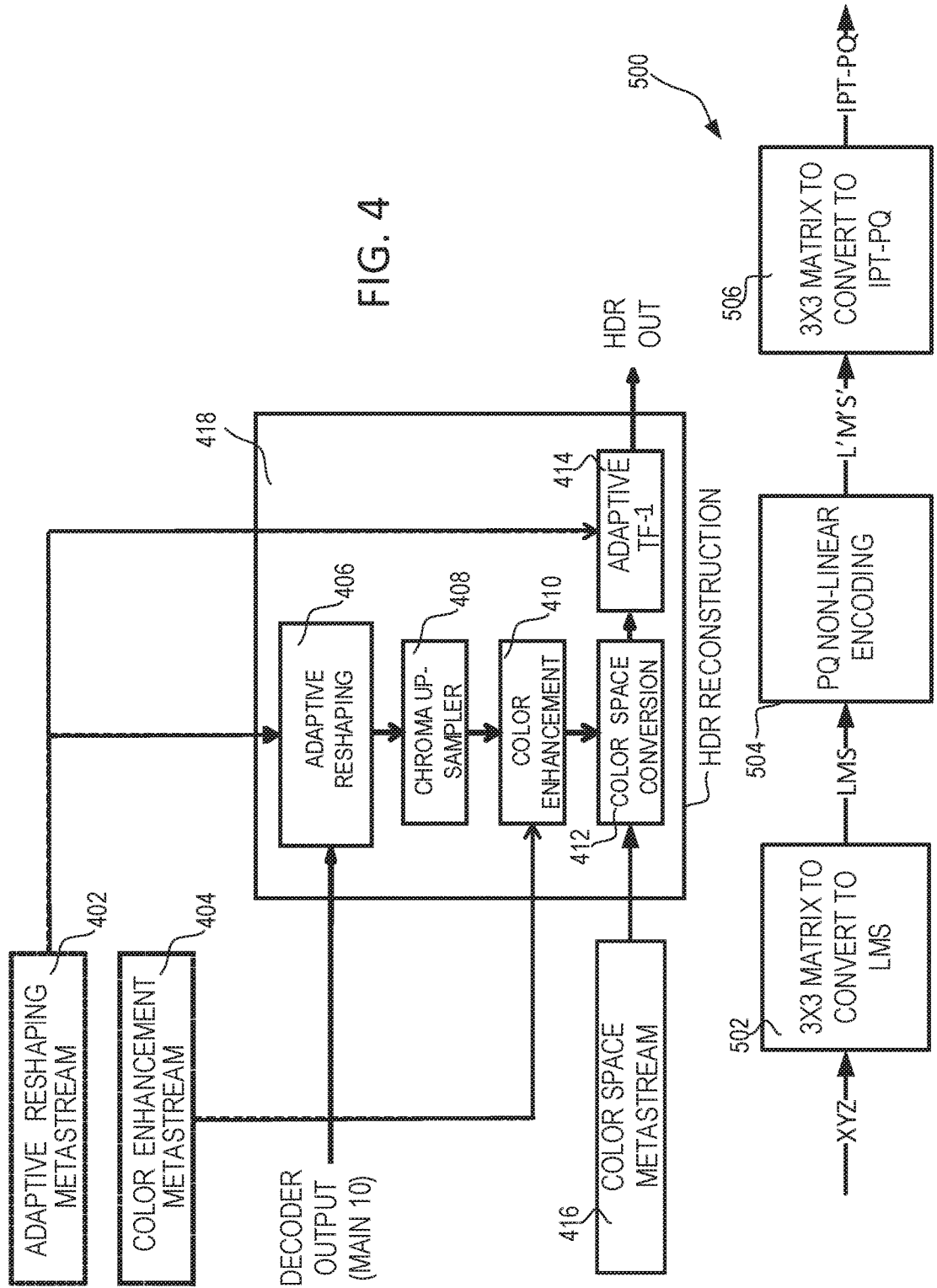

INVERSE RESHAPING FOR HIGH DYNAMIC RANGE VIDEO CODING

CROSS-REFERENCE TO RELATED APPLICATIONS

This application is the National Stage Entry under 35 U.S.C. § 371 of Patent Cooperation Treaty Application No. PCT/US2016/052890, filed Sep. 21, 2016, which claims priority to U.S. provisional patent application Nos. 62/221,585, filed Sep. 21, 2015, 62/233,422, filed Sep. 27, 2015, 62/242,761, filed Oct. 16, 2015, and 62/248,242, filed Oct. 29, 2015, which are incorporated herein by reference in their entireties.

BACKGROUND

A variety of digital video compression technologies enable efficient digital video communication, distribution and consumption. Some examples of standardized video compression technologies are H.261, MPEG-1, MPEG-2, H.263, MPEG-4 part2 and H.264/MPEG-4 part 10 AVC. Advanced video compression technologies, such as High Efficiency Video Coding (HEVC), may provide twice the compression or half the bit rate at the same video quality compared to H.264/AVC.

SUMMARY

Systems, methods, and instrumentalities are disclosed for inverse shaping for high dynamic range (HDR) video coding. A video coding device, e.g., such as a decoder, may determine pivot points associated with piecewise segments of an inverse reshaping model. The pivot points may be determined based on an indication received via a message. The pivot points may be evenly spaced on the inverse reshaping model. Each piecewise segment may be defined by one or more coefficients. The piecewise segments may be quadratic segments. Each piecewise quadratic segment may be defined by a constant coefficient, a slope coefficient, and a curvature coefficient. The video coding device may receive an indication of a first subset of coefficients associated with the piecewise segments. The first subset of coefficients may include a first slope coefficient and one or more constant coefficients. The first subset of coefficients and/or the pivot points may be received via a look-up table (LUT).

The video coding device may calculate a second subset of coefficients based on the first subset of coefficients and the pivot points. The second subset of coefficients may be calculated using a continuity relation based on a left hand endpoint of the piecewise segments. The second subset of coefficients may be associated with the piecewise segments. The second subset of coefficients may include one or more slope coefficients and one or more curvature coefficients. The video coding device may generate an inverse reshaping model using one or more pivot points, the first subset of coefficients, and the second subset of coefficients. The video coding device may apply inverse reshaping to an HDR video using the inverse reshaping model. The video coding device may receive an indication that a first piecewise segment is flat, e.g., has no slope and/or no curvature. The video coding device may modify a first constant coefficient of the first piecewise segment of the inverse reshaping model to a value signaled for a second constant coefficient of a second piecewise segment of the inverse reshaping model. The video coding device may set a first slope coefficient and a first curvature coefficient associated with the first piecewise segment to zero.

BRIEF DESCRIPTION OF THE DRAWINGS

FIG. 4 shows an example of a post-processing HDR reconstruction process.
FIG. 5 shows an example of XYZ to IPT-PQ conversion.

DETAILED DESCRIPTION

Figure 1:
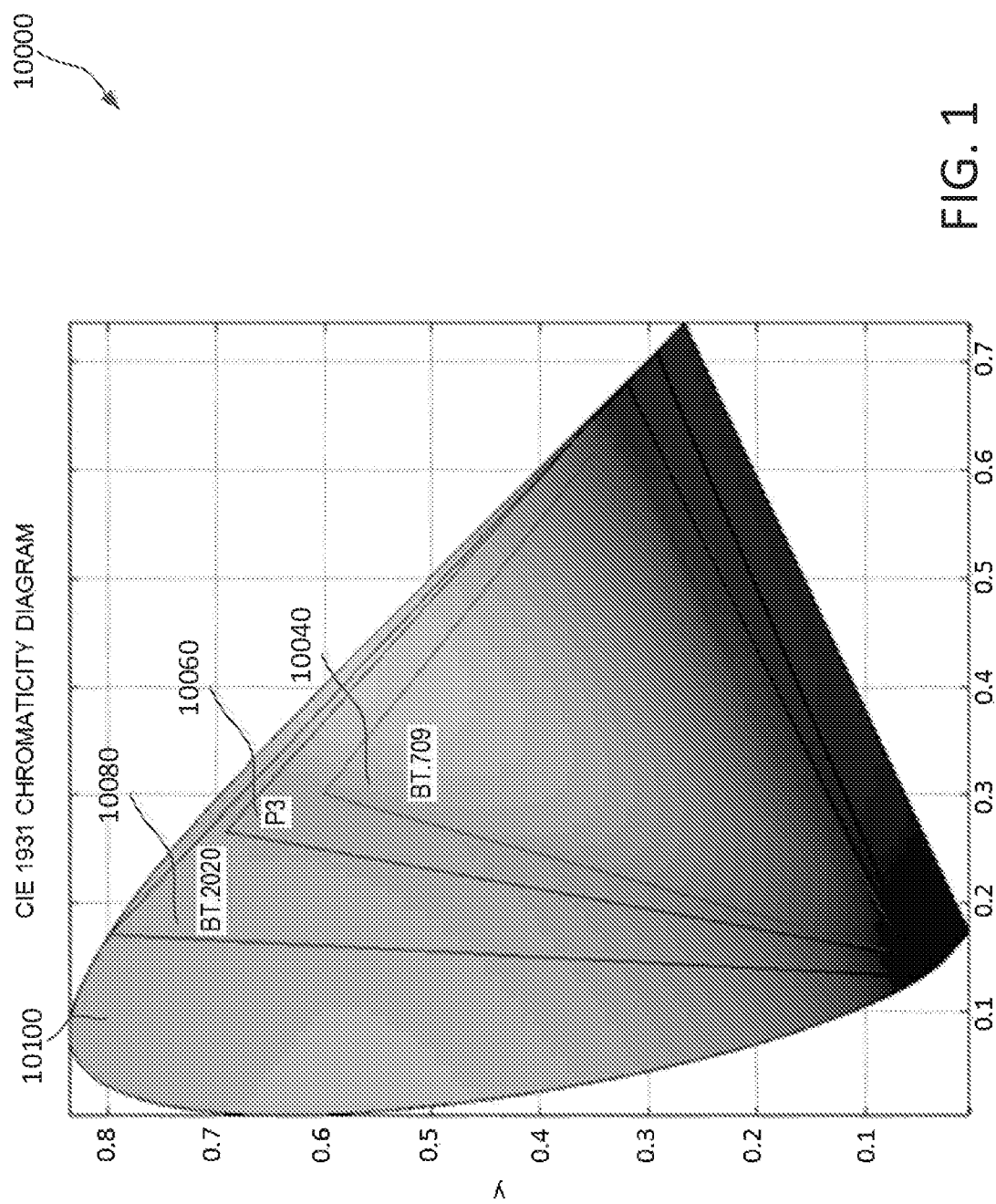
FIG. 1 shows an example comparison of UHDTV, HDTV and P3 (DC) color primaries in CIE space.

A detailed description of illustrative embodiments will now be described with reference to the various figures. Although this description provides a detailed example of possible implementations, it should be noted that the details are intended to be exemplary and in no way limit the scope of the application.

Digital video services may comprise, for example, TV services over satellite, cable, and/or terrestrial broadcasting channels. Mobile devices, e.g., smart phones and tablets, may run video applications, e.g., video chat, mobile video recording and sharing, and video streaming. Videos may be transmitted in heterogeneous environments, e.g., over the Internet. Transmission scenarios known as 3-screen and N-screen contemplate video consumption on devices (e.g., personal computers (PCs), smart phones, tablets, TVs) with varying capabilities (e.g., computing power, memory/storage size, display resolution, display frame rate, display color gamut, and/or the like). Network and transmission channels may have varying characteristics (e.g., packet loss rate, available channel bandwidth, burst error rate, and/or the like). Video data may be transmitted over a combination of wired networks and wireless networks, which may complicate underlying transmission channel characteristics. Scalable video coding may improve the quality of experience for video applications running on devices with different capabilities over heterogeneous networks. Scalable video coding may encode a signal at a high representation (e.g., in terms of temporal resolution, spatial resolution, and quality) and may permit decoding subsets of video streams dependent on rates and/or representations that are utilized by applications running on various client devices. Scalable video coding may save backbone network bandwidth and/or storage relative to non-scalable solutions. Video standards, e.g., MPEG-2 video, H.263, MPEG4 video, and H.264, may provide tools and/or profiles that support modes of scalability.

Table 1 compares example video format definitions for high definition TV (HDTV) video formats and Ultra High Definition TV (UHDTV) applications. As shown in Table 1, UHDTV may support larger spatial resolution (e.g., 4K×2K (3840×2160) and 8K×4K (7680×4320) resolutions), higher frame-rate (e.g., 120 Hz), higher sample bit depth (e.g., 10 bits or 12 bits) and wider color gamut than HDTV does. A video signal of higher fidelity provided by UHDTV may improve viewer experience. P3 color gamut may be used in digital cinema applications. ITU-R in Table 1 stands for international telecommunication union (ITU) radio communication sector (ITU-R).

TABLE 1 comparison of example HDTV and UHDTV technical specifications

|  |  | High Definition | Ultra High Definition |
|---|---|---|---|
| ITU-R BT series | | BT.709-5 (part 2) | BT.2020 |
| Spatial resolution | | 1920 × 1080 | 7680 × 4320, 3840 × 2160 |
| Temporal | Frame rate | 60, 50, 30, 25, 24 | 120, 60, 50, 30, 25, 24 |
| | Scan | Progressive, interlaced | Progressive |
| Primary colors | Red primary | (0.640, 0.300) | (0.708, 0.292) |
| | Green primary | (0.150, 0.330) | (0.170, 0.797) |
| | Blue primary | (0.600, 0.060) | (0.131, 0.046) |
| | White point | (0.3127, 0.3290) (D65) | |
| | Coding format | 8- and 10-bit | 10- and 12-bit |

FIG. 1 shows an example comparison of UHDTV, HDTV and P3 (DC) color primaries in CIE space. In FIG. 1, the HD color gamut 10040 is shown as the inner triangle, the UHD color gamut 10080 is shown as the outer triangle, and the P3 color gamut 10060 is shown as the middle triangle overlaid with the CIE 1931 color space chromaticity diagram 10100 shown as a horseshoe shape. The horseshoe shape represents a range of colors visible to human eyes. The HD color gamut and the UHD color gamut cover approximately 36% and 76% of the CIE 1931 color space, respectively. A color volume that is reproduced on a UHD display may significantly increase the volume of reproducible colors such that more vivid, richer colors may be provided on the UHD display than color volume that may be reproduced on an HD display.

Viewing experience, e.g., in consumer electronics, may improve as video technology improves. Video technology improvements may include, for example, spatial resolution improvements from HD to UHD, frame rate improvements from 60 Hz to 100/120 Hz, stereoscopic/multi-view viewing experience, a wider color gamut, and high dynamic range (HDR). An HDR video parameter may be defined as a ratio between the minimum and maximum luminance perceived or captured in a real scene or a rendering device. HDR may be measured in terms of "f-stop" (or "f-number"), where one f-stop corresponds to a doubling of signal dynamic range. Luminance may be measured in candela (cd) per $m^2$ (e.g., nits). As an example, in natural scenes, sunlight may be approximately $6 \times 10^8$ nits, and blue sky in the morning may be 4600 nits while night sky may be 0.005 nits or lower, which amounts to a dynamic range of approximately 100 million (e.g., 37 f-stops). In a room, the sky visible through a window may be approximately 10,000 nits, a human face may be 50 nits, and a dark surface may be approximately 1 nit. Human vision may adapt to capture light below starlight or above sunlight, which corresponds to lighting conditions that vary by nearly 10 orders of magnitude. A consumer display may support 100 nits peak luminance, which is lower than the dynamic range of natural scenes that may be perceived by human vision.

Video distribution environments that provide SDR contents may support a range of brightness from 0.1 to a few hundred nits, leading to a dynamic range less than 10 f-stops. Studies have shown that HDR displays (e.g., with a peak luminance of 1000 to 4000 nits) may provide significant perceptual quality benefits comparing to SDR displays. HDR and WCG may expand the limits of artistic intent expression. Some cameras (e.g., Red Epic Dragon, Sony F55/F65, ARRI Alexa XT) may be able to capture HDR video (e.g., to 14 f-stops).

An interoperable HDR/WCG service delivery chain, including capturing, preprocessing, compression, post-processing and display, may support video delivery. In MPEG HDR and WCG content distribution and storage, HDR may correspond to more than 16 f-stops. Levels between 10 and 16 f-stops may be considered as intermediate or extended dynamic range, which is a range that is significantly smaller than the range encountered in real life. Levels between 10 and 16 f-stops are far from the capabilities of the human vision system. HDR videos may offer a wider dynamic range closer to the capacities of human vision. Native (uncompressed, raw) test sequences may, for example, cover HD and P3 color gamuts, may be stored in HD and UHD containers, and may have a file format of EXR or TIFF.

Figure 2:
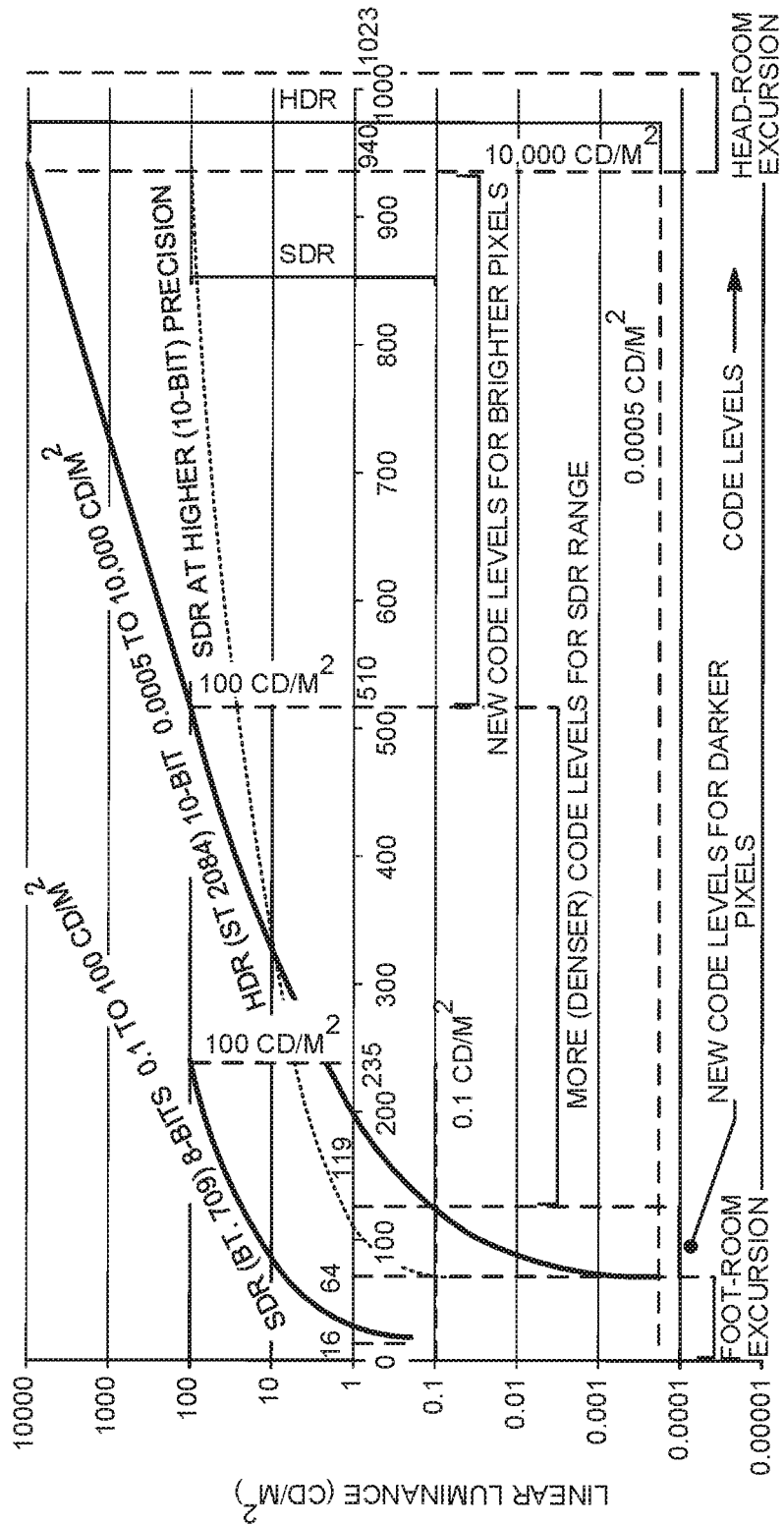
FIG. 2 shows an example mapping of linear light values for SDR and HDR representations.

FIG. 2 shows an example mapping of linear light values for SDR and HDR representations. A peak luminance of a test sequence may be approximately 4000 nits. An example of a transfer function (TF) that may be used to convert a linear signal to a non-linear signal for compression may be a perceptual quantizer (PQ) as shown in FIG. 2, for example in comparison to a gamma function.

Objective quality evaluation for HDR compression may be more complex than SDR. There may be many different types of distortion in HDR compressed videos, such as color bleeding and color banding, in addition to blurring, blocking, and ringing artifacts. Artifacts may be more visible with a bright background. The following metrics may be considered for objective quality evaluation in HDR and WCG: peak signal to noise ratio (PSNR) in XYZ with the transfer function referred as tPSNR, PSNR evaluation in linear RGB (e.g., with gamma equal to 2.2) referred as mPSNR, PSNR of the mean absolute value of the deltaE2000 metric referred as PSNR_DE2000, visual difference predictor (VDP2), visual information fidelity (VIF), and structural similarity (SSIM).

Subjective quality evaluation for HDR may comprise a side by side viewing comparison between cropped videos of a test technique and cropped original videos. HDR display may be calibrated (e.g., peak brightness, display uniformity). There may be multiple kinds of HDR displays in subjective quality evaluation, e.g., SIM2 and Pulsar. A viewer may focus on different areas, for example, because there are more details in HDR video compared to SDR, which may lead to variation among subjective quality evaluations. An HDR anchor may be generated with an HEVC main 10 profile and scalability extension of HEVC (SHVC) scale main 10 profile encoder. There may be multiple (e.g., three) categories in evaluating HDR techniques. Category 1 may consider coding technologies that offer compression efficiency improvements over an HEVC main 10 profile for HDR with HD or P3D65 color gamut content and normative changes. Category 2 may consider backward compatible solutions for HDR with HD or P3D65 content, for example, using layered or scalable solutions. Category 3 may consider optimization of the performance of a main 10 profile and/or scalable main 10 profile for HDR with HD or P3D65 color gamut content without normative changes.

Figure 3:
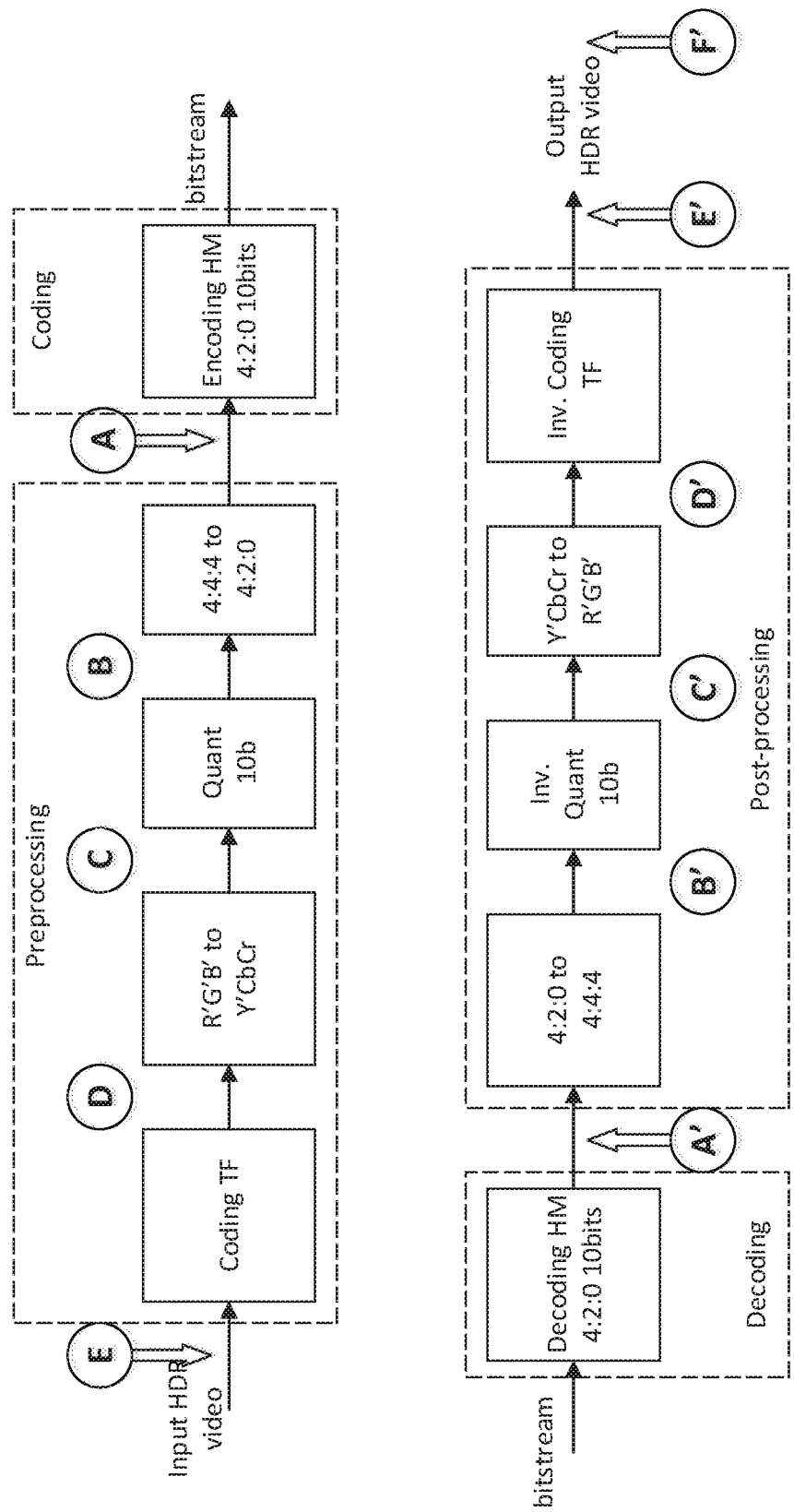
FIG. 3 shows an example of an end to end HDR coding and decoding chain.

FIG. 3 shows an example of an end to end HDR coding and decoding chain. An HDR coding/decoding workflow may, for example, be based on HEVC profiles with multiple types of processes, e.g., preprocessing, coding/decoding, and postprocessing. Preprocessing may convert a linear signal (e.g., linear floating point RGB) to a signal for compression (e.g., 10-bit YCbCr (A)), which may comprise linear to non-linear conversion with TF (e.g., linear RGB (E) to non-linear R'G'B'(D)), color space conversion (e.g., R'G'B'(D) to Y'CbCr (C)), floating point to fixed point conversion (e.g., quantizing sample value in floating point to 10-bit (B)) or chroma format conversion (e.g., chroma 4:4:4 to 4:2:0 (A)). Coding/decoding (compression/decompression) may comprise, for example, a single layer codec A' (e.g., HEVC main 10 scalable codec (e.g., SHVC scalable main 10 codec). Post-processing may convert a decompressed signal to a linear signal (e.g., linear floating point RGB (E')), which may comprise inverse chroma format conversion (chroma 4:2:0 to 4:4:4 (B')), inverse conversion from fixed point to floating point (e.g. 10-bit to floating point (C')), inverse color space conversion (e.g. Y'CbCr to R'G'B' (D')) or conversion from non-linear to linear with inverse TF.

HDR performance evaluation may be different from SDR performance evaluation workflow. With reference to an example shown in FIG. 3, an evaluation of HDR coding may be performed between E and E' at various bitrates while an evaluation of SDR coding may be performed between A and A'. Additional distortion may be introduced in processes before compression and after decompression. An HDR performance evaluation workflow may involve several format conversions (e.g., linear to non-linear, one color space to another, one chroma format to another, sample value range conversion). An objective quality metrics calculation (e.g. tPSNR, mPSNR, PSNR_DE2000) may be performed to take these processes into consideration. A conversion and metrics calculation tool may be provided, for example, to make a compression and evaluation process feasible. An objective metric calculation result may depend on the platform where it is executed, for example, when a floating point calculation is used. In an HDR workflow, some related information, such as the transfer function, color space, and tone mapping related information, may be signaled.

Table 2 is a list of example tools that may be related to HDR and WCG.

TABLE 2

Example tools related to HDR and WCG

| Metadata | Usage |
| --- | --- |
| Video signal type related syntax elements that may be indicated in video usability information (VUI) | "video_full_range_flag," "colour _primaries," "transfer characteristics" and "matrix_coeffs" may indicate some properties of the coded video container including sample value range, color primaries, transfer function, and/or color space to map video sample code levels to display intensities. Camera log transfers and perceptual quantizer (PQ) (e.g. SMPTE ST 2084), among others, may be selected, for example, in addition to the HD combination that may be utilized by digital video disc (DVD), Advanced television systems committee (ATSC), digital video broadcasting (DVB) and Blu-ray 1.0. UHD primaries may be added to ANT, HEVC, and XYZ. |
| Tone mapping information supplemental enhancement information (SEI) message | SEI may provide information to enable remapping of color samples of output decoded pictures for customization to particular display environments. It may include multiple methods to transmit one or more curves compactly within the bit-stream. The one or more curves may each target a different mapping scenario. |
| Mastering display color volume SEI message | Mastering display color volume SEI message may signal brightness range, primaries, and white point of a display monitor used during grading of video content (e.g. SMPTE ST 2086). |
| Color remapping information SEI message | Color remapping information SEI message may provide information to enable remapping of reconstructed color samples of output pictures. |
| Knee function information SEI message | Knee function information SEI message may provide information to enable mapping of color samples of decoded pictures for customization to various display environments. A knee function may include a piecewise linear function. |
| Color gamut scalability/bit depth scalability look-up table in picture parameter set | Color gamut scalability/bit depth scalability look-up table in picture parameter set may provide normative color mapping between base layer and SHVC enhancement layer (e.g., HD base layer (BL) → UHD enhancement layer (EL)), for bit depth and color gamut scalability. |

FIG. 4 shows an example of a post-processing HDR reconstruction process, e.g., an HDR-only coding solution. An HDR reconstruction process corresponding to adaptive reshaping and transfer function (ARTF) may be performed in multiple functional blocks (e.g., 414 as shown in FIG. 4). The HDR reconstruction 418 may comprise adaptive reshaping 406, chroma up-sampling 408, color enhancement 410, color space conversion 412, and adaptive inverse TF 414. The adaptive inverse TF 414 may use adaptive reshaping metadata identified in adaptive reshaping metastream 402, and output HDR. The adaptive reshaping 406 may use the decoder output (e.g., main 10) and the adaptive reshaping metadata. Color enhancement 410 may use color enhancement metadata identified in color enhancement metastream 404. Color enhancement filters for a picture may be estimated, e.g., at the encoder side, and may be signaled as color enhancement metadata 404. An HDR reconstruction process may apply color enhancement filters that are signaled as color enhancement metadata, e.g., as shown in FIG. 4, to a reconstructed I component to enhance the P and T components. The color space conversion 412 may use color space metadata identified in color space metastream 416.

FIG. 5 shows an example of XYZ to IPT-PQ color space conversion. FIG. 5 shows a diagram of forward color space conversion (e.g., from XYZ to IPT-PQ). The process 500 may comprise matrix conversion to LMS (e.g., 3×3 matrix) 502, PQ non-linear encoding 504, and matrix conversion to IPT-PQ (e.g., 3×3 matrix) 506. A color space conversion process from IPT-PQ to XYZ may use reverse order of the blocks in FIG. 5. IPT-PQ colour space may be derived from a perception-based colour opponent model.

An ARTF (e.g., 406 and 414) may change signal characteristics. ARTF may provide adaptive codeword re-distribution, for example, based on pixel brightness and signal requantization. ARTF may provide signal re-quantization among I, P and T components. ARTF may be performed on a scene basis.

Figure 6:
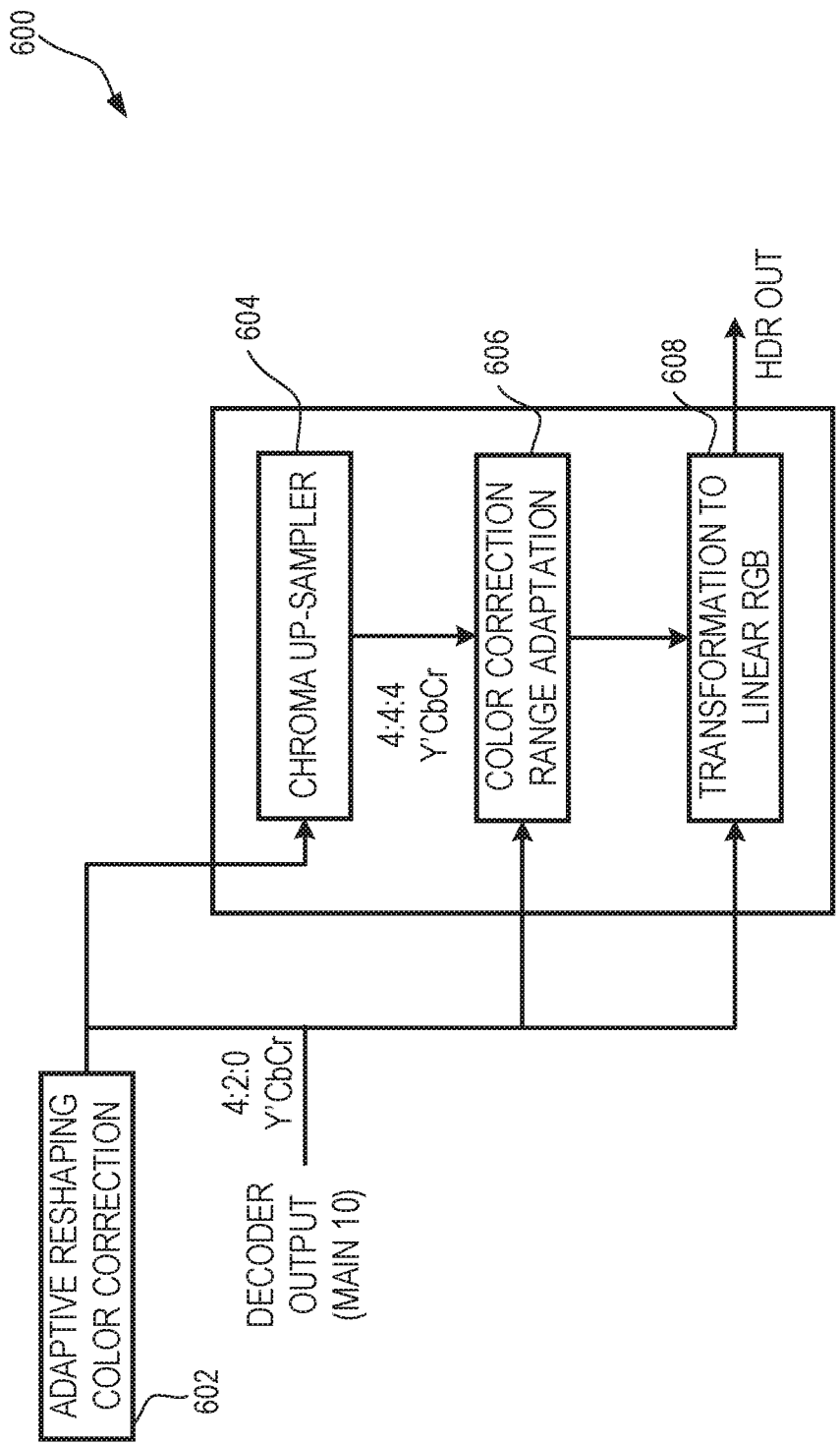
FIG. 6 shows an example of a single-layer SDR backward compatible design.

FIG. 6 shows an example of a single-layer SDR backward compatible design. HEVC encoder input and HEVC decoder output may include a Y'CbCr SDR version of source HDR content, e.g., before compression and after decompression. A decompressed SDR version may be converted back to HDR via an HDR reconstruction process 600, e.g., at a decoder. As shown in FIG. 6, reconstructed SDR content from a decoder (e.g., main 10) may be upsampled, e.g., from 4:2:0 to 4:4:4, at 604. The 4:4:4 Y'CbCr may be processed, e.g., via colour correction and range adaptation at 606. Output of color correction and range adaption may be transformed to linear RGB at 608. A conversion to RGB linear light may be concatenated with conversion to output HDR format at 608. Colour correction and range adaptation 606 and the transformation to linear RGB 608 may be performed based on adaptive reshaping colour correction information 602.

Some techniques may have dynamic range adaptation to convert HDR to/from SDR, for example, by encoding SDR video directly and/or converting SDR back to HDR at the receiver side. Non-HDR clients, such as SDR client, and HDR clients may be supported, which may be referred to as backward compatibility. SDR to HDR conversion may be enhanced, e.g., with some signaled metadata information. Backward compatible processes may compromise quality of SDR video as it goes through compression and decompression. The SDR to HDR range conversion process at the decoder side may magnify the quality degradation in the SDR signal, which may become visible in displayed HDR video. A similar degradation problem may exist as the color gamut is expanded from SDR to HDR video.

Figure 7:
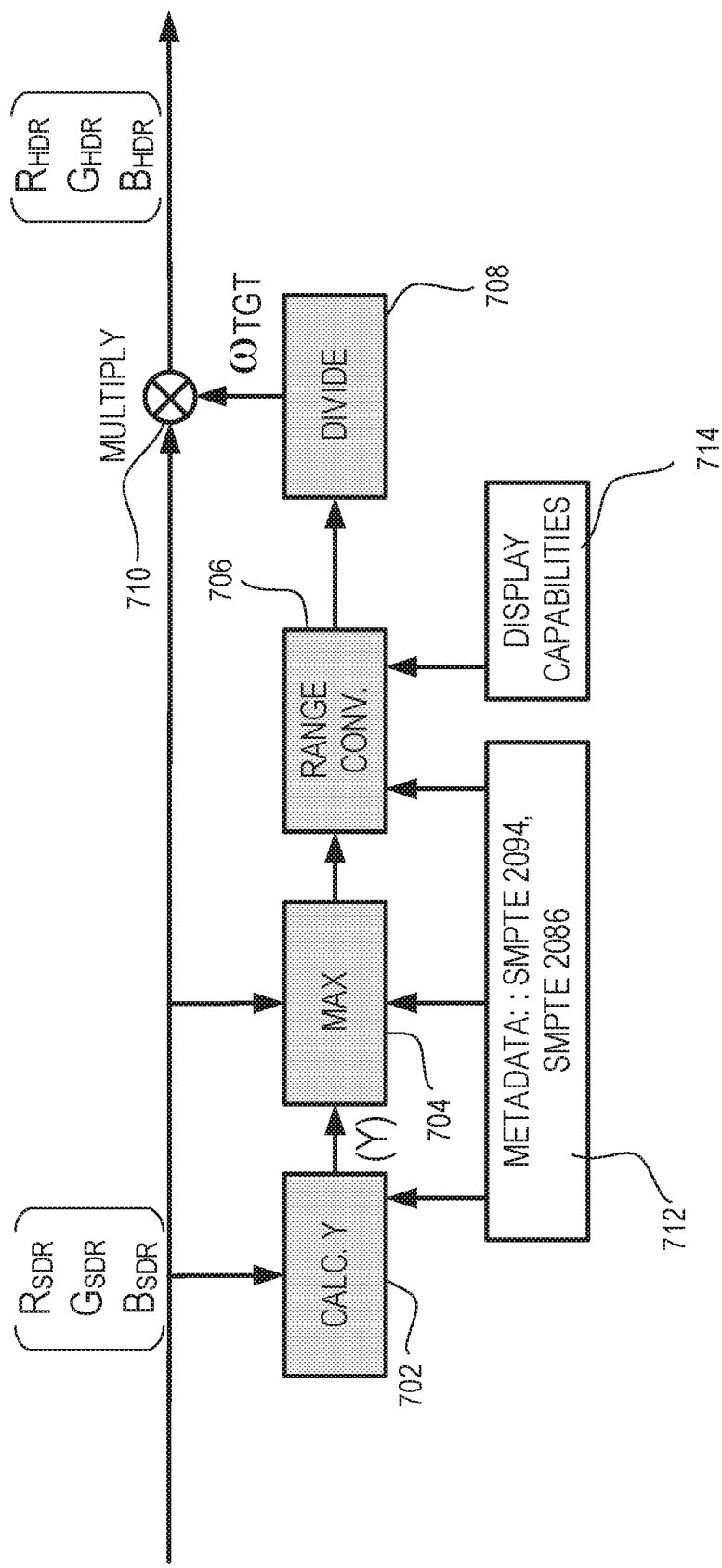
FIG. 7 shows an example of a conversion of SDR to HDR.

FIG. 7 shows an example of a conversion from SDR to HDR. As shown, RGB values of SDR may be used to calculate Y value at 702. Output of 702 may be used to calculate the max component per pixel at 704. Dynamic range conversion may be applied to the max component per pixel at 706. A ratio of output of the dynamic range conversion and the max component per pixel may be calculated to determine per pixel gain factor at 708. The SDR RGB value at 706 may be scaled by the gain factor per pixel to compute the HDR RGB value at 710. A calculation of SDR to HDR value for the maximum value at 704 and the dynamic range conversion at 706 may use metadata including, for example, Society of Motion Picture & Television Engineers Inc. (SMPTE) 2094 and SMPTE 2086 712. The dynamic range conversion at 706 may use display capabilities 714.

The range conversion 706 in FIG. 7 may be referred to as a tone mapping process. An input to a tone mapping process may be given by Eq. 1:

$$\text{Tone mapping input} = \text{Max}(\alpha R_S, \beta G_S, y B_S, \delta Y) \quad (1)$$

where $(\alpha, \beta, y, \delta)$ may represent tone mapping weights, e.g., as defined in the SMPTE ST 2094 dynamic metadata specification. Tone mapping weights may determine the relative weight of R, G, B and Y components in dynamic range conversion. In an example, $(\alpha, \beta, y, \delta)$ may be set to $(1,1,1,1)$.

SDR to HDR mapping may be given by Eq. 2:

$$\begin{pmatrix} R_{HDR} \\ G_{HDR} \\ B_{HDR} \end{pmatrix} = \omega_{TGT} * \begin{pmatrix} R_{SDR} \\ G_{SDR} \\ B_{SDR} \end{pmatrix} \quad (2)$$

where target $(\omega_{TGT})$ dynamic range conversion may be configurable. This functionality may enable a display adapted dynamic range conversion to a (e.g. any) luminance range, such as from an SDR $(L_{MAXSDR})$ up to an HDR $(L_{MAXHDR})$. e.g., based on target display capabilities $(L_{TGT})$. $\omega_{TGT}$ may be given by Eq. 3.

$$\omega_{TGT} = \text{func\_Disp\_Adap}_{RC}(\omega, L_{MAXHDR(SMPTE\ 2086)}, L_{MAXSDR(SMPTE\ 2094)}, L_{TGT}) \quad (3)$$

Figures 8, 9:
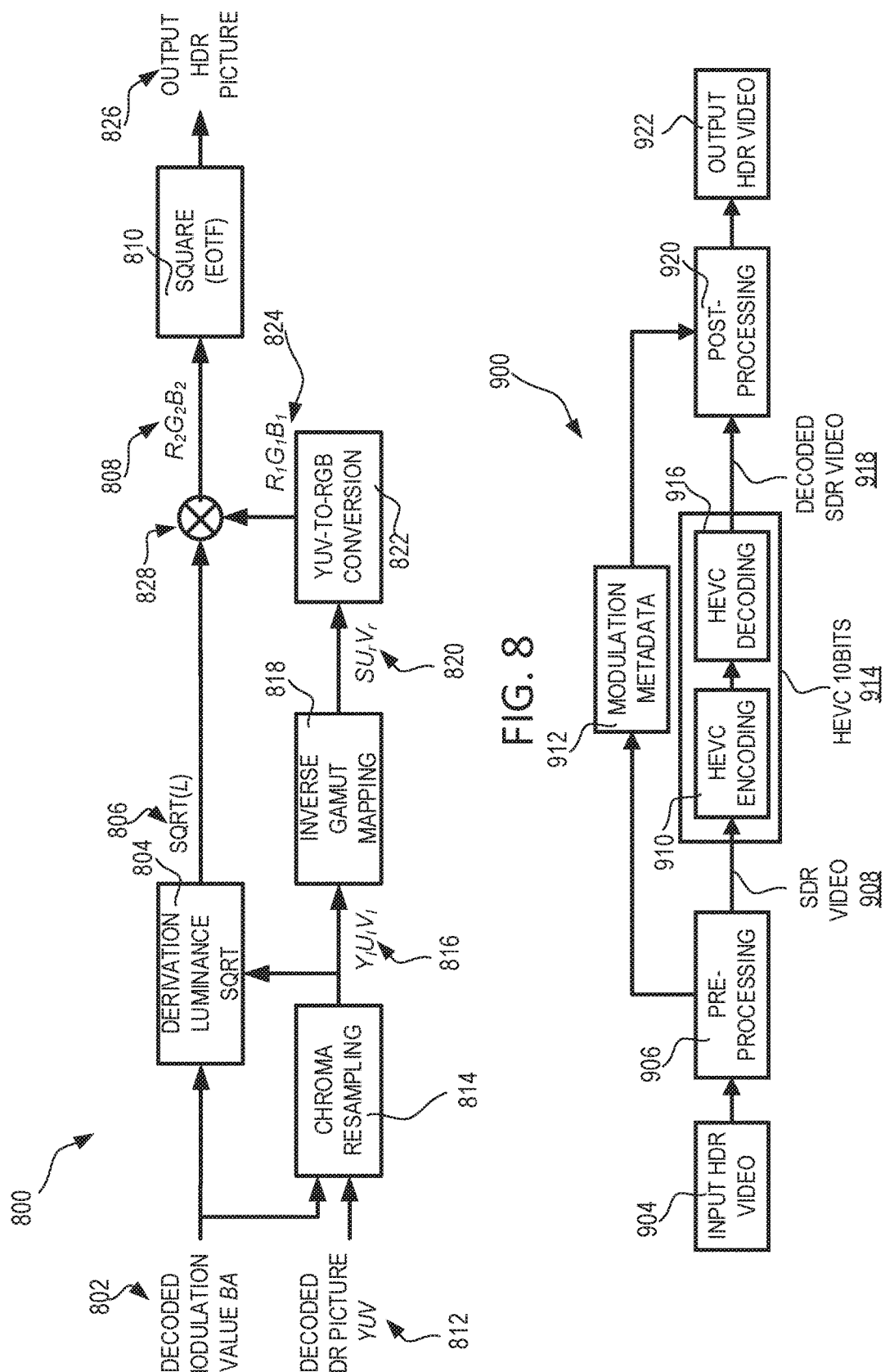
FIG. 8 shows an example of a conversion of SDR to HDR.
FIG. 9 shows an example of a structure for TCH.

FIG. 8 shows an example conversion of SDR to HDR. Table 3 is an example summary of post-processing. The conversion process 800 may comprise derivation luminance sqrt 804, chroma upsampling 814, inverse gamut mapping and scaling 818, YUV-to-RGB conversion 822, and square (EOTF) 810. Inputs may be a decoded modulation value Ba 802 and/or a reconstructed SDR tri-stimulus sample value (Y,U,V) 812. Modulation value Ba may be calculated at the encoding stage and/or signaled as a metadata for dynamic range conversion. Derivation luminance sqrt 804 may be implemented, for example, by a 1D Look-up Table. Decoded SDR picture YUV 812 may be used for chroma resampling at 814. Output of chroma resampling 816 may be used for inverse gamut mapping 818. An input to the inverse gamut mapping 818 may include decoded $Y_1U_1V_1$ 816 of SDR (e.g., with the modulation value Ba 802). Scaling may convert SDR dynamic range to HDR dynamic range. Inverse gamut mapping 818 may convert an SDR gamut, such as HD, to an HDR gamut, such as UHD. Output of inverse gamut mapping 820 may be used at 822. Output of chroma resampling 816 may be used for derivation luminance sqrt at 804. Output 824 of YUV-to-RGB conversion 822 and/or output 806 of deviation luminance sqrt 804 may be used for multiplication at 828. Output 808 of the multiplication 828 may be used to perform a square (EOTF) at 810 to generate a reconstructed linear-light HDR tri-stimulus sample value (R,G,B) 826.

FIG. 9 shows a process 900 with an SDR backward compatibility mode. The process 900 may receive input HDR video 904. The preprocessing 906 may generate SDR video 908. SDR video 908 may be provided for HEVC encoding at 910 and, HEVC 10 bits 914 may be generated. The process 900 may provide HEVC 10 bits 914 for HEVC decoding at 916. The HEVC decoding 916 may generate decoded SDR video 918. Post-processing may be performed on the decoded SDR video 918 at 920. The process 900 may output HDR video 922. Modulation metadata 912 that may be used to convert SDR to HDR in post-processing 920 may be signaled.

ing functions may be shown herein. Example architectures may comprise one or more functional blocks common to multiple operating modes.

Figure 10:
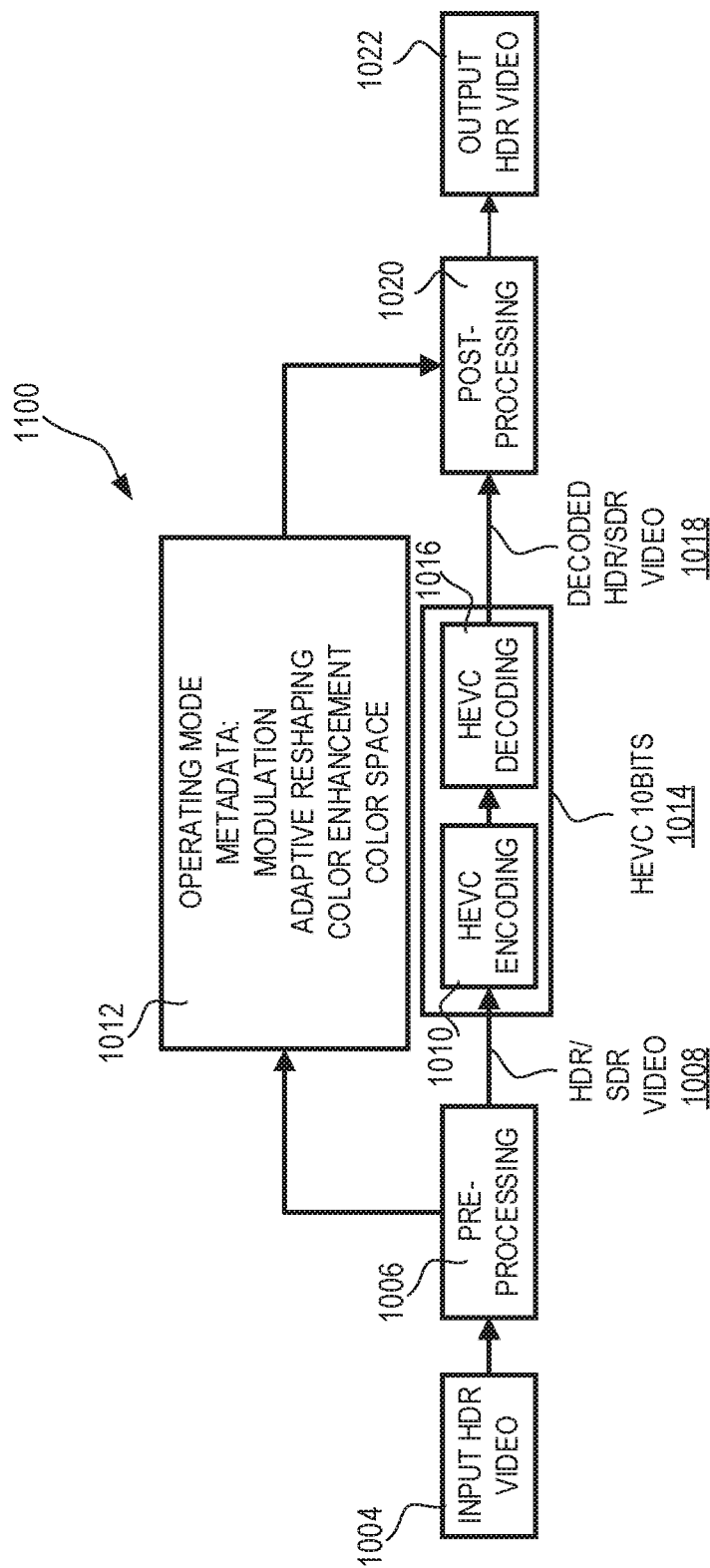
FIG. 10 shows an example of a post-processing HDR reconstruction process.

FIG. 10 shows an example process for SDR and HDR operating modes. As an example, the structure shown in FIG. 9 may be combined with other techniques (e.g., FIG. 4), for example, by sharing various technical elements (e.g., functional blocks) to provide both HDR only and HDR with SDR backward compatibility operating modes. The HDR-only mode may be optimized for HDR/WCG compression. The SDR-backward compatibility mode may provide an SDR output for backward compatibility. The process 1000

TABLE 3

Example of post-processing

| Post-processing | Details |
|---|---|
| $Y_i = Y + \max(0, a \cdot U + b \cdot V)$ $\begin{bmatrix} U_r \\ V_r \end{bmatrix} = \beta'(Y_i) \cdot \begin{bmatrix} U \\ V \end{bmatrix}$ | $\beta'(Y_i) = \beta_0(Ba, Y_i) / \sqrt{L(Ba, Y_i)}$ may depend on $Y_i$ but not on Ba, or $P \cdot \beta'(Y_i)$ may be implemented as a 1D LUT with $Y_i$ as LUT entry |
|  | Note: as $\begin{bmatrix} U \\ V \end{bmatrix} = \frac{1}{\beta_0(Ba, Y_i)} \cdot \begin{bmatrix} U_0 \\ V_0 \end{bmatrix}$ $\begin{bmatrix} U_r \\ V_r \end{bmatrix} = \frac{1}{\sqrt{L}} \cdot \begin{bmatrix} U_0 \\ V_0 \end{bmatrix}$ |
| $T = k_0 \cdot U_r \cdot V_r + k_1 \cdot U_r^2 + k_2 \cdot V_r^2$ | T may be positive by construction |
| If $T \leq 1$     $S = \sqrt{1-T}$ | $S = \frac{1}{\sqrt{L}} \sqrt{L - k_0 \cdot U_0 \cdot V_0 - k_1 \cdot U_0^2 - k_2 \cdot V_0^2}$ |
| Else     $U_r = U_r / \sqrt{T}$ $V_r = V_r / \sqrt{T}$ $S = 0$ | In case $T > 1$ (e.g., due to quantization), $U_r$ and $V_r$ may be rescaled by $1/\sqrt{T}$ and S becomes 0. Rescaling may preserve hue while clipping $U_r$, $V_r$ may result in noticeable hue change. $\sqrt{\cdot}$ and $1/\sqrt{\cdot}$ functions may be implemented using two 1D LUTs. |
| $\begin{bmatrix} R_1 \\ G_1 \\ B_1 \end{bmatrix} = A^{-1} \cdot \begin{bmatrix} S \\ U_r \\ V_r \end{bmatrix}$ |  |
| $\begin{bmatrix} R_2 \\ G_2 \\ B_2 \end{bmatrix} = \sqrt{L(Ba, Y_i)} \cdot \begin{bmatrix} R_1 \\ G_1 \\ B_1 \end{bmatrix}$ | $\sqrt{L(Ba, Y_i)}$: 1D LUT, interpolated for a (e.g., each) picture from 2 LUTs (e.g., with $Y_i$ as LUT entry), identified by Ba, peak luminance P, and the mastering display and container gamuts. |
| $\begin{bmatrix} R \\ G \\ B \end{bmatrix} = \begin{bmatrix} R_2^2 \\ G_2^2 \\ B_2^2 \end{bmatrix}$ | May be combined with a final adaptation of the linear-light signal to the display EOTF. |

A processing flow may be used in an end-to-end video delivery chain to achieve both backward compatible (e.g., SDR and HDR) and non-backward compatible (e.g., HDR-only) delivery. A backward compatible process may be harmonized with an HDR-only delivery flow to maintain high fidelity in reconstructed HDR video.

HDR and SDR video may have different color gamuts. An architecture may support both HDR adaptation and WCG support. A gain factor relating SDR and HDR may be implicitly encoded by pixel values. A signal processing device may perform a similar calculation allowing determination of gain. HDR may be reproduced from SDR using this gain factor. Linear domain expressions shown in Eq. 2 may, for example, be based on an assumption that SDR and HDR RGB values are expressed with the same color primaries but differ in dynamic ranges.

Various techniques may be harmonized in an architecture. Example architectures of pre-processing and post-processmay receive input HDR video 1004. The preprocessing 1006 may generate HDR/SDR video 1008. The process 1000 may provide HDR/SDR video 1008 for HEVC encoding at 1010 and generate HEVC 10 bits 1014. The process 1000 may provide HEVC 10 bits 1014 for HEVC decoding at 1016. The HEVC decoding 1016 may generate decoded HDR/SDR video 1018. The decoded HDR/SDR video 1018 may be for post-processing at 1020. The process 1000 may output HDR video 1022. An indication of the operating mode and HDR reconstruction metadata 1022 may be used to control various tools in post-processing.

Metadata from multiple techniques may be included in a union and supported by metadata 1012, e.g., operating mode metadata. The metadata 1012 may include modulation metadata used to control a process that converts HDR to SDR and/or SDR to HDR (e.g., as shown in FIG. 8 and FIG. 9). The metadata 1012 may include color space metadata indicating IPT-PQ space, adaptive reshaping metadata that redistributes useable codewords for color components, and/or color enhancement metadata that enhances and repairs distorted edges due to quantization during compression (e.g., as shown in FIG. 4).

Operating mode metadata (e.g., 1012) may comprise an operating mode indication. The operating mode indication may indicate whether the HDR coding is operated in an HDR-only mode or an SDR-backward-compatible mode. Different functional blocks may be invoked in the decoding process/post-processing to fully reconstruct the HDR video (e.g., with or without reconstructing an accompanying SDR signal), for example, depending on the operating mode metadata that comprises the operating mode indication.

Figure 11:
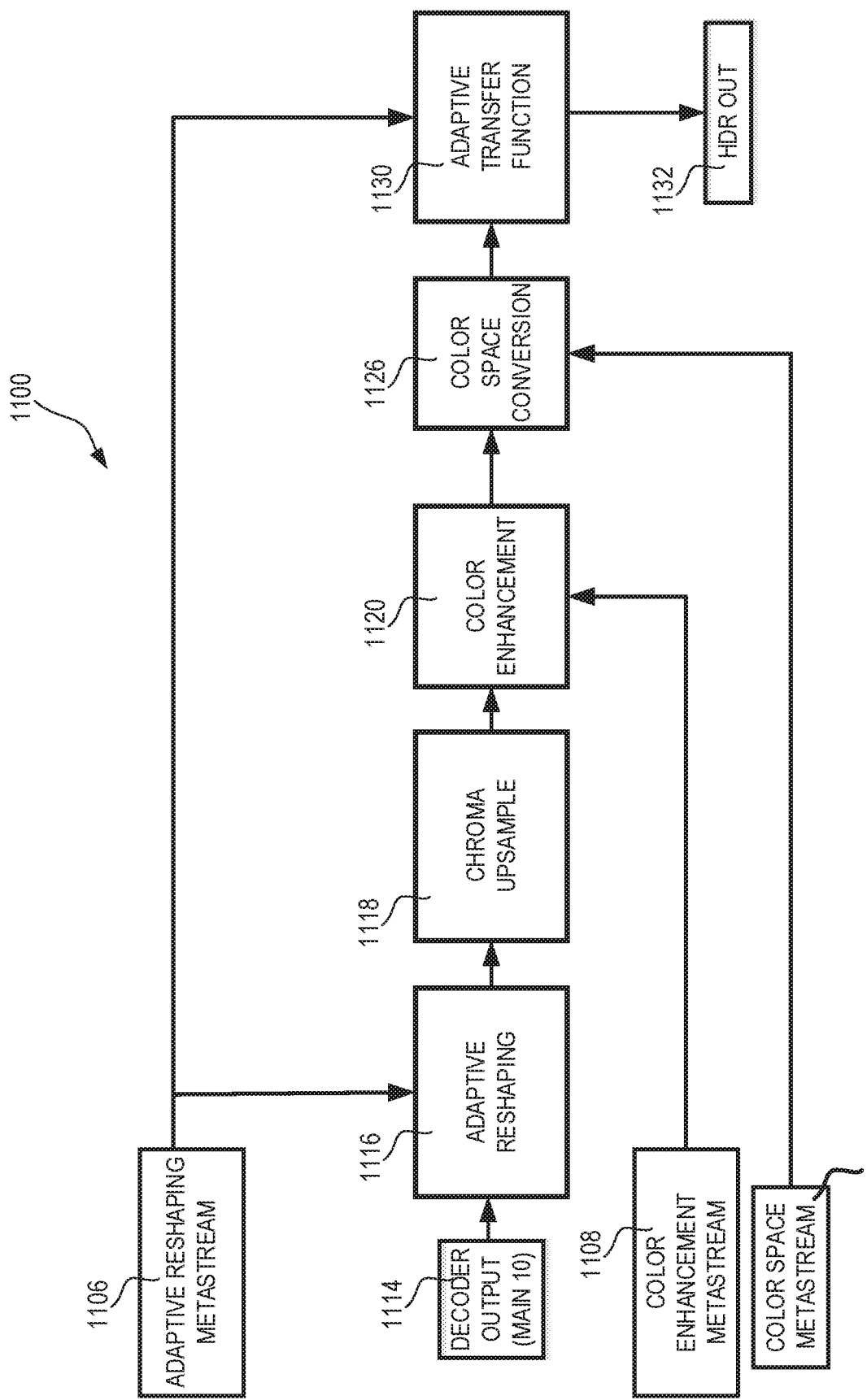
FIG. 11 shows an example process for SDR and HDR operating modes.

FIG. 11 shows an example of a post-processing HDR reconstruction process 1100 with a non SDR compatibility (e.g., HDR-only) operating mode. As shown, common sub-modules may be reused. For example, a signal processing device (e.g., a decoder or a display) may receive output (e.g., main 10) 1114 and go through adaptive reshaping 1116, chroma upsampling 1118, color enhancement 1120, color space conversion 1126, and adaptive transfer function 1130, and output HDR video 1132. The adaptive reshaping 1116 may use adaptive reshaping metadata identified from an adaptive reshaping metastream 1106. Color enhancement 1120 may use color enhancement metadata identified from a color enhancement metastream 1108. Color space conversion 1126 may use color space metadata identified from a color space metastream 1110.

Figure 12:
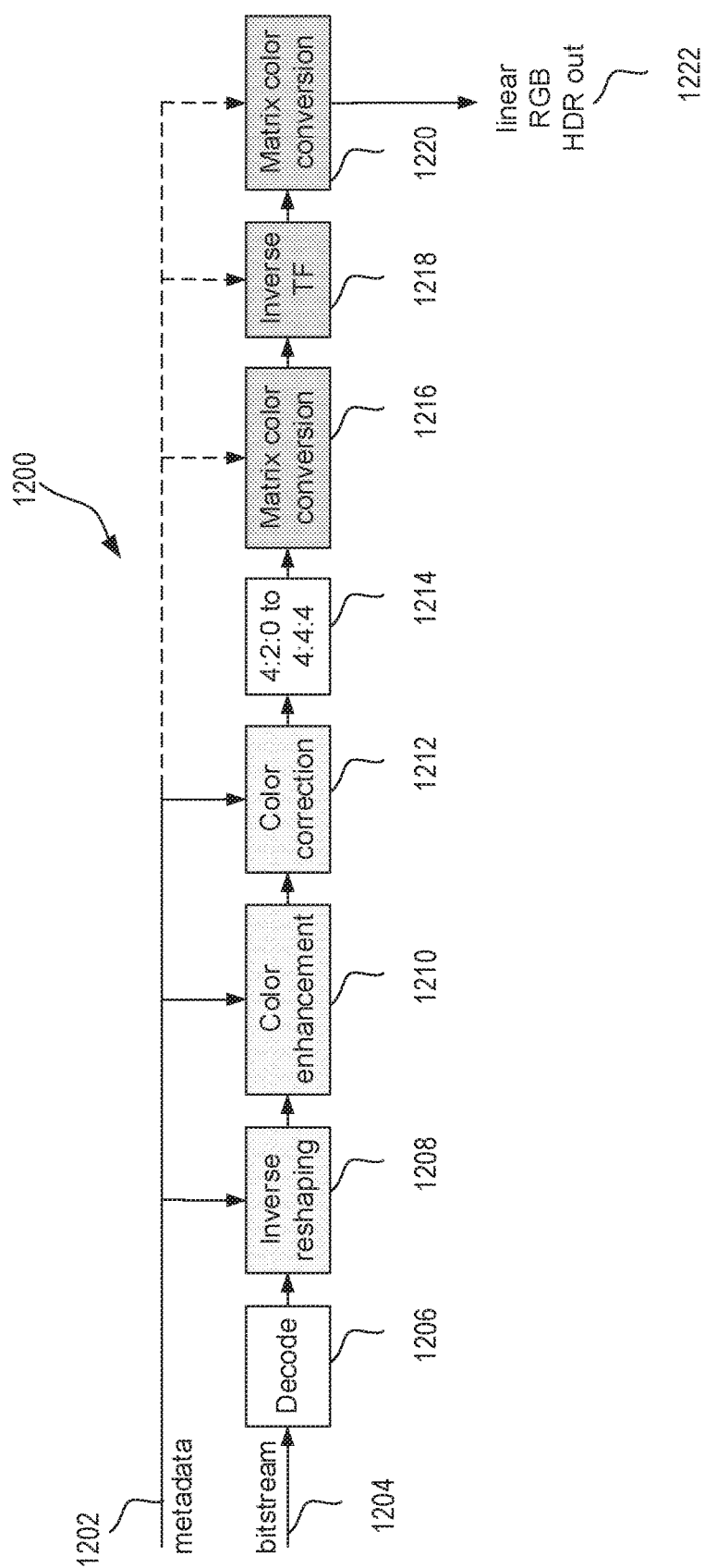
FIG. 12 shows an example of a unified HDR reconstruction process.

FIG. 12 shows an example of a decoder side inverse reshaper tool 1200. The decoder side inverse reshaper tool 1200 may correspond to an encoder side reshaper. The decoder side inverse reshaper tool 1200 may be adopted for unification. The decoder side inverse reshaper tool 1200 may receive a bitstream 1204 and metadata 1202. The bitstream 1204 may be decoded 1206. The decoded bitstream may be post-processed. The post-processing of the decoded bitstream may include inverse reshaping 1208, color enhancement 1210, color correction 1212, color space conversion 1214, matrix color conversion 1216, 1220, and/or inverse transfer function 1218. One or more of the post processing functions may use the metadata 1202. An inverse reshaping process may be normatively defined. An inverse reshaping process may be described for each color plane on different segments of input range. Application of an inverse reshaper may be described, for example, by a 10-bit look-up table (LUT). An inverse reshaper architecture may comprise signaling an LUT from encoder to decoder. A signaling procedure may comprise a piecewise description of LUT values, for example, where the domain may be divided into a number of segments and the LUT values on each segment may be described by an interpolation formula. A quadratic model may be used on each segment, e.g., to define the values of the inverse reshaping function for x values in the segment. An encoder may select the number and location of segments. Each segment boundary may be determined by a pivot point. An encoder may signal the number of pivot points (k) and the position of each pivot point $\{x_0, x_1, \ldots, x_{k-1}\}$ to the decoder. Within each segment, an encoder may signal multiple (e.g. three) parameters, e.g., there may be $\{a_{i0}, a_{i1}, a_{i2}\}$ parameters in segment $\{x_i, x_{i+1}\}$. Interpolated values of parameters may be given by a quadratic model, e.g., an inverse reshaping model as shown in Eq. (4):

$$y(x) = a_{i0} + a_{i1} \cdot x + a_{i2} \cdot x^2 \quad x \in [x_i, x_{i+1}] \tag{4}$$

Inverse reshaping may be applied to an HDR video. Inverse reshaping may be improved, for example, with respect to a curve interpolation model, computational complexity and syntax overhead. Inverse reshaping may use an inverse reshaping model. The inverse reshaping model may include a curve interpolation model. The inverse reshaping model may include a plurality of piecewise segments. A quadratic model may be used in each segment, and a reconstructed curve associated with the inverse reshaping model may not be smooth. For example, an inverse reshaping model may be a piecewise quadratic model. It may be desirable for an inverse reshaping function to be continuous and have a continuous first derivative $C^1$. An independent segment quadratic model may have no relation between the plurality of segments and may not necessarily imply even first order continuity in a piecewise defined inverse reshaping function. The meaning of values in the model may lack clarity, which may increase difficultly in selecting parameters to match a desired curve shape. For each segment of the inverse reshaping model, multiple (e.g., three) parameters may be defined, e.g., in addition to the location of pivot points. The multiple parameters may include a first order coefficient (e.g., a constant coefficient), a second order coefficient (e.g., a slope coefficient), and/or a third order coefficient (e.g., a curvature coefficient). For example, an inverse reshaping model having N segments may be defined by 3N parameters and/or N+1 pivot point locations.

Inverse reshaping may have varying levels of complexity. The complexity of a fixed point inverse reshaping may be relevant to describing a normative component of the reconstruction process. Analysis of a fixed point reshaping may indicate several complexity issues. Complexity may be indicated by, for example, the precision used for various parameter values (e.g., 30-bits of precision) and/or the magnitude of the terms in the model calculation (e.g., the squared term of a 10-bit x-value is 20-bits and when scaled by a 30-bit coefficient a result of a single term may be 50-bits). High (e.g. extreme) bit-depth may increase complexity of the inverse reshaping model. For example, a 32-bit multiplier with a 64-bit output may be used to multiply a 30-bit coefficient by a 20-bit $x^2$ term and a 64-bit ALU may be used to form the summation used in the calculation.

An inverse reshaping model may have an associated syntax. In an example, an inverse reshaping syntax may signal the number and location of 10-bit pivot points and three (3) 30-bit coefficients per segment. For N+1 pivot points corresponding to N segments, this example syntax has a cost of 10*(N+1)+3*30*N bits to signal the pivot points and coefficient values. For 8 segments, N=7, the cost may be 710 bits. A set of coefficients may be constrained in a complex manner (e.g., for purposes of continuity enforcement) that a syntax may not easily exploit. Complex constraints on a set of coefficients may increase difficultly in enforcing desired properties of an interpolated curve and in calculating parameters for the curve.

An interpolation model may be implemented efficiently, including signaling of an inverse reshaping curve, for example, by addressing a curve interpolation model, computational complexity and syntax used to convey pivot point locations and parameter values. An inverse reshaping LUT may be described in a piecewise model.

An interpolation model (e.g., an inverse reshaping model) may be defined based on a pivot point (e.g., a pivot endpoint or a pivot midpoint). For example, a plurality of pivot points may be determined. The pivot points may be associated with a plurality of piecewise segments of the interpolation model. For example, the pivot points may represent the points (e.g., endpoints) between the piecewise segments of the interpolation model. The pivot points may represent the midpoints of each piecewise segment of the interpolation model. A piecewise quadratic model may reference reconstruction relative to a value of x=0. A piecewise quadratic model may reference changes relative to a pivot point (e.g., the left endpoint $x_i$ of the ith segment). The reconstruction formula shown in Eq. (4), for example, may be modified and the weighting coefficients may be changed accordingly for the latter piecewise quadratic model. There may be k pivot points in a piecewise quadratic model. The location of each pivot point may be designated as $\{x_0, x_1, \ldots, x_{k-1}\}$. Within each segment, there may be multiple (e.g., three) parameters, e.g., there may be $\{a_i, b_i, c_i\}$ parameters in segment $\{x_i, x_{i+1}\}$. A parameter may represent a coefficient in an equation that defines the segment. A first parameter $a_i$ of the multiple parameters may be a constant type of parameter. A second parameter $b_i$ of the multiple parameters may be a linear type of parameter. A third parameter $c_i$ of the multiple parameters may be a curvature type of parameter. Interpolated values of parameters may be given by a quadratic model, e.g., an inverse reshaping model as shown in Eq. (5):

$$y(x) = a_i + b_i \cdot (x-x_i) + c_i \cdot (x-x_i)^2 \; x \in [x_i, x_{i+1}] \tag{5}$$

The dynamic range of difference values may be reduced relative to the size of x. Lower precision may be used in the coefficients, particularly the c coefficients (e.g., the curvature coefficients). The interpolation formula may be based on other points within a segment, such as a midpoint and/or a right hand endpoint. A midpoint may be given by Eq. (6):

$$\text{midpoint } x_m = \frac{(x_{i+1} + x_i)}{2} \tag{6}$$

Examples of a left (e.g., lower) endpoint, midpoint and right (e.g., upper) endpoint are shown in Eq. (7), (8) and (9), respectively:

$$y(x) = a_i + b_i \cdot (x-x_i) + c_i \cdot (x-x_i)^2 \tag{7}$$

$$y(x) = a_i + b_i \cdot (x-x_m) + c_i \cdot (x-x_m)^2 \tag{8}$$

$$y(x) = a_i + b_i \cdot (x-x_{i+1}) + c_i \cdot (x-x_{i+1})^2 \tag{9}$$

Parameters expressed relative to different points may be different but related. For example, the curvature coefficients may be equal in each segment regardless of the location (e.g., pivot point location) used for expressing the model, e.g., left end, midpoint, right end, absolute zero. Conditions for continuity across segment boundaries may become simplified.

A relation across segment boundaries may be used, for example, to reduce the number of parameters that are signaled. In an example of relations across boundaries, consider a zeroth order smoothness ($C^0$) condition. A zeroth order smoothness condition may define parameters in adjacent segments using an equation for each pivot point, for example, as shown in Eq. (10):

$$a_{i+1} = a_i + b_i \cdot (x_{i+1} - x_i) + c_i \cdot (x_{i+1} - x_i)^2 \; i=0, k-2 \tag{10}$$

A boundary relation may be used, for example, to determine one or more curvature parameters from one or more constant parameters at points i and i+1 and one or more linear parameters at point i. A boundary relation may be used in signaling to derive one or more curvature parameters from signaled constant and/or linear parameters. Derivation of a last curvature parameter $c_{k-1}$ may be calculated based on values of the pivot location and value at $x_k$ and $a_k$, which may be signaled or inferred and may, for example, be inferred to be the maximum signal value. The one or more curvature parameters may be determined, for example, using Eq. (11):

$$c_i = \frac{(a_{i+1} - a_i)}{(x_{i+1} - x_i)^2} - \frac{b_i}{(x_{i+1} - x_i)} \; i=0, k-1 \tag{11}$$

The segments of an inverse reshaping model may be defined based on a first order continuity ($C^1$). A representation for each segment may be based on the left hand endpoint. Conditions for first order continuity across segment boundaries may be given by set of Eq. (12):

$$a_{i+1} = a_i + b_i \cdot (x_{i+1} - x_i) + c_i \cdot (x_{i+1} - x_i)^2 \; i=0, k-2$$

$$b_{i+1} = b_i + 2 \cdot c_i \cdot (x_{i+1} - x_i) \tag{12}$$

Relationships shown in Eq. (12) may be used to signal a subset of the inverse reshaping model coefficients (e.g., parameters). For example, where the number of pivot points and the location of each pivot point is known, parameters $a_0$, $b_0$, and $\{c_0, \ldots, c_{k-1}\}$ may be signaled while remaining parameters $\{a_1, \ldots, a_{k-1}\}$ and $\{b_1, \ldots, b_{k-1}\}$ may be calculated (e.g., constructed recursively) using relationships shown in Eq. (12), for example.

A first video coding device (e.g., an encoder) may send a first subset of coefficients to a second video coding device (e.g., a decoder). The first subset of coefficients may be associated with the plurality of piecewise segments. The second video coding device may determine a plurality of pivot point associated with the piecewise segments. The second video coding device may receive (e.g., from the first video coding device) an indication of the pivot points. The second video coding device may calculate a second subset of coefficients based on the first subset of coefficients and the pivot points. The second subset of coefficients may be calculated using a boundary relation. The first subset of coefficients and the second subset of coefficients may be used to generate an inverse reshaping model. For example, the first and second subsets of coefficients may define the inverse reshaping model. The second video coding device may apply inverse reshaping to an HDR video using the inverse reshaping model.

Use of reconstructed parameters may describe a smooth curve and fewer parameters (e.g., one parameter) per segment may be signaled as opposed to more parameters (e.g., three parameters) for direct signaling.

Relationships may be inverted, for example, to determine $\{c_0, \ldots, c_{k-1}\}$ and $\{a_1, \ldots, a_{k-1}\}$ from $\{b_0, \ldots, b_k\}$ and $a_0$ iteratively. One or more parameters may be inferred, e.g., rather than signaled. An example of these relationships is shown in Eq. (13):

$$c_i = \frac{b_{i+1} - b_i}{2 \cdot (x_{i+1} - x_i)} \; i=0, k-1 \tag{13}$$

$$a_{i+1} = a_i + b_i \cdot (x_{i+1} - x_i) + c_i \cdot (x_{i+1} - x_i)^2 \; i=0, k-2$$

A first set of values, for example one or more curvature parameters. $\{c_0, \ldots, c_{k-1}\}$ may be calculated from a second set of values, for example one or more slope parameters $\{b_0, \ldots, b_k\}$. The set $\{a_1, \ldots, a_{k-1}\}$ may be constructed from $a_0$, $\{b_0, \ldots, b_{k-1}\}$, and $\{c_0, \ldots, c_{k-1}\}$.

An inverse reshaping model may be defined based on a midpoint (e.g., rather than a left hand endpoint). For example, each segment of the inverse reshaping model may be represented based on the mid-point, recurrence relations may be derived as shown in Eq. (14):

$$a_{i+1}+b_{i+1}\cdot(x_{i+1}-x_m)+c_i\cdot(x_{i+1}-x_m)^2=a_i+b_i\cdot(x_i-x_m)+c_i\cdot(x_i-x_m)^2 \quad i=0,k-2$$

$$b_{i+1}+2\cdot c_{i+1}\cdot(x_{i+1}-x_m)=b_i+2\cdot c_i\cdot(x_i-x_m)$$

$$a_{i+1}=a_i+b_i\cdot(x_i-x_m)+c_i\cdot(x_i-x_m)^2-b_{i+1}\cdot(x_{i+1}-x_m)-c_i\cdot(x_{i+1}-x_m)^2 \quad i=0,k-2$$

$$b_{i+1}=b_i+2\cdot c_i\cdot(x_i-x_m)-2\cdot c_{i+1}\cdot(x_{i+1}-x_m) \quad (14)$$

An inverse reshaping model may be defined based on a right hand endpoint (e.g., rather than a left hand endpoint) which may reduce signaling. A recursive relation may be replaced by a set of two equations that may be solved (e.g., simultaneously) to determine the parameters following integration. An example set of equations are shown in Eq. (15):

$$a_{i+1}+b_{i+1}\cdot x_{i+1}+c_{i+1}\cdot x_{i+1}^2=a_i+b_i\cdot x_i+c_i\cdot x_i^2 \quad i=0,k-2$$

$$b_{i+1}+c_{i+1}\cdot 2\cdot x_{i+1}=b_i+c_i\cdot 2\cdot x_i \quad (15)$$

The set of equations shown in Eq. (15) may be solved to calculate $a_{i+1}$ and $b_{i+1}$ in terms of pivot point locations, prior parameters, and $c_{i+1}$, for example, as shown in Eq. (16):

$$b_{i+1}=b_i+c_i\cdot 2\cdot x_i-c_{i+1}\cdot 2\cdot x_{i+1}$$

$$a_{i+1}=a_i+b_i\cdot x_i+c_i\cdot x_i^2-b_{i+1}\cdot x_{i+1}-c_{i+1}\cdot x_{i+1}^2 \quad i=0,k-2 \quad (16)$$

Growth in parameter precision and/or dynamic range may be avoided, for example, by clipping and rounding a value at each point using a recursion process. In an example, values of parameter a may be limited to the range 0-1023 for 10-bit content. A limitation on the values of parameter a may impact the cross boundary constraint. In an example (e.g., alternative), a normative constraint may be imposed on a video coding device that may disallow parameter values that exceed a limitation.

The number of bits used to represent and/or signal parameter values may be determined. The number of bits may depend on the segment size, which may impact the range of interpolation. A predefined segment size may be used. A bound on the segment size may be signaled. In an example, a bound (e.g., a single bound) appropriate for multiple (e.g., all) segments may be determined or a segment specific bound may be signaled or inferred. A segment size that is signaled or inferred may be used to determine the number of bits used to signal a (e.g., each) parameter value. The number of bits used may be constant for multiple (e.g. all) segments or adapted based on the segment size.

The number of fraction bits used for each of the parameters may be determined, for example, by noting the interpolation value is an integer and using the bound on the size of the x term in the polynomial.

A (e.g., each) term of the sum may use f bits of fraction. In an example, a constant term 'a' may use f bits of fraction, a linear term 'b' may use f+p bits of fraction, where p may be a number of bits used to represent the maximum of (x−xi) bits, and a curvature term 'c' may use f+2p bits of fraction. A limit on the size of a segment may (e.g., directly) limit the number of fraction bits used for one or more coefficient parameters. In an example, such as when the segment size is limited to $2^p$, the number of fraction bits for each coefficient parameter may be as expressed in Table 4.

TABLE 4

Example of fraction bits per parameter

| Parameter | Type | Fraction bits per parameter |
|---|---|---|
| $a_i$ | Constant | f |
| $b_i$ | Linear | f + p |
| $c_i$ | Curvature | f + 2p |

The location of pivot points may be restricted. One or more restrictions on pivot point locations may provide one or more benefits, such as lower dynamic range of calculation, reduced signaling and/or assistance in interpolation, for example, when division by the difference in pivot point locations is used.

Several types of restrictions on pivot point locations may be imposed. An upper bound restriction may be specified for segment size. An upper bound restriction may control the dynamic range of calculation, for example, when the interpolation model is based on a point inside a segment.

Pivot locations may be limited to a multiple of a power of two. Pivot point locations may be uniformly spaced through the interval. A parameter p may be given or may be signaled, for example, where parameter p specifies or describes the set of pivot point options. In an example, a set of pivot points may be defined as $\{x_i=i\cdot 2^p | 0 \le i \le 2^{10-p}\}$, which may describe a pivot point location at the upper end of each segment that may be used to define interpolation. Pivot points at the upper end of each segment may facilitate division by differences in pivot point location, for example, when the difference in locations is a power of 2. Uniform spacing may enforce a maximum bin width size of $2^p$. The signaling of pivot point locations may be provided, for example, by signaling a single integer p. The value p may be limited in magnitude, e.g., less than 6, to give a worst case bound on (e.g., all) segment lengths.

An analysis of interpolation may indicate a benefit in having power of two separation, for example, when calculating the coefficient recursion and/or when calculating the interpolation of values. Linear interpolation may be used without a pivot point location constraint. Arbitrary pivot point locations may be signaled for the right endpoint of segments that use linear interpolation, e.g., for segments using linear interpolation. The right endpoint may (e.g., may be required to) differ from the left endpoint by a power of 2, e.g., for segments using nonlinear interpolation, e.g., cubic segments.

An encoder side cubic model may be implemented. A determination may be made about model parameters for a desired inverse reshaping function. A piecewise cubic model may include parameters that comprise the function value and slope value at each pivot point. The piecewise cubic model parameters may be determined, for example, by selecting a set of pivot points, e.g., uniformly spaced at multiples of a power of 2. A function value may be used (e.g., directly) from a description of a function. A slope value may be estimated, for example, by a simple difference quotient based on points on either side of the pivot point. An offset used for a slope estimate may be based on the size of the segment. Refinement of the function and/or slope values may be used, for example, to minimize mean square error.

An encoder side quadratic model may be implemented. A determination may be made about model parameters for a desired inverse reshaping function. A piecewise quadratic model with $C^1$ continuity may have one (e.g., only one) set of coefficients. The one set of coefficients may be freely determined while other (e.g., two other) sets of coefficients may be constrained by continuity (e.g., a continuity relation). A piecewise quadratic model with $C^0$ continuity may have two sets of coefficients that may be freely determined while a third set of coefficients may be derived from the continuity constraints.

An encoder may limit the search space, using continuity relations and/or constraints to find model parameters (e.g., optimal parameters). A candidate set of pivot points may be selected based on a desired inverse reshaping function. An optimization search may be initialized with function values and slope estimates at each pivot point. Additional interpolation parameters may be derived using the function values and slope estimates at each pivot point. An error measure may be computed, the control parameters may be updated, a full parameter set may be computed, and/or a new error may be computed. Parameters may comprise a function value and slope value at each pivot point. In an example using first order continuity constraints and/or relations of the interpolating function, a (e.g., one) parameter may be selected per segment and two additional values may be selected in a first segment. In an example with N segments, N+2 parameters may be selected. Given a desired curve to represent, an N+2 dimensional parameter space may be searched for minimal distortion between the desired curve and the model curve to select optimal parameters. A reduced parameter space search may be used to select parameters, for example, even when the syntax does not impose reduced parameter space limits. In an example, an encoder may look at (e.g., only at) $C^1$ solutions to limit its search space even though syntax may support parameters that do not give $C^1$ solutions.

Monotonicity may include (e.g., require) a nonnegative slope. Parameters may be constrained, e.g., in the context of this model. For example, a set of conditions for monotonicity may be defined using a left endpoint as represented by Eq. (17):

$$\frac{dy}{dx} \geq 0 \quad \forall x \in [x_i, x_{i+1}] \quad (17)$$
$$b_i + c_i \cdot (x - x_i) \geq 0$$

Evaluating at the endpoints $x_i$ and $x_{i+1}$, one or more parameter relationships may be determined that provide monotonicity, e.g., as shown by Eq. (18):

$$b_i \geq 0 \quad c_i \geq \frac{-b_i}{(x_{i+1} - x_i)} \quad (18)$$

Eq. (18) may provide a lower bound on how negative a curvature parameter may be while still maintaining monotonicity. An upper limit of c may be derived and/or calculated, for example, by constraining the interpolation values. For example, the interpolation values may be constrained to require monotonicity of the inverse reshaping curve. An example monotonicity constraint is shown in Eq. (19):

$$a_i + b_i(x-x_i) + c_i(x-x_i)^2 \leq 2^{10} \quad \forall x \in [x_i, x_{i+1}] \quad (19)$$

As shown in Eq. (19), a constant parameter (a) and a linear parameter (b) may be nonnegative in this interval. An upper bound on the magnitude of $c_i$ may be derived, for example, as shown in Eq. (20):

$$c_i \leq \frac{2^{10}}{(x - x_i)^2} \quad \forall x \in [x_i, x_{i+1}] \quad (20)$$
$$c_i \leq 2^{10-2p} \quad \forall x \in [x_i, x_{i+1}]$$

Linear parameter b may be constrained to be nonnegative, e.g., as shown in Eq. (18). An upper bound may be placed on linear parameter b, e.g., on its value of s-bits ($b_i < 2^s$). Limits (e.g., upper and/or lower bounds) may be derived for all parameters, for example, as shown in Table 5:

TABLE 5

Example of parameter limits

| Parameter | Type | Fraction bits per parameter | Absolute value bound |
|---|---|---|---|
| $a_i$ | Constant | f | $2^{10}$ |
| $b_i$ | Linear | f + p | $2^s$ |
| $c_i$ | Curvature | f + 2p | $\text{Max}(2^{s-p}, 2^{10-2p})$ |

In an example, the curvature may be constrained to be nonnegative for an inverse reshaping model. The positive curvature may be constrained, e.g., by $2^{s-p}$. Constraints and bounds on fraction bits and/or absolute bounds may be used, for example, as needed when entropy coding the parameters.

A slope parameter may be non-negative and a bound (e.g., a limit) may be placed on the slope parameter, e.g., $2^b-1$, for example, when expressed relative to segment intervals.

For example, a full solution may be described for an inverse reshaping model. Reduced signaling of curves and examples of fixed point designs may be provided. One or more (e.g., four) general cases may be provided herein. In one or more examples described herein, p may denote the number of segments with p+1 pivots points, $\{x_0, \ldots, x_p\}$.

The number of parameters signaled may be reduced. For example, a first subset of parameters may be signaled and a second subset of parameters may be calculated based on the first subset of parameters and the plurality of pivot points. A c1_reshaping_model may be false and both sets of parameters $\{a_1, \ldots, a_{p-1}\}$ and $\{b_0, \ldots, b_{p-1}\}$, a total of p-1+p=2p-1 parameters, may be signaled. A c1_reshaping_model may be false, p-1 parameters $\{a_1, \ldots, a_{p-1}\}$ may be signaled and linear interpolation may be used to calculate one or more other parameters. A c1_reshaping_model may be true and p parameters $\{b_0, \ldots, b_{p-1}\}$ may be signaled. A c1_reshaping_model may be true and p parameters $\{a_1, \ldots, a_{p-1}\}$ and $b_0$ may be signaled. Whether a c1_reshaping_model is true or false may result in different parameters being signaled and how the remaining (e.g., non-signaled) parameters may be derived. The same interpolation process may be used. Various signaling arrangements for pivot point locations 'x' may be used with these cases.

In an example, let n=LUT bit-depth be, for example, n=10. Relations between parameters in neighboring segments may be derived. The factor of the length of a segment frequency may appear in these relationships. Division may be used to solve the relations. Division may be replaced by an integer bit-shift, for example, when the endpoints differ by powers of two (2). Endpoint pivot locations may be defined $x_0=0$ and $x_p=2^n$. Define $a_0=0$ and $a_p=2^n$. p-1 pivot point locations may be signaled $\{x_1, \ldots, x_{p-1}\}$, which may be increasing $x_i < x_{i+1}$. Division operations may be used in the recursive derivation of coefficients, for example, when the spacing of pivot points is not a uniform power of two.

Power of two (2) spacing between pivot points may be maintained without forcing all segments between two neighboring pivot points to be sized equally. For example, a dyadic split may be used, e.g., to guarantee that all segment sizes are power of two (2).

Where c1_reshaping_model is false, $\{a_1, \ldots, a_{p-1}\}$ and $\{b_0, \ldots, b_{p-1}\}$ may be signaled and parameters $\{c_0, \ldots, c_{p-1}\}$ may be derived from $\{a_0, \ldots, a_p\}$ and $\{b_0, \ldots, b_{p-1}\}$, for example, by Eq. (21):

$$c_i = \frac{(a_{i+1} - a_i)}{(x_{i+1} - x_i)^2} - \frac{b_i}{(x_{i+1} - x_i)} \quad i = 0, p-1 \quad (21)$$

When c1_reshaping_model is false, a piecewise linear model may be used and p-1 values at pivot points $\{a_1, \ldots, a_{p-1}\}$ may be signaled. In a piecewise linear model, the quadratic terms may be zero and $c_i = 0$. A set of p linear terms $\{b_i\}$ may be determined from $\{x_0, \ldots, x_p\}$ and $\{a_0, \ldots, a_p\}$, for example, as shown in Eq. (22):

$$b_i = \frac{(a_{i+1} - a_i)}{(x_{i+1} - x_i)} \quad 0 \le i \le p-1 \quad (22)$$

In an example where c1_reshaping_model is true, p parameters $\{b_0, \ldots, b_{p-1}\}$ may be signaled. The value $b_p$ may be determined from $a_0$, $a_p$, $\{x_0, \ldots, x_p\}$, and $\{b_0, \ldots, b_{p-1}\}$, for example, by using the derivation, shown in Eq. (23) when uniform spacing between the pivot points $x_i$ is used. A more complex relation may be derived in the case of nonuniform spacing:

$$b_p = \frac{2 \cdot (a_p - a_0)}{dx} - b_{p-1} - \sum_{j=0}^{p-2}(b_{j+1} + b_j) \quad (23)$$

In Eq. (23), a constant separation between pivot points is assumed. A more complex equation may be derived. Eq. (23) may be derived, for example, as shown in the series of equations (24), which describes a relation between a and b for continuity at pivot points:

$$a_{i+1} = a_i + b_i \cdot (x_{i+1} - x_i) + \left(\frac{b_{i+1} - b_i}{2}\right) \cdot (x_{i+1} - x_i) \quad i = 0, p-1 \quad (24)$$

$$a_{i+1} = a_i + \left(\frac{b_{i+1} + b_i}{2}\right) \cdot (x_{i+1} - x_i) \quad i = 0, p-1$$

$$a_{i+1} = a_0 + \sum_{j=0}^{i}\left(\frac{b_{j+1} + b_j}{2}\right) \cdot dx \quad i = 1, p-1$$

$$a_p = a_0 + \sum_{j=0}^{p-1}\left(\frac{b_{j+1} + b_j}{2}\right) \cdot dx$$

$$a_p = a_0 + \frac{(b_p + b_{p-1})}{2} \cdot dx + \sum_{j=0}^{p-2}\left(\frac{b_{j+1} + b_j}{2}\right) \cdot dx$$

$$b_p = \frac{2 \cdot (a_p - a_0)}{dx} - b_{p-1} - \sum_{j=0}^{p-2}(b_{j+1} + b_j)$$

Limiting $b_p < 0$ permits an offset to be added to other b values, for example, to avoid negative values. An offset $\alpha$ may be calculated, for example, as shown in the series of equations (25), where nonnegative $b_p$ may be solved for the offset $\alpha$:

$$b_j \to b_j + \alpha \quad (25)$$

$$b_p \to \frac{2 \cdot (a_p - a_0)}{dx} - b_{p-1} - \alpha - \sum_{j=0}^{p-2}(b_{j+1} + b_j + 2 \cdot \alpha) =$$

$$b_p - \alpha - 2 \cdot \alpha \cdot (p-1)$$

$$0 = b_p - \alpha - 2 \cdot \alpha \cdot (p-1)$$

$$\alpha = \frac{b_p}{(2 \cdot p - 1)}$$

The parameters $\{a_1, \ldots, a_{p-1}\}$ and $\{c_0, \ldots, c_{p-1}\}$ may be determined from the sets $\{x_0, \ldots, x_p\}$ and $\{b_0, \ldots, b_p\}$ for example, according to Eq. (26):

$$c_i = \frac{b_{i+1} - b_i}{2 \cdot (x_{i+1} - x_i)} \quad i = 0, p-1 \quad (26)$$

$$a_{i+1} = a_i + b_i \cdot (x_{i+1} - x_i) + c_i \cdot (x_{i+1} - x_i)^2 \quad i = 0, p-2$$

When c1_reshaping_model is true, the model may use (e.g., only) 'a' values and a single slope value. The p-1 values at these pivot points $\{a_1, \ldots, a_{p-1}\}$ and the value $b_0$ may be signaled. Eq. (26) may be derived, for example, as shown in Eq. (27):

$$a_i + b_i \cdot (x_{i+1} - x_i) + c_i \cdot (x_{i+1} - x_i)^2 = a_{i+1} \quad (27)$$

$$b_i + c_i \cdot 2 \cdot (x_{i+1} - x_i) = b_{i+1}$$

$$b_{i+1} = 2 \cdot \frac{(a_{i+1} - a_i)}{(x_{i+1} - x_i)} - b_i$$

$$c_i = \frac{(b_{i+1} - b_i)}{2 \cdot (x_{i+1} - x_i)}$$

A set of p additional linear terms $\{b_1, \ldots, b_p\}$ may be determined from the sets $\{x_0, \ldots, x_p\}$, $\{a_0, \ldots, a_p\}$, and the value $b_0$, for example, as shown in Eq. (28):

$$b_{i+1} = 2 \cdot \frac{(a_{i+1} - a_i)}{(x_{i+1} - x_i)} - b_i \quad 0 \le i \le p-1 \quad (28)$$

A set of p quadratic terms $\{c_0, \ldots, c_{p-1}\}$ may be determined from the sets $\{x_0, \ldots, x_p\}$ and $\{b_0, \ldots, b_p\}$, for example, as shown in Eq. (29):

$$c_i = \frac{(b_{i+1} - b_i)}{2 \cdot (x_{i+1} - x_i)} \quad 0 \le i \le p-1 \quad (29)$$

An interpolation may be defined (e.g., in all cases) on the ith interval, for example, according to Eq. (30):

$$y(x) = a_i + b_i \cdot (x - x_i) + c_i \cdot (x - x_i)^2 \quad x \in [x_i, x_{i+1}] \quad (30)$$

A first restricted set (e.g., a subset) of parameters may be signaled. A second restricted set of parameters may be determined. Given one restricted set, a full set of parameters may be determined. A different restricted set may be determined and used to signal an equivalent set, e.g., assuming the signaling set is broad enough to include the desired set. In an example, $C^1$ sets of parameters may be used alternately and/or additionally, although they may not be used for all $C^0$ parameters. The $C^0$ parameter signaling may be used with the $C^1$ or the $C^0$ parameter selection.

One or more parameters may be estimated. For example, an encoder may estimate slope parameters and signal the slope parameters to a decoding device. An encoder may estimate values for 'a' and a single slope parameter and signal 'a' to a decoding device. An encoder may estimate slope parameters and may derive the value parameters. When one or more slope parameters are estimated, the first p parameters may be estimated from the target curve using finite differences, for example, and a last slope parameter may be derived. Where a monotonic curve is supplied and/or desired, estimated slope parameters may be offset by a constant, e.g., to ensure the values are non-negative for slope parameter estimation.

With a concave curve, the slope may be estimated using the midpoint, for example, given that slope estimates at the left endpoint of each segment may overestimate the slope parameter and slope estimates at the right end point of each segment may underestimate the slope. Some modification of slope estimates may ensure that the interpolation curve is monotonic. In an example of $C^1$ limitations, the conditions for monotonicity may be simply expressed. A solution may be monotonic, for example, when each b value $\{b_0, \ldots, b_p\}$ is nonnegative, e.g., since the slope is linear and equal to the values of $b_i$ on the left end of segment i and $b_{i+1}$ on the right end of segment i. The value of slope for x values inside the interval may be between the values at the endpoints. A condition for monotonicity may be $b_i \geq 0$ for $0 \leq i \leq p$. The condition for monotonicity may be used in a search algorithm for slope parameters, vary $b_i$ (i=0,p-1), derive $b_p$ and test $b_p \geq 0$ and, e.g., if this constraint holds, determine an error measure of the interpolating curve, such as mean square error. Minimization of the error measure may be used to determine optimal parameters for $b_i$.

Sample fixed point implementations are described where the spacing between pivot points is a power of two (2). Powers of two may replace divisions by right shifts in one or more of the foregoing equations.

The value f may denote the number of fraction bits used to represent coefficients. The value f may be set to a constant value, e.g., f=3 in all cases, or may be signaled along with a segment description.

The value s may denote the number of bits used for the maximum slope, e.g., $0 \leq b_i < 2^s$.

The number of pivot points and/or a location of each of the pivot points may be signaled, for example, via parameter p as an unsigned integer with log 2(n) bits. The segment size may be $2^p$ and the number of segments may be $2^{(n-p)}$. The segment locations may be inferred using the segment size, the number of pivot points, and the location of each of the pivot points. A dyadic decomposition may be used so that the spacing between pivot points may be a power of two but the difference may differ. For example, the set {0, 64, 128, 192, 256, 512, 1024} may describe locations of pivot points that may not have uniform spacing but may have segment lengths which are powers of two.

Multiple (e.g., two) options may be provided to signal model parameters associated with pivot points. Signaling options may depend, for example, on the value of a reshaping model flag (e.g., such as c1_reshaping_model), which may be signaled as a 1-bit flag. For example, a first option may be indicated when c1_reshaping_model is false and a second option may be signaled when c1_reshaping_model is true.

One or more parameters may signal models that are not $C^1$ (e.g., models that do not have or require a continuous first derivative). Values $a_0=0$ and $a_p=2^n-1$ may be initialized. An additional set of p-1 values may be signaled for $\{a_1, \ldots, a_{p-1}\}$. The additional set of p-1 values may be signaled as n-bit integers. Differential coding and/or other entropy tools may be applied to signaling of these values. There may be p+1 values of $a_i$. An additional set of p values may be signaled for $\{b_0, \ldots, b_{p-1}\}$. The additional set of p values may be signaled as unsigned integers with s+p+f bits. The values may be interpreted as integers with p+f bits of fraction. One or more remaining parameters $\{c_0, \ldots, c_{p-1}\}$ may not be signaled. The one or more remaining parameters may be defined, for example as shown in Eq. (31) and may be interpreted as integers with 2p+f bits of fraction:

$$c_i = (a_{i+1}-a_i) \ll f - b_i \ll p \quad i=0,p-1 \tag{31}$$

One or more parameters may (e.g., may only) be used to signal $C^1$ curves (e.g. models having or requiring a continuous first derivative). The value $a_0=0$ may be initialized. A set of p+1 values may be signaled for $\{b_0, \ldots, b_p\}$. These values may be signaled as unsigned integers with b+p+f bits and may be interpreted as integers with p+f bits of fraction. Parameters $\{c_0, \ldots, c_{p-1}\}$ may or may not be signaled. These parameters may be calculated, for example, using Eq. (32):

$$c_i = \frac{b_{i+1} - b_i}{2 \cdot (x_{i+1} - x_i)} \quad i=0, p-1 \tag{32}$$

Remaining p-1 values $\{a_1, \ldots, a_p\}$ may be derived, for example, using Eq. (33):

$$a_{i+1} = a_i + b_i \cdot (x_{i+1}-x_i) + c_i \cdot (x_{i+1}-x_i)^2 \quad i=0,p-2 \tag{33}$$

An inverse reshaping model may be generated using a plurality of piecewise segments a plurality of pivot points. One or more of the piecewise segments (e.g., the first and/or last segments) may be flat, as described herein. Each of the plurality of piecewise segments may be defined by one or more (e.g., three) coefficients. The coefficients may be separated into two or more subsets of coefficients. A first subset of the coefficients may be signaled from an encoder. A second subset of coefficients may be calculated by a decoder based on the signaled first subset of coefficients. For example, b0 and the 'a' values may be signaled (e.g., only signaled) and the remaining 'b' and 'c' values may be calculated. The values $a_0=0$ and $a_p=2^n$ may be initialized. A set of p-1 values may be signaled for $\{a_1, \ldots, a_{p-1}\}$ and an additional value may be signaled for $b_0$. The set of p-1 values may be signaled as unsigned integers with b+p+f bits and may be interpreted as integers with p+f bits of fraction. A set of p additional linear terms $\{b_1, \ldots, b_p\}$ may be determined from the sets $\{x_0, \ldots, x_p\}$, $\{a_0, \ldots, a_p\}$, and the value $b_0$, for example, as shown in Eq. (34):

$$b_{i+1} = 2 \cdot \frac{(a_{i+1} - a_i)}{(x_{i+1} - x_i)} - b_i \quad 0 \leq i \leq p-2 \tag{34}$$

$$b_p = \frac{2 \cdot (a_p - a_0)}{dx} - b_{p-1} - \sum_{j=0}^{p-2} (b_{j+1} + b_j)$$

The parameters $\{c_0, \ldots, c_{p-1}\}$ may or may not be signaled. These parameters may be calculated, for example, using Eq. (35):

$$c_i = \frac{b_{i+1} - b_i}{2 \cdot (x_{i+1} - x_i)} \quad i = 0, p-1 \qquad (35)$$

The values $a_i$ may be an integer representing the value at the ith pivot point, $b_i$ may be an s+f+p bit integer with p+f bits of fraction representing the slope at the ith pivot point, and the value $c_i$ may be a signed integer with 2p+f bits of fraction that may represent the curvature at the ith pivot point. A coefficient $a_i$ may be a first coefficient. The first coefficient may be a constant coefficient. A coefficient bi may be a second coefficient. The second coefficient may be a slope coefficient. A coefficient ci may be a third coefficient. The third coefficient may be a curvature coefficient.

Interpolation for a value x may be defined, for example, according to Eq. (36):

$i = x \gg p$ $y(x) = a_i + ((b_i \cdot (x-x_i)) \gg p + (c_i \cdot (x-x_i)^2) \gg (2 \cdot p) + (1 \ll (f-1))) \gg f$
$x \in [i \cdot 2^p, (i+1) \cdot 2^p)$ (36)

As described herein, a limited number of model coefficients may be signaled and remaining coefficients for the model may be derived using one or more relations such as zeroth order or first order continuity. As described herein, the number of pivot points may be signaled using a single value and the location of the pivot points may be derived.

Various implementations may implement one or more of various models. A switch may be used to signal a different interpolation model, e.g., a model that is not based on piecewise quadratic polynomials and/or a fixed partitioning.

An interpolation model may comprise three segments [x0,x1], [x1,x2], and [x2,x3]; where x0=0 and x3=255. Linear interpolation may be used on the first and last segment of the interpolation model while a nonlinear model may be used on the internal (e.g., middle) segment. The internal segment may use a cubic model, for example, to enable C1 smoothing at both ends. A quadratic model may provide C0 continuity at both ends and C1 continuity at a single end. The length of the second (e.g., internal) segment may be a power of 2, e.g., to replace divisions with bit shifts. Signaling may comprise two slope parameters b0 and b2. The two slope parameters may be signaled with b+n bits. The value of x1 may be signaled as an unsigned n-bit integer. The location of x2 may be signaled as an unsigned integer and/or restricted to differing from x1 by a power of two. When the location of x2 is restricted to differing from x1 by a power of two, an additional positive integer p may be signaled where x2=x1+2^p.

In an example with a quadratic model C1 at the right endpoint and quadratic model C0 at the left endpoint, interpolation parameters a1, b1, and c1 may be derived and $y(x_1)$ and $y(x_2)$ may be defined by linear interpolation, for example, according to the set of equations, relationships and limitations shown in Eq. (37):

$$a_1 = y(x_1) \qquad (37)$$
$$b_1 = b_0$$
$$c_i = \frac{(y(x_2) - a_1 - b_1 \cdot (x_2 - x_1))}{(x_2 - x_1)^2}$$

-continued
$$y(x) = (b_0 \cdot x + (1 \ll (n-1))) \gg n \qquad 0 \le x \le x_1$$
$$y(x) = a_1 + b_1 \cdot (x - x_1) + c_i \cdot (x - x_1)^2 \qquad x_1 < x < x_2$$
$$y(x) = 2^n - 1 + (b_2 \cdot (x - 2^n - 1) + (1 \ll (n-1))) \gg n \qquad x_2 \le x \le 2^n - 1$$

Parameters for a cubic interpolation of a first segment may be determined, for example, using first order continuity at each end of the first segment. Additional parameters may be determined from the cubic interpolation model and $1^{st}$ order continuity. An example of cubic interpolation from slope and value pairs at each endpoint are presented, for example, according to the set of equations, relationships and limitations shown in Eq. (38):

$$a_1 = y(x_1) \qquad (38)$$
$$s_1 = \frac{b_0}{2^n}$$
$$a_2 = y(x_2)$$
$$s_2 = \frac{b_2}{2^n}$$
$$y(x) = (b_0 \cdot x + (1 \ll (n-1))) \gg n \qquad 0 \le x \le x_1$$
$$y(x) = a_1 + b_1 \cdot \frac{(x - x_1)}{(x_2 - x_1)} + c_i \cdot \frac{(x - x_1)^2}{(x_2 - x_1)^2} + d_i \cdot \frac{(x - x_1)^3}{(x_2 - x_1)^3} \qquad x_1 < x < x_2$$
$$y(x) = 2^n - 1 + (b_2 \cdot (x - 2^n - 1) + (1 \ll (n-1))) \gg n \qquad x_2 \le x \le 2^n - 1$$

One or more interpolation models may be extended to partitions. In an example, linear interpolation may be used on some intervals whose length may not be a power of 2 while cubic interpolation may be used on intervals whose length may be a power of 2.

A piecewise cubic interpolation model may be used, e.g., in lieu of a piecewise quadratic model. A piecewise cubic interpolation model may enable potential benefits in curve modelling, complexity, and/or syntax.

In an example of a curve interpolation model, a cubic spline interpolation model may be used. Interpolation within each segment may be defined by a cubic equation. A cubic spline interpolation may be uniquely defined by the values of an interpolating function and a function slope at each endpoint. The values of the function and slope may be given at each pivot point. Interpolating functions may be continuous to first order at each of the pivot points, e.g., regardless of the function and slope values specified at the pivot points.

Values of x, y, and slope for each segment may be given at either endpoint $(x_i, y_i, s_i)$ and $(x_{i+1}, y_{i+1}, s_{i+1})$. An interpolation model for $x \in [x_i, x_{i+1}]$ may be given by a general cubic equation such as Eq. (39):

$$y = a + b \cdot (x - x_i) + c \cdot (x - x_i)^2 + d \cdot (x - x_i)^3 \qquad (39)$$
$$\frac{dy}{dx} = b + 2 \cdot c \cdot (x - x_i) + 3 \cdot d \cdot (x - x_i)^2$$

Coefficients a, b, c, d may be determined, for example, by imposing the boundary values of y and slope, e.g., as shown in Eq. (40):

$y_i = a$ $s_i = b$ $y_{i+1} = a + b \cdot (x_{i+1} - x_i) + c \cdot (x_{i+1} - x_i)^2 + d \cdot (x_{i+1} - x_i)^3$ $s_{i+1} = b + 2 \cdot c \cdot (x_{i+1} - x_i) + 3 \cdot d \cdot (x_{i+1} - x_i)^2$ (40)

Values of c and d may be calculated, for example, as shown in Eq. (41):

$$\binom{c}{d} = \frac{1}{(x_{i+1} - x_i)^3} \cdot \begin{pmatrix} 3 \cdot (x_{i+1} - x_i) & -(x_{i+1} - x_i)^2 \\ -2 & (x_{i+1} - x_i) \end{pmatrix} \cdot \begin{pmatrix} (y_{i+1} - y_i) - s_i \cdot (x_{i+1} - x_i) \\ s_{i+1} - s_i \end{pmatrix} \quad (41)$$

In an example of a cubic interpolation model, parameters describing the interpolation may comprise the number of pivot points, the location of pivot points, the value at each pivot point, and/or the value of slope at each pivot point. In an example having N segments and N+1 pivot points, there may be 2*N+2 parameters in addition to the location of the pivot points, which may be signaled. An interpolation curve may be continuous to first order by construction. Parameters of the cubic interpolation model may be intuitive and may comprise the desired function values and slopes at each pivot point.

Interpolation complexity may be reduced, for example, by describing the model relative to the endpoint of the segment or the mid-point of the segment, which may reduce the maximum value of the x term. In an example of an interpolation process based on a quadratic model, x values may be relative to zero. In an example, coefficients may be modified to provide the same interpolation curve, e.g., as shown in Eq. (42):

$$y(x) = a_{i0} + a_{i1} \cdot (x - x_i) + a_{i2} \cdot (x - x_i)^2 \quad x \in [x_i, x_{i+1}] \quad (42)$$

Eq. (42) may be further refined, for example, by using the midpoint rather than an endpoint in the calculation. The midpoint may be an integer, for example, when the pivot points are restricted to being even, e.g., as shown in Eq. (43):

$$x_m = \frac{(x_{i+1} - x_i)}{2} \quad y(x) = a_{i0} + a_{i1} \cdot (x - x_m) + a_{i2} \cdot (x - x_m)^2 \quad x \in [x_i, x_{i+1}] \quad (43)$$

An interpolation formula for a piecewise cubic model may be expressed around the mid-point, for example, as shown in Eq. (44):

$$y = a + b \cdot \frac{(x - x_m)}{(x_{i+1} - x_i)} + c \cdot \frac{(x - x_m)^2}{(x_{i+1} - x_i)^2} + d \cdot \frac{(x - x_m)^3}{(x_{i+1} - x_i)^3} \quad (44)$$

The values of a, b, c, d may be determined by the function and slope values at the endpoints, e.g., as described herein. The results may be simplified, for example, by observing the relation of differences from the midpoint, as shown by the set of equations (45):

$$x_{i+1} - x_i = 2 \cdot (x_{i+1} - x_m) = -2 \cdot (x_i - x_m) \quad (45)$$

$$y_i = a - \frac{b}{2} + \frac{c}{4} - \frac{d}{8}$$

$$y_{i+1} = a + \frac{b}{2} + \frac{c}{4} + \frac{d}{8}$$

-continued $$(x_{i+1} - x_i) \cdot s_i = b - c + \frac{3 \cdot d}{4}$$

$$(x_{i+1} - x_i) \cdot s_{i+1} = b + c + \frac{3 \cdot d}{4}$$

The set of equations (45) may be solved for parameters a, b, c, d in terms of the values at the pivot points, for example, as shown by the set of equations (46):

$$a = \frac{(y_{i+1} + y_i)}{2} - \frac{(x_{i+1} - x_i)}{2} \cdot \frac{(s_{i+1} - s_i)}{2} \quad (46)$$

$$b = \frac{3 \cdot (y_{i+1} - y_i)}{2} - \frac{(x_{i+1} - x_i)}{2} \cdot \frac{(s_{i+1} + s_i)}{2}$$

$$c = \frac{(x_{i+1} - x_i)}{2} \cdot (s_{i+1} - s_i)$$

$$d = (x_{i+1} - x_i) \cdot (s_{i+1} + s_i) - 2 \cdot (y_{i+1} - y_i)$$

Division in the cubic expression may be simplified to appropriate bit shifts, for example, when the pivot points are selected to be separated by powers of two (2), e.g., as shown in Eq. (47):

$$x_j = j \cdot 2^k \quad (47)$$

In an example, function values and slope values may be assumed to be available at all pivot locations including the endpoints 0 and $2^n$ for an n-bit LUT, e.g., as shown in Eq. 48 where n=10:

$$\{(x_j, y_j, s_j) \, j=0,1,\ldots,2^{10-k}\} \quad (48)$$

Division in the calculation of the cubic model may be replaced by bit-shifts. Variation within a segment may be limited by placing a bound on the quantities squared and/or cubed in the model. The variation limitation may be desirable, for example, even when the coefficients are signaled and division is not needed to calculate them.

In a fixed point implementation, the number of bits used to represent the slope may be specified. For example, f bits of fraction may be used to represent the slope. Each slope value may be in the form $$s_i = \frac{\lambda_i}{2^f}.$$

Midpoint cubic interpolation equations may be expressed in integer parameters, for example, according to the set of equations (49):

$$\hat{a} = 4 \cdot 2^f \cdot a \quad (49)$$

$$\hat{b} = 2 \cdot 2^f \cdot b$$

$$\hat{c} = 2 \cdot 2^f \cdot c$$

$$\hat{d} = 2^f \cdot d$$

$$\hat{a} = (y_{i+1} + y_i) << f - \frac{(x_{i+1} - x_i)}{2} \cdot (\lambda_{i+1} - \lambda_i)$$

$$\hat{b} = 3 \cdot (y_{i+1} - y_i) << f - \frac{(x_{i+1} - x_i)}{2} \cdot (\lambda_{i+1} + \lambda_i)$$

$$\hat{c} = (x_{i+1} - x_i) \cdot (\lambda_{i+1} + \lambda_i)$$

$$\hat{d} = (x_{i+1} - x_i) \cdot (\lambda_{i+1} + \lambda_i) - 2 \cdot (y_{i+1} - y_i) << f$$

-continued $$y = (\hat{a} \ll (3 \cdot p - 1) +$$
$$\hat{b} \cdot (x - x_m) \ll (2 \cdot p - 1) + \hat{c} \cdot (x - x_m)^2 \ll (p - 1) +$$
$$\hat{d} \cdot (x - x_m)^3 + (1 \ll (3 \cdot p + f - 1))) \gg (3 \cdot p + f)$$

The foregoing expressions may permit identification of the bit width demands of an integer calculation, for example, based on known bounds on each of the quantities $(x_{i+1}-x_i)$, $\lambda_i$, and $y_i$. The term $(x_{i+1}-x_i)$ may be reduced when the segment size is of a limited range.

Syntax may be improved in one or more respects. The location of the pivot points may be constrained to fixed locations such as multiples of a given power of 2. When the location of the pivot points are constrained to fixed locations, signaling may be reduced to signaling the given power. In a cubic model example, two values (e.g., one y value and one slope value) may be signaled with each pivot point, e.g., rather than signal the three quadratic model parameters on each interval. In an example with N segments the number of parameters may be 3N in a quadratic model and 2N+2 in a cubic model, where N segments have N+1 pivot points. The bit depth of parameters signaled may be reduced. At each pivot point, the y value may have, for example, 10-bits and the slope parameter may be limited to a total of m bits with f fraction bits. In an example, values may be m=8 and f=4. Entropy coding may be applied on these parameters. Differential coding followed by representation in a smaller number of bits may be used and may be enhanced, for example, by additional entropy coding tools, such as run-length coding on the differences.

A model based approach may be used for sending the value and/or slope parameters. In an example of a model based approach, a reduced number of pivot points and model parameters may be used to signal the y-value and/or slope values. Following syntax decoding, the values and slopes at a dense set of pivot points may be constructed. This dense set of pivot points x, y, and slope values may be supplied to the LUT interpolation process.

In an example, HEVC may be extended to provide inverse reshaping for high dynamic range video coding. Examples of HEVC extension syntax are provided below.

Table 6 provides an example of general sequence parameter set Raw Byte Sequence Payload (RBSP) syntax.

TABLE 6

Example of general sequence parameter set RBSP syntax

| | Descriptor |
|---|---|
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier_level( 1, sps_max_sub_layers_minus1 ) | |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0 : sps_max_sub_layers_minus1 ); i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   log2_min_luma_coding_block_size_minus3 | ue(v) |
|   log2_diff_max_min_luma_coding_block_size | ue(v) |
|   log2_min_luma_transform_block_size_minus2 | ue(v) |
|   log2_diff_max_min_luma_transform_block_size | ue(v) |
|   max_transform_hierarchy_depth_inter | ue(v) |
|   max_transform_hierarchy_depth_intra | ue(v) |
|   scaling_list_enabled_flag | u(1) |
|   if( scaling_list_enabled_flag ) { | |
|     sps_scaling_list_data_present_flag | u(1) |
|     if( sps_scaling_list_data_present_flag ) | |
|       scaling_list_data( ) | |
|   } | |
|   amp_enabled_flag | u(1) |
|   sample_adaptive_offset_enabled_flag | u(1) |
|   pcm_enabled_flag | u(1) |

TABLE 6-continued

Example of general sequence parameter set RBSP syntax

| | Descriptor |
|---|---|
| if( pcm_enabled_flag ) { | |
|     pcm_sample_bit_depth_luma_minus1 | u(4) |
|     pcm_sample_bit_depth_chroma_minus1 | u(4) |
|     log2_min_pcm_luma_coding_block_size_minus3 | ue(v) |
|     log2_diff_max_min_pcm_luma_coding_block_size | ue(v) |
|     pcm_loop_filter_disabled_flag | u(1) |
| } | |
| num_short_term_ref_pic_sets | ue(v) |
| for( i = 0; i < num_short_term_ref_pic_sets; i++) | |
|     st_ref_pic_set( i ) | |
| long_term_ref_pics_present_flag | u(1) |
| if( long_term_ref_pics_present_flag ) { | |
|     num_long_term_ref_pics_sps | ue(v) |
|     for( i = 0; i < num_long_term_ref_pics_sps; i++ ) { | |
|         lt_ref_pic_poc_lsb_sps[ i ] | u(v) |
|         used_by_curr_pic_lt_sps_flag[ i ] | u(1) |
|     } | |
| } | |
| sps_temporal_mvp_enabled_flag | u(1) |
| strong_intra_smoothing_enabled_flag | u(1) |
| vui_parameters_present_flag | u(1) |
| if( vui_parameters_present_flag ) | |
|     vui_parameters( ) | |
| sps_extension_present_flag | u(1) |
| if( sps_extension_present_flag ) { | |
|     sps_range_extension_flag | u(1) |
|     sps_multilayer_extension_flag | u(1) |
|     sps_3d_extension_flag | u(1) |
|     sps_scc_extension_flag | u(1) |
|     sps_hdrwcg_extension_flag | u(1) |
|     sps_extension_3bits | u(3) |
| } | |
| if( sps_range_extension_flag ) | |
|     sps_range_extension( ) | |
| if( sps_multilayer_extension_flag ) | |
|     sps_multilayer_extension( ) /* specified in Annex F */ | |
| if( sps_3d_extension_flag ) | |
|     sps_3d_extension( ) /* specified in I*/ | |
| if( sps_scc_extension_flag ) | |
|     sps_scc_extension( ) | |
| if( sps_hdrwcg_extension_flag ) | |
|     sps_hdrwcg_extension( ) | |
| if( sps_extension_3bits ) | |
|     while( more_rbsp_data( ) ) | |
|         sps_extension_data_flag | u(1) |
| rbsp_trailing_bits( ) | |
| } | |

Table 7 provides an example of sps_hdrwcg_extension syntax.

TABLE 7

Example of sps_hdrwcg_extension syntax

| | Descriptor |
|---|---|
| sps_hdrwcg_extension( ) { | |
|     hdr_reconstruction_mode_flag | u(1) |
|     hdr_luma_reshaping_flag | u(1) |
|     if ( hdr_reconstruction_mode_flag ) { | |
|         hdr_colour_correction_sps_table( ) | |
|     } | |
| } | |

Table 8 provides an example of hdr_colourcorrection_sps_table syntax.

TABLE 8

Example of hdr_colour_correction_sps_table syntax

| | Descriptor |
|---|---|
| hdr_colour_correction_sps_table( ) { | |
| } | |

Table 9 provides an example of general picture parameter set RBSP syntax.

TABLE 9

Example of general picture parameter set RBSP syntax

| | Descriptor |
|---|---|
| pic_parameter_set_rbsp( ) { | |
|     pps_pic_parameter_set_id | ue(v) |
|     pps_seq_parameter_set_id | ue(v) |
|     dependent_slice_segments_enabled_flag | u(1) |

TABLE 9-continued

Example of general picture parameter set RBSP syntax

| | Descriptor |
|---|---|
| output_flag_present_flag | u(1) |
| num_extra_slice_header_bits | u(3) |
| sign_data_hiding_enabled_flag | u(1) |
| cabac_init_present_flag | u(1) |
| num_ref_idx_l0_default_active_minus1 | ue(v) |
| num_ref_idx_l1_default_active_minus1 | ue(v) |
| init_qp_minus26 | se(v) |
| constrained_intra_pred_flag | u(1) |
| transform_skip_enabled_flag | u(1) |
| cu_qp_delta_enabled_flag | u(1) |
| if( cu_qp_delta_enabled_flag ) | |
|     diff_cu_qp_delta_depth | ue(v) |
| pps_cb_qp_offset | se(v) |
| pps_cr_qp_offset | se(v) |
| pps_slice_chroma_qp_offsets_present_flag | u(1) |
| weighted_pred_flag | u(1) |
| weighted_bipred_flag | u(1) |
| transquant_bypass_enabled_flag | u(1) |
| tiles_enabled_flag | u(1) |
| entropy_coding_sync_enabled_flag | u(1) |
| if( tiles_enabled_flag ) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|         for( i = 0; i < num_tile_columns_minus1; i++ ) | |
|             column_width_minus1[ i ] | ue(v) |
|         for( i = 0; i < num_tile_rows_minus1; i++ ) | |
|             row_height_minus1[ i ] | ue(v) |
|     } | |
|     loop_filter_across_tiles_enabled_flag | u(1) |
| } | |
| pps_loop_filter_across_slices_enabled_flag | u(1) |
| deblocking_filter_control_present_flag | u(1) |
| if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|         pps_beta_offset_div2 | se(v) |
|         pps_tc_offset_div2 | se(v) |
|     } | |
| } | |
| pps_scaling_list_data_present_flag | u(1) |
| if( pps_scaling_list_data_present_flag ) | |
|     scaling_list_data( ) | |
| lists_modification_present_flag | u(1) |
| log2_parallel_merge_level_minus2 | ue(v) |
| slice_segment_header_extension_present_flag | u(1) |
| pps_extension_present_flag | u(1) |
| if( pps_extension_present_flag ) { | |
|     pps_range_extension_flag | u(1) |
|     pps_multilayer_extension_flag | u(1) |
|     pps_3d_extension_flag | u(1) |
|     pps_scc_extension_flag | u(1) |
|     pps_hdrwcg_extension_flag | u(1) |
|     pps_extension_3bits | u(3) |
| } | |
| if( pps_range_extension_flag ) | |
|     pps_range_extension( ) | |
| if( pps_multilayer_extension_flag ) | |
|     pps_multilayer_extension( ) /* specified in Annex F */ | |
| if( pps_3d_extension_flag ) | |
|     pps_3d_extension( ) /* specified in Annex I */ | |
| if( pps_scc_extension_flag ) | |
|     pps_scc_extension( ) | |
| if( pps_hdrwcg_extension_flag ) | |
|     pps_hdrwcg_extension( ) | |
| if( pps_extension_3bits ) | |
|     while( more_rbsp_data( ) ) | |
|         pps_extension_data_flag | u(1) |
| rbsp_trailing_bits( ) | |
| } | |

Table 10 provides an example of pps_hdrwcg_extension syntax.

TABLE 10

Example of pps_hdrwcg_extension syntax

| | Descriptor |
|---|---|
| pps_hdrwcg_extension( ) { | |
|     hdr_reshaping_pps_table( ) | |
|     hdr_colour_enhancement_pps_table( ) | |
|     if( hdr_reconstruction_mode_flag) | |
|         hdr_colour_correction_pps_table( ) | |
| } | |

Table 11 provides an example of hdr_reshaping_pps_table syntax.

TABLE 11

Example of hdr_reshaping_pps_table syntax

| | Descriptor |
|---|---|
| hdr_reshape_pps_table( ) { | |
|     reshape_present_flag | ue(v) |
|     if( reshape_present_flag ) { | |
|         reshape_input_luma_bit_depth_minus8 | ue(v) |
|         reshape_input_chroma_bit_depth_minus8 | ue(v) |
|         reshape_output_luma_bit_depth_minus8 | ue(v) |
|         reshape_output_chroma_bit_depth_minus8 | ue(v) |
|         coeff_log2_offset | ue(v) |
|         for( c = 0; c < 3; c++ ) { | |
|             reshape_num_pivots_minus2 [ c ] | ue(v) |
|             for( i = 0; i < reshape_num_pivots_minus2 [ c ] + 2 ; i++ ) { | |
|                 reshape_coded_pivot_value[ c ][ i ] | u(v) |
|             } | |
|             for( i = 0; i < reshape_num_pivots_minus2 [ c ] + 1; i++ ) { | |
|                 poly_coef_int[ c ][ i ] [ 0 ] | se(v) |
|                 poly_coef_frac[ c ][ i ][0 ] | u(v) |
|             } | |

TABLE 11-continued

Example of hdr_reshaping_pps_table syntax

| | Descriptor |
|---|---|
| poly_coef_int[ c ][ 0 ][ 1 ] | se(v) |
| poly_coef_frac[ c ][ 0 ][ 1 ] | u(v) |
| } | |
| } else | |
| reshape_pps_id | ue(v) |
| } | |

Table 12 provides an example of hdr_colour_enhancement_pps_table syntax.

TABLE 12

Example of hdr_colour_enhancement_pps_table syntax

| | Descriptor |
|---|---|
| hdr_colour_enhancement_pps_table ( ) { | |
|     cb_enhancement_flag | u(1) |
|     cr_enhancement_flag | u(1) |
|     if (cb_enhancement_flag \|\| cr_enhancement_flag) { | |
|         num_coeff_hori_minus1 | ue(v) |
|         num_coeff_verti_minus1 | ue(v) |
|         if (cb_enhancement_flag) { | |
|             for ( i=0; i<( (num_coeff_hori_minus1+1)×(num_coeff_verti_ minus1+1)−1 ); i++ ) | |
|                 cb_filter_coeff_plus32[i/(num_coeff_hori_minus1+1)][i%(num_coeff_hori_minus1+1)] | u(6) |
|             cb_scaling_factor_abs_minus1 | u(10) |
|             cb_scaling_factor_sign | u(1) |
|             cb_bit_shifting | u(5) |
|         } | |
|         if ( cr_enhancement_flag ) { | |
|             for ( i=0; i<( (num_coeff_hori_minus1+1)×(num_coeff_verti_minus1+1)−1 ); i++ ) | |
|                 cr_filter_coeff_plus32[i/(num_coeff_hori_minus1+1)][i%(num_coeff_hori_minus1+1)] | u(6) |
|             cr_scaling_factor_abs_minus1 | u(10) |
|             cr_scaling_factor_sign | u(1) |
|             cr_bit_shifting | u(5) |
|         } | |
|     } | |
| } | |

Table 13 provides an example of hdr_colour_correction_pps_table syntax.

TABLE 13

Example of hdr_colour_correction_pps_table syntax

| | Descriptor |
|---|---|
| hdr_colour_correction_pps_table( ) { | |
| } | |

HEVC semantics may be extended to provide inverse reshaping for high dynamic range video coding. Examples of HEVC extension semantics are provided below.

In an example, general sequence parameter set RBSP semantics may be provided. An sps_hdrwcg_extension_flag equal to 1 may indicate that an sps_hdrwcg_extension( ) syntax structure is present in the SPS RBSP syntax structure. An sps_hdrwcg_extension_flag equal to 0 may indicate that this syntax structure is not present. The value of sps_hdrwcg_extension_flag may be inferred to be equal to 0, for example, when not present.

An sps_extension_3bits flag equal to 0 may indicate that no sps_extension_data_flag syntax elements are present in the SPS RBSP syntax structure. An sps_extension_3bits flag may be equal to 0 in one or more bitstreams, for example, when present. When present, sps_extension_3bits may be equal to 0 in bitstreams. Values of sps_extension_3bits not equal to 0 may be reserved for future use. Decoders may allow the value of sps_extension_3bits to be not equal to 0 and may ignore sps_extension_data_flag syntax elements in an SPS NAL unit. The value of sps_extension_3bits may be inferred to be equal to 0, for example, when not present.

Sequence parameter set HDR and WCG extension semantics may be provided. A flag hdr_reconstruction_mode_flag equal to 0 may indicate that an application is for HDR-only output. A flag hdr_reconstruction_mode_flag equal to 1 may indicate that the application supports SDR compatible and HDR output. The value of flag hdr_reconstruction_mode_flag may be inferred to be equal to 0, for example, when not present.

A flag hdr_luma_reshaping_flag equal to 0 may indicate that HDR luma reshaping may not be, need not be, has not been and/or is not performed. A flag hdr_luma_reshaping_flag equal to 1 may indicate that HDR luma reshaping is performed or is to be performed.

A general HDR color correction table may be provided and/or signaled. Picture parameter set HDR and WCG extension semantics may be provided and/or signaled.

In an example, a general HDR reshape table may be provided. A flag reshape_present_flag equal to 1 may indicate that syntax elements are present, such as reshape_input_luma_bit_depth_minus8, reshape_input_chroma_bit_depth_minus8, reshape_output_luma_bit_depth_minus8, reshape_output_chroma_bit_depth_minus8, coeff log 2_offset, reshape_num_pivots_minus2, reshape_coded_pivot_value, poly_coef_int, poly_coef_frac, and reshape_pps_id; reshape_present_flag equal to 0 may indicate that syntax elements are not present, such as reshape_input_luma_bit_depth_minus8, reshape_input_chroma_bit_depth_minus8, reshape_output_luma_bit_depth_minus8, reshape_output_chroma_bit_depth_minus8, coeff log 2_offset, reshape_num_pivots_minus2, reshape_coded_pivot_value, poly_coef_int, poly_coef_frac, and reshape_pps_id.

Syntax element reshape_input_luma_bit_depth_minus8 may indicate a sample bit depth of an input luma component of an HDR reshaping process. A variable BitDepthReshapeInputL may be derived, for example, according to Eq. (50):

$$BitDepthReshapeInputL=8+reshape\_input\_luma\_bit\_depth\_minus8 \qquad (50)$$

Syntax element reshape_input_chroma_bit_depth_minus8 may indicate a sample bit depth of an input chroma component of an HDR reshaping process. A variable BitDepthReshapeInputC may be derived, for example, according to Eq. (51):

$$BitDepthReshapeInputC=8+reshape\_input\_chroma\_bit\_depth\_minus8 \qquad (51)$$

Syntax element reshape_output_luma_bit_depth_minus8 may indicate a sample bit depth of an output luma component of an HDR reshaping process. A variable BitDepthReshapeOutputL may be derived, for example, according to Eq. (52):

$$BitDepthReshapeOutputL=8+reshape\_output\_luma\_bit\_depth\_minus8 \qquad (52)$$

Syntax element reshape_output_chroma_bit_depth_minus8 may indicate a sample bit depth of an output chroma component of an HDR reshaping process. A variable BitDepthReshapeOutputC may be derived, for example, according to Eq. (53):

$$BitDepthReshapeOutputC=8+reshape\_output\_chroma\_bit\_depth\_minus8 \qquad (53)$$

Syntax element coeff_log 2_offset plus 14 may indicate a number of fractional bits for HDR reshaping related coefficients calculations. A value of coeff_log 2_offset may be in the range of 0 to 9, inclusive. Variables ReshapeOrder0 Log 2Denom, ReshapeOrder1 Log 2Denom, and ReshapeOrder2 Log 2Denom may be derived, for example, according to Eq. (54):

$$ReshapeOrder0\ Log\ 2Denom=3+coeff\_log\ 2\_offset$$

$$ReshapeOrder1\ Log\ 2Denom=3+BitDepthY+coeff\_log\ 2\_offset$$

$$ReshapeOrder2\ Log\ 2Denom=3+2*BitDepthY+coeff\_log\ 2\_offset \qquad (54)$$

Syntax element reshape_num_pivots_minus2[c] plus 2 may indicate a number of pivot points in a piece-wise reshaping function that may have two end points. A value of reshape_num_pivots_minus2[c] may be inferred to be 0, for example, when not present. Syntax element reshape_num_pivots_minus2[c] may be in a range of 0 to 7, inclusive, for a luma component and in the range of 0 to 3, inclusive, for a chroma component.

Syntax element reshape_coded_pivot_value[c][i] may indicate the value of the i-th pivot point for the c-th component. The number of bits used for the representation of the reshape_coded_pivot_value is BitDepthReshapeInputL for luma component and BitDepthReshapeInputC for chroma component. When not present, the value of reshape_coded_pivots_value[c][0] and reshape_coded_pivots_value[c][1] may be inferred based on video_full_range_flag.

The variable MaxReshapeOrder may be set equal to 2.

Syntax element poly_coef_int[c][i][j] may indicate an integer value of the i-th pivot point for the j-th order polynomial coefficient for component c. The value of poly_coef_int[c][i][j] may be in the range of −64 to 63, inclusive. The value of poly_coef_int[c][0][0] may be inferred to be 0 and the value of poly_coef_int[c][0][1] may be inferred to be 1, for example, when not present.

Syntax element poly_coef_frac[c][i][j] may indicate the fractional value of the i-th pivot point for the j-th order polynomial coefficient for component c. The values of poly_coef_frac[c][0][0] and poly_coef_frac[c][0][1] may be inferred to be 0, for example, when not present.

Variables PolyCoef[c][i][0] with c in the range of 0 to 2, inclusive, i in the range of 0 to reshape_num_pivots_minus2[c]+2, inclusive, may be derived, for example, according to Eq. (55):

$$PolyCoef[c][i][0]=((poly\_coef\_int[c][i][0]<<ReshapeOrder0\ Log\ 2Denom)+poly\_coef\_frac[c][i][0]) \qquad (55)$$

Variables PolyCoef[c][0][1] with c in the range of 0 to 2 may be derived, for example, according to Eq. (56):

$$PolyCoef[c][0][1]=((poly\_coef\_int[c][0][1]<<ReshapeOrder1\ Log\ 2Denom)+poly\_coef\_frac[c][0][1]) \qquad (56)$$

Variables PolyCoef[c][i][1] with c in the range of 0 to 2, inclusive, i in the range of 1 to reshape_num_pivots_minus2[c]+2, inclusive, may be derived, for example, according to Eq. (57):

$$PolyCoef[c][i][1]=((PolyCoef[c][i][0]-PolyCoef[c][i-1][0])<<(1+ReshapeOrder1\ Log\ 2Denom-ReshapeOrder0\ Log\ 2Denom))/(reshape\_coded\_pivot\_value[c][i]-reshape\_coded\_pivot\_value[c][i-1]))-PolyCoef[c][i-1][1] \qquad (57)$$

Variables PolyCoef[c][i][2] with c in the range of 0 to 2, inclusive, i in the range of 1 to reshape_num_pivots_minus2[c]+1, inclusive, may be derived, for example, according to Eq. (58):

$$PolyCoef[c][i][2]=((PolyCoef[c][i+1][1]-PolyCoef[c][i][1])<<(ReshapeOrder2\ Log\ 2Denom-ReshapeOrder1\ Log\ 2Denom-1)/(reshape\_coded\_pivot\_value[c][i]-reshape\_coded\_pivot\_value[c][i-1])) \qquad (58)$$

Syntax element reshape_pps_id may indicate the value of the referred pps_pic_parameter set id, which may have or may provide the reshaping information. The value of reshape_pps_id may be inferred to be 0, for example, when not present. A PPS with a reshape_pps_id may have a reshape_present_flag equal to 1.

A flag cb_enhancement_flag equal to 1 may indicate that cb_filter_coeff_plus32 [i], cb_scaling_factor_abs_minus1, cb_scaling_factor_sign, and cb_bit_shifting are present in the SEI message. A flag cb_enhancement_flag equal to 0 may specify that cb_filter_coeff_plus32 [i], cb_scaling_factor_abs_minus1, cb_scaling_factor_sign, and cb_bit_shifting are not present in the SEI message. A flag cb_enhancement_flag may be inferred to be equal to 0, for example, when not present.

A flag cr_enhancement_flag equal to 1 may indicate that cr_filter_coeff_plus32 [i], cr_scaling_factor_abs_minus1, cr_scaling_factor_sign, and cr_bit_shifting are present in the SEI message. A flag cr_enhancement_flag equal to 0 may specify that cr_filter_coeff_plus32 [i], cr_scaling_factor_abs_minus1, cr_scaling_factor_sign, and cr_bit_shifting are not present in the SEI message. A flag cr_enhancement_flag may be inferred to be equal to 0, for example, when not present.

Coefficient num_coeff_hori_minus1 plus one may indicate the number of coefficients in the horizontal direction of a chroma enhancement filter.

Coefficient num_coeff_verti_minus1 plus one may indicate the number of coefficients in the vertical direction of a chroma enhancement filter.

Filter coefficient cb_filter_coeff_plus32[j][i] minus 32 may indicate a filter coefficient of a high pass filter for a chroma component Cb at position (i, j). The value of cb_filter_coeff_plus32 [j][i] may be in the range of 0 to 63, inclusive. Filter coefficient cb_filter_coeff[j][i] may be derived according to Eq. (59), for example, when it is not the last coefficient in the raster scan order, where i is in the range [0, num_coeff_hori_minus1], and j is in the range [0, num_coeff_verti_minus]:

$$cb\_filter\_coeff[j][i] = cb\_filter\_coeff\_plus32[j][i] - 32 \quad (59)$$

Various examples of syntax and semantics may assume that a value of cb_filter_coeff[j][i] is in the range of [−32, 31].

The last coefficient cb_filter_coeff[num_coeff_verti_minus1][num_coeff_hori_minus1] may be derived, for example, according to Eq. (60):

$$cb\_filter\_coeff[num\_coeff\_verti\_minus1][num\_coeff\_hori\_minus1] = -(\Sigma_{j=0}^{num\_coeff\_verti\_minus1-1} \Sigma_{i=0}^{num\_coeff\_hori\_minus1} cb\_filter\_coeff[j][i]) - (\Sigma_{i=0}^{num\_coef\_hori\_minus1-1} cb\_filter\_coeff[num\_coeff\_verti\_minus1][i]) \quad (60)$$

Scaling factors cb_scaling_factor_abs_minus1 plus I and cb_scaling_factor_sign may indicate the value of variable CbScalingFactor, for example, according to Eq. (61):

$$Cb\text{ScalingFactor} = (1 - 2*cb\_scaling\_factor\_sign)*(cb\_scaling\_factor\_abs\_minus1 + 1) \quad (61)$$

The value of cb_scaling_factor_abs may be in the range of 1 to 1023, inclusive.

Syntax element cb_bit_shifting may indicate the number of bits to be right shifted after the scaling process, e.g., to enhance the chroma component Cb. The value of cb_bit_shifting may be in the range of 0 to 31, inclusive.

Filter coefficient cr_filter_coeff_plus32[j][i] minus 32 may indicate a filter coefficient of the high pass filter for the chroma component Cr at position (i,j). The value of cr_filter_coeff plus32 [j][i] may be in the range of 0 to 63, inclusive. Filter coefficient cr_filter_coeff[j][i] may be derived according to Eq. (62), for example, when it is not the last coefficient in the raster scan order, where i is in the range [0, num_coeff_hori_minus1] and j is in the range [0, num_coeff_verti_minus 1]:

$$cr\_filter\_coeff[j][i] = cr\_filter\_coeff\_plus32[j][i] - 32 \quad (62)$$

The last coefficient cr_filter_coeff[num_coeff_verti_minus1][num_coeff_hori_minus1] may be derived, for example, according to Eq. (63):

$$cr\_filter\_coeff[num\_coeff\_verti\_minus1][num\_coeff\_hori\_minus1] = -(\Sigma_{j=0}^{num\_coeff\_verti\_minus1-1} \Sigma_{i=0}^{num\_coeff\_hori\_minus1} cr\_filter\_coeff[j][i]) - (\Sigma_{i=0}^{num\_coeff\_hori\_minus1-1} cr\_filter\_coeff[num\_coeff\_verti\_minus1][i]) \quad (63)$$

Scaling factors cr_scaling_factor_abs_minus1 plus 1 and cr_scaling_factor_sign may indicate the value of variable CrScalingFactor, for example, according to Eq. (64):

$$Cr\text{ScalingFactor} = (1 - 2*cr\_scaling\_factor\_sign)*(cr\_scaling\_factor\_abs\_minus1 + 1) \quad (64)$$

The value of cr_scaling_factor_abs may be in the range of 1 to 1023, inclusive.

Syntax element cr_bit_shifting may indicate the number of bits to be right shifted after the scaling process to enhance the chroma component Cr. The value of cr_bit_shifting may be in the range of 0 to 31, inclusive.

An HDR reconstruction process may be specified and/or applied according to one or more examples described herein, for example, when an hdr_reconstruction_mode_flag is present.

An HDR reconstruction process may comprise, one or more functions, procedures or processes, such as, an HDR reshaping process, HDR color enhancement filtering, and an HDR color correction process. No order is implied unless expressly required.

HDR reshaping may be invoked with the reconstructed picture sample array $S_L$ and, when ChromaArrayType is not equal to 0, the arrays $S_{Cb}$ and $S_{Cr}$ as inputs, and the modified reconstructed picture sample array $S'_L$ and, when ChromaArrayType is not equal to 0, the arrays $S'_{Cb}$ and $S'_{Cr}$ after HDR reshaping as outputs.

In HDR reshaping, the array $S'_L$ and, when ChromaArrayType is not equal to 0, the arrays $S'_{Cb}$ and $S'_{Cr}$ may be assigned to the array $S_L$ and, when ChromaArrayType is not equal to 0, the arrays $S_{Cb}$ and $S_{Cr}$ (e.g., which represent the decoded picture), respectively.

The HDR chroma enhancement filter may be invoked with the reconstructed picture sample array $S_L$ and, when ChromaArrayType is not equal to 0, the arrays $S_{Cb}$ and $S_{Cr}$ as inputs, and the modified reconstructed picture sample array $S'_L$ and, when ChromaArrayType is not equal to 0, the arrays $S'_{Cb}$ and $S'_{Cr}$ after HDR reshaping as outputs.

In the HDR chroma enhancement filter, the array $S'_L$ and, when ChromaArrayType is not equal to 0, the arrays $S'_{Cb}$ and $S'_{Cr}$ may be assigned to the array $S_L$ and, when ChromaArrayType is not equal to 0, the arrays $S_{Cb}$ and $S_{Cr}$ (e.g., which represent the decoded picture), respectively.

When hdr_reconstruction_mode_flag is equal to 1, the HDR colour correction process may be invoked with the reconstructed picture sample array $S_L$ and, when ChromaArrayType is not equal to 0, the arrays $S_{Cb}$ and $S_{Cr}$ as inputs, and the modified reconstructed picture sample array $S'_L$ and, when ChromaArrayType is not equal to 0, the arrays $S'_{Cb}$ and $S'_{Cr}$ after HDR reshaping as outputs.

When hdr_reconstruction_mode_flag is equal to 1, the array $S'_L$ and, when ChromaArrayType is not equal to 0, the arrays $S'_{Cb}$ and $S'_{Cr}$ may be assigned to the array $S_L$ and, when ChromaArrayType is not equal to 0, the arrays $S_{Cb}$ and $S_{Cr}$ (e.g., which represent the decoded picture), respectively.

HDR reshaping may be invoked with a reconstructed picture sample array $S_L$ and the arrays $S_{Cb}$ and $S_{Cr}$ as inputs, for example, when ChromaArrayType is not equal to 0. HDR reshaping outputs may comprise the modified reconstructed picture sample array $S'_L$ and the arrays $S'_{Cb}$ and $S'_{Cr}$ after HDR reshaping, for example, when ChromaArrayType is not equal to 0.

The array $S'_L$ and, when ChromaArrayType is not equal to 0, the arrays $S'_{Cb}$ and $S'_{Cr}$ may be assigned to the array $S_L$ and, when ChromaArrayType is not equal to 0, the arrays $S_{Cb}$ and $S_{Cr}$ (e.g., which represent the decoded picture), respectively. An HDR chroma enhancement filter may be invoked with the reconstructed picture sample array $S_L$ and the arrays $S_{Cb}$ and $S_{Cr}$ as inputs, for example, when ChromaArrayType is not equal to 0. HDR reshaping outputs may comprise the modified reconstructed picture sample array $S'_L$ and the arrays $S'_{Cb}$ and $S'_{Cr}$ after HDR reshaping, for example, when ChromaArrayType is not equal to 0.

The array $S'_L$ and, when ChromaArrayType is not equal to 0, the arrays $S'_{Cb}$ and $S'_{Cr}$ may be assigned to the array $S_L$ and, when ChromaArrayType is not equal to 0, the arrays $S_{Cb}$ and $S_{Cr}$ (e.g., which represent the decoded picture), respectively.

An HDR color correction may be applied, for example, when a flag hdr_reconstruction_mode_flag is equal to 1. An HDR color correction may be invoked with the reconstructed picture sample array $S_L$ and the arrays $S_{Cb}$ and $S_{Cr}$ as inputs, for example, when ChromaArrayType is not equal to 0. HDR color correction outputs may comprise the modified reconstructed picture sample array $S'_L$ and the arrays $S'_{Cb}$ and $S'_{Cr}$ after HDR reshaping, for example, when ChromaArrayType is not equal to 0.

The array $S'_L$ and, when ChromaArrayType is not equal to 0, the arrays $S'_{Cb}$ and $S'_{Cr}$ may be assigned to the array $S_L$ and, when ChromaArrayType is not equal to 0, the arrays $S_{Cb}$, and $S_{Cr}$ (e.g., which represent the decoded picture), respectively.

HDR reshaping inputs may comprise the reconstructed picture sample array prior to HDR reshaping process recPicture$_L$. The arrays recPicture$_{Cb}$ and recPicture$_{Cr}$ may be HDR reshaping inputs, for example, when ChromaArrayType is not equal to 0. HDR reshaping outputs may include the modified reconstructed picture sample array after HDR reshaping process reshapePicture$_L$. The arrays reshapePicture$_{Cb}$ and reshapePicture$_{Cr}$ may be HDR reshaping outputs, for example, when ChromaArrayType is not equal to 0.

The sample values in the modified reconstructed picture sample array reshapePicture$_L$ and, when ChromaArrayType is not equal to 0, the arrays reshapePicture$_{Cb}$ and reshapePicture$_{Cr}$ may be initially set equal to the sample values in the reconstructed picture sample array recPicture$_L$ and, when ChromaArrayType is not equal to 0, the arrays recPicture$_{Cb}$ and recPicture$_{Cr}$, respectively.

A reshaped luma sample reshapePicture$_L$[xP][yP] with xP=0 . . . PicWidthInSamplesY−1, yP=0 . . . PicHeightInSamplesY−1 may be derived, for example, by invoking an hdr reshaping process of luma sample values with luma sample location (xP, yP), sample arrays recPicture$_L$ as inputs.

A reshaped chroma sample reshapePicture$_{Cb}$[xC][yC] with xC=0 . . . PicWidthInSamplesC−1, yC=0 . . . PicHeightInSamplesC−1 may be derived, for example, by invoking the hdr reshaping process of chroma sample values with chroma sample location (xC, yC), sample arrays recPicture$_{Cb}$ as inputs.

A reshaped chroma sample reshapePicture$_{Cr}$[xC][yC] with xC=0 . . . PicWidthInSamplesC−1, yC=0 . . . PicHeightInSamplesC−1 may be derived, for example, by invoking the hdr reshaping process of chroma sample values with chroma sample location (xC, yC), sample arrays recPicture$_{Cr}$ as inputs.

Inputs to an HDR reshaping process of luma sample values may be a luma location (xP, yP) specifying the luma sample location relative to the top-left luma sample of the current picture. Outputs of an HDR reshaping process of luma sample values may be an hdr reshaped luma sample value reshapeLumaSample.

The value of reshapeLumaSample may be derived, for example, by: (i) deriving the variables idxL, e.g., by invoking the identification of a piece-wise function index with the input of sample value recPicture$_L$[xP][yP] for component 0 and (ii) deriving the value of reshapeLumaSample, e.g., according to Eq. (65), as simplified by Eq. (66):

$$\text{reshapeLumaSample} = ((\text{PolyCoef}[0][idxL][0] << (\text{ReshapeOrder2 Log 2Denom} - \text{ReshapeOrder0 Log 2Denom}) + (\text{PolyCoef}[0][idxL][1] * (\text{recPicture}_L[xP][yP] - \text{reshape\_coded\_pivot\_value}[0][idxL])) << \text{ReshapeOrder2 Log 2Denom} - \text{ReshapeOrder1 Log 2Denom}) + (\text{PolyCoef}[0][idxL][2] * (\text{recPicture}_L[xP][yP] - \text{reshape\_coded\_pivot\_value}[0][idxL]) * (\text{recPicture}_L[xP][yP] - \text{reshape\_coded\_pivot\_value}[0][idxL]) + (1 << (\text{ReshapeOrder2 Log 2Denom} - 1))) >> \text{ReshapeOrder2 Log 2Denom} \quad (65)$$

$$\text{reshapeLumaSample} = \text{Clip3}(0, (1 << \text{BitDepthReshapeOutput}L) - 1, \text{reshapeLumaSample}) \quad (66)$$

HDR reshaping of chroma sample values may have inputs of a luma location (xP$_C$, yP$_C$) specifying the chroma sample location relative to the top-left chroma sample of the current picture and a variable cIdx specifying the chroma component index. Outputs of the HDR reshaping of chroma sample values may include an hdr reshaped chroma sample value reshapeChromaSample.

Parameter recPicture$_C$ may be set equal to recPicture$_{Cb}$, for example, when cIdx is equal to 0 and set equal to recPicture$_{Cr}$ otherwise.

The value of reshapeChromaSample may be derived, for example, by: (i) deriving the variables idxC, e.g., by invoking the identification of piece-wise function index with the input of sample value recPicture$_C$[xP][yP] for component cIdx+1 and (ii) deriving the value of reshapeChromaSample, e.g., according to Eq. (67), as simplified by Eq. (68):

$$\text{reshapeChromaSample} = ((\text{PolyCoef}[cIdx+1][idxC][0] << (\text{ReshapeOrder2 Log 2Denom} - \text{ReshapeOrder0 Log 2Denom}) + (\text{PolyCoef}[cIdx+1][idxC][1] * (\text{recPicture}_C[xP][yP] - \text{reshape\_coded\_pivot\_value}[cIdx+1][idxC])) << \text{ReshapeOrder2 Log 2Denom} - \text{ReshapeOrder1 Log 2Denom}) + (\text{PolyCoef}[cIdx+1][idxC][2] * (\text{recPicture}_C[xP][yP] - \text{reshape\_coded\_pivot\_value}[cIdx+1][idxC]) * (\text{recPicture}_C[xP][yP] - \text{reshape\_coded\_pivot\_value}[cIdx+1][idxC]) + (1 << (\text{ReshapeOrder2 Log 2Denom} - 1))) >> \text{ReshapeOrder2 Log 2Denom} \quad (67)$$

$$\text{reshapeChromaSample} = \text{Clip3}(0, (1 << \text{BitDepthReshapeOutput}C) - 1, \text{reshapeChromaSample}) \quad (68)$$

Input to identification of a piecewise function index may be a sample value S for component c. Output of identification of a piecewise function index may be an index idxS of piecewise function. The variable idxS may be derived, for example, according to the following logic:

```
if( ( S < reshape_coded_pivot_value[ c ][ 0 ] )
    S = reshape_coded_pivot_value[ c ][ 0 ]
else if(S < reshape_coded_pivot_value[ c ]
[ reshape_num_pivots_minus2 + 1] )
    S = reshape_coded_pivot_value[ c ][
    reshape_num_pivots_minus2 + 1]
```

-continued

```
for( idxS = 0, idxFound = 0; idxS < reshape_num_pivots_minus2 + 1;
idxS++ ) {
        if( S < reshape_coded_pivot_value[ c ][idxS + 1] ) {
            idxFound = 1
            break
        }
}
if( ! idxFound)
        idxS = idxS - 1
```

HDR color enhancement filter inputs may include the modified reconstructed picture sample array after HDR reshaping process reshapePicture$_L$. Arrays reshapePicture$_{Cb}$ and reshapePicture$_{Cr}$ may be inputs to an HDR color enhancement filter, for example, when ChromaArrayType is not equal to 0. Inputs to an HDR color enhancement filter may include, but are not limited to: FilterHeight, FilterWidth, ScaleHorizontal, ScaleVertical, CbFilterCoefficient array, and CrFilterCoefficient arraysm CbScalingFactor and cb_bit_shift, CrScalingFactor, and/or cr_bit_shift.

HDR color enhancement filter outputs may include the modified reconstructed picture sample arrays after color enhancement enhPictureCb and enhPictureCr.

For example, the following may be performed:

end=FilterHeight>>1 start$V$=1−FilterHeight+end$V$ end$H$=FilterWidth>>1 start$H$=1−FilterWidth+end$H$

For a (e.g., each) chroma location (x,y) and a (e.g., each) color plane (Cb or Cr), a correction signal o(x,y) may be derived, for example, according to Eq. (69):

$$z(x, y) = \sum_{j=startV}^{endV} \sum_{i=startH}^{endH} (Ch\_filter\_coef[(j - StartV)][(i - StartH)]) \times \quad (69)$$
$$Y(ScaleX \times x + i, ScaleY \times y + j)$$
$$t(x, y) = z(x, y)*ChScalingFactor$$
$$o(x, y) =$$
$$Sign(t(x, y))*((abs(t(x, y)) + (1 << (ch\_bit\_shifting- 1)))$$
$$>> ch\_bit\_shifting)$$

A corrected chroma value may be determined, for example, according to Eq. (70):

$$Ch_{enh}(x,y)=Clip3(0,(1<<BitDepth_C)-1,Ch(x,y)+o(x,y),) \quad (70)$$

An HDR color correction process may use syntax element colour_primaries indicating chromaticity coordinates of source primaries, e.g., as specified in Table 14 in terms of the CIE 1931 definition of x and y as specified in ISO 11664-1.

TABLE 14

Example of Color primaries

| Value | Primaries | | | Remark |
|---|---|---|---|---|
| 0 | Reserved | | | |
| 1 | primary | x | y | Rec. ITU-R BT.709-5 |
| | green | 0.300 | 0.600 | Rec. ITU-R BT.1361 conventional colour |
| | blue | 0.150 | 0.060 | gamut system and extended colour gamut |
| | red | 0.640 | 0.330 | system |
| | white D65 | 0.3127 | 0.3290 | IEC 61966-2-1 (sRGB or sYCC) |
| | | | | IEC 61966-2-4 |
| | | | | Society of Motion Picture and Television |
| | | | | Engineers RP 177 (1993) Annex B |
| 2 | Unspecified | | | Image characteristics may be unknown or |
| | | | | determined by the application. |
| 3 | Reserved | | | |
| 4 | primary | x | y | Rec. ITU-R BT.470-6 System M (historical) |
| | green | 0.21 | 0.71 | United States National Television System |
| | blue | 0.14 | 0.08 | Committee 1953 Recommendation for |
| | red | 0.67 | 0.33 | transmission standards for colour television |
| | white C | 0.310 | 0.316 | United States Federal Communications |
| | | | | Commission Title 47 Code of Federal |
| | | | | Regulations (2003) 73.682 (a) (20) |
| 5 | primary | x | y | Rec. ITU-R BT.470-6 System B, G |
| | green | 0.29 | 0.60 | (historical) |
| | blue | 0.15 | 0.06 | Rec. ITU-R BT.601-6 625 |
| | red | 0.64 | 0.33 | Rec. ITU-R BT.1358 625 |
| | white D65 | 0.3127 | 0.3290 | Rec. ITU-R BT.1700 625 PAL and 625 |
| | | | | SECAM |
| 6 | primary | x | y | Rec. ITU-R BT.601-6 525 |
| | green | 0.310 | 0.595 | Rec. ITU-R BT.1358 525 |
| | blue | 0.155 | 0.070 | Rec. ITU-R BT.1700 NTSC |
| | red | 0.630 | 0.340 | Society of Motion Picture and Television |
| | white D65 | 0.3127 | 0.3290 | Engineers 170M (2004) |
| 7 | primary | x | y | Society of Motion Picture and Television |
| | green | 0.310 | 0.595 | Engineers 240M (1999) |
| | blue | 0.155 | 0.070 | |
| | red | 0.630 | 0.340 | |
| | white D65 | 0.3127 | 0.3290 | |
| 8 | primary | x | y | Generic film (colour filters using Illuminant |
| | green | 0.243 | 0.692 (Wratten 58) | C) |
| | blue | 0.145 | 0.049 (Wratten 47) | |
| | red | 0.681 | 0.319 (Wratten 25) | |
| | white C | 0.310 | 0.316 | |

TABLE 14-continued

Example of Color primaries

| Value | Primaries | | | Remark |
|---|---|---|---|---|
| 9 | primary | x | y | Rec. ITU-R BT.2020 |
| | green | 0.170 | 0.797 | |
| | blue | 0.131 | 0.046 | |
| | red | 0.708 | 0.292 | |
| | white D65 | 0.3127 | 0.3290 | |
| 10 | primary | x | y | Society of Motion Picture and Television |
| | green (Y) | 0.0 | 1.0 | Engineers ST 428-1 |
| | blue (Z) | 0.0 | 0.0 | (CIE 1931 XYZ) |
| | red (X) | 1.0 | 0.0 | |
| | centre white | 1 ÷ 3 | 1 ÷ 3 | |
| 11 | primary | x | y | Society of Motion Picture and Television |
| | green | 0.265 | 0.690 | Engineers RP 431-2 (2011) |
| | blue | 0.150 | 0.060 | |
| | red | 0.680 | 0.320 | |
| | white | 0.314 | 0.351 | |
| 12 | primary | x | y | Society of Motion Picture and Television |
| | green | 0.265 | 0.690 | Engineers EG 432-1 (2010) |
| | blue | 0.150 | 0.060 | |
| | red | 0.680 | 0.320 | |
| | white D65 | 0.3127 | 0.3290 | |
| 13 | primary | x | y | LMS |
| | green | 1.907 | −0.978 | |
| | blue | 0.153 | −0.034 | |
| | red | 0.868 | 0.153 | |
| | white D65 | 0.3127 | 0.3290 | |
| 14 ... 21 | Reserved | | | |
| 22 | primary | x | y | EBU Tech. 3213-E (1975) |
| | green | 0.295 | 0.605 | |
| | blue | 0.155 | 0.077 | |
| | red | 0.630 | 0.340 | |
| | white D65 | 0.3127 | 0.3290 | |
| 23 ... 255 | Reserved | | | |

In an example, the value of colour_primaries may be inferred to be equal to 2 (e.g., indicating that chromaticity may be unspecified or determined by the application), for example, when the colour_primaries syntax element is not present. Decoders (e.g., decoding devices) may interpret reserved values of colour_primaries as equivalent to the value 2.

Conversion from an XYZ to LMS matrix (e.g., for LMS colour primaries) may be described, for example, according to the set of equations in Eq. (71):

$$E_L = 0.3592 * Ex + 0.6976 * E_Y - 0.0358 * E_Z$$

$$E_M = -0.1922 * Ex + 1.1004 * E_Y + 0.0755 * E_Z$$

$$E_S = 0.0070 * Ex + 0.0749 * E_Y + 0.8434 * E_Z \quad (71)$$

Syntax element matrix_coeffs may describe matrix coefficients used in deriving luma and chroma signals from green, blue, and red; or Y, Z, and X; or M, S, and L primaries, for example, as specified in Table 15.

TABLE 15

Example of matrix coefficients

| Value | Matrix | Remark |
|---|---|---|
| 0 | Identity | The identity matrix. |
| | | used for GBR (a/k/a RGB); may also be used for YZX (a/k/a XYZ); |
| | | IEC 61966-2-1 (sRGB) |
| | | Society of Motion Picture and Television Engineers ST 428-1 |
| 1 | $K_R = 0.2126$; $K_B = 0.0722$ | ITU-R Rec. BT.709-5 |
| | | ITU-R Rec. BT.136.1 conventional colour gamut system and extended colour gamut system |
| | | IEC 61966-2-1 (sYCC) |
| | | IEC 61966-2-4 xvYCC$_{709}$ |
| | | Society of Motion Picture and Television Engineers RP 177 (1993) Annex B |
| 2 | Unspecified | Image characteristics are unknown or are determined by the application. |
| 3 | Reserved | |
| 4 | $K_R = 0.30$; $K_B = 0.11$ | United States Federal Communications Commission Title 47 Code of Federal Regulations (2003) 73.682 (a) (20) |
| 5 | $K_R = 0.299$; $K_B = 0.114$ | ITU-R Rec. BT.470-6 System B, G (historical) |
| | | ITU-R Rec. BT.601-6 625 |
| | | ITU-R Rec. BT.1358 625 |

TABLE 15-continued

Example of matrix coefficients

| Value | Matrix | Remark |
|---|---|---|
| 6 | $K_R = 0.299$; $K_B = 0.114$ | ITU-R Rec. BT.1700 625 PAL and 625 SECAM<br>IEC 61966-2-4 xvYCC$_{601}$<br>ITU-R Rec. BT.601-6 525<br>ITU-R Rec. BT.1358 525<br>ITU-R Rec. BT.1700 NTSC<br>Society of Motion Picture and Television Engineers 170M (2004) |
| 7 | $K_R = 0.212$; $K_B = 0.087$ | Society of Motion Picture and Television Engineers 240M (1999) |
| 8 | YCgCo | See Eq. 79-80i |
| 9 | $K_R = 0.2627$; $K_B = 0.0593$ | Rec. ITU-R BT.2020 non-constant luminance system<br>See Eq. 77 |
| 10 | $K_R = 0.2627$; $K_B = 0.0593$ | Rec. ITU-R BT.2020 constant luminance system<br>See Eq. 81-83 |
| 11 | Y'D'$_Z$D'$_X$ | Society of Motion Picture and Television Engineers ST 2085 (2015)<br>See Eq. 84 |
| 12 | IPT | See Eq. 85 |
| 13 ... 255 | Reserved | |

Syntax element matrix_coeffs may be equal to 0, for example, when one or more conditions are true, such as (i) BitDepth$_C$ is equal to BitDepth$_Y$ or (ii) chroma_format_idc is equal to 3 (4:4:4). Syntax element matrix_coeffs may be equal to 0 under other conditions.

Syntax element matrix_coeffs may be equal to 8, for example, when one or more conditions are true, such as: (i) BitDepth$_C$ is equal to BitDepth$_Y$ or (ii) BitDepth$_C$ is equal to BitDepth$_Y$+1 and chroma_format_idc is equal to 3 (4:4:4). Syntax element matrix_coeffs may be equal to 8 under other conditions.

The value of matrix_coeffs may be inferred to be equal to 2 (e.g., unspecified), for example, when the matrix_coeffs syntax element is not present.

Interpretations of matrix_coeffs together with colour_primaries and transfer_characteristics may be indicated by one or more equations described herein.

Symbols R, G, and B may be substituted for X, Y, and Z, respectively, in Eq. 72, 74, 76 and 78, for example, when matrix_coeffs is equal to 0, for YZX representation.

Symbols R, G, and B may be substituted for L, M, and S, respectively, in Eq. 73, 75 and 85, for example, when matrix_coeffs is equal to 12, for IPT representation.

$E_R$, $E_G$, and $E_B$ may be defined as "linear-domain" real-valued signals, e.g., based on the indicated colour primaries before application of the transfer characteristics function. Application of a transfer characteristics function may be denoted by (x)' for an argument x. Signals $E'_R$, $E'_G$, and $E'_B$ may be determined by application of the transfer characteristics function, for example, according to Eq. (72):

$$E'_R = (E_R)'$$

$$E'_G = (E_G)'$$

$$E'_B = (E_B)' \quad (72)$$

The range of $E'_R$, $E'_G$, and $E'_B$ may be specified as follows. $E'_R$, $E'_G$, and $E'_B$ may be real numbers with values in the range of 0 to 1 inclusive, for example, when transfer_characteristics are not equal to 11 or 12. $E'_R$, $E'_G$ and $E'_B$ may be real numbers with a larger range, for example, when otherwise, (e.g., transfer_characteristics is equal to 11 or 12).

Nominal white may be specified as having $E'_R$ equal to 1, $E'_G$ equal to 1, and $E'_B$ equal to 1. Nominal black may be specified as having $E'_R$ equal to 0, $E'_G$ equal to 0, and $E'_B$ equal to 0.

The interpretation of matrix_coeffs may be specified as follows, for example, when Flag video_full_range_flag is equal to 0: (i) Set of equations in Eq. (73) may be applied when matrix_coeffs is equal to 1, 4, 5, 6, 7, 9, 10, or 11, or 12, (ii) set of equations in Eq. (74) may be applied when matrix_coeffs is equal to 0 or 8, (iii) interpretation of matrix_coeffs syntax element may be unknown or determined by the application when matrix_coeffs is equal to 2, (iv) interpretation of matrix_coeffs syntax element may be reserved when otherwise (e.g. matrix_coeffs is not equal to 0, 1, 2, 4, 5, 6, 7, 8, 9, 10, or 11, or 12):

$$Y = \text{Clip1}_Y(\text{Round}((1<<(\text{BitDepth}_Y-8))*(219*E'_Y+16)))$$

$$Cb = \text{Clip1}_C(\text{Round}((1<<(\text{BitDepth}_C-8))*(224*E'_{PB}+128)))$$

$$Cr = \text{Clip1}_C(\text{Round}((1<<(\text{BitDepth}_C-8))*(224*E'_{PR}+128))) \quad (73)$$

$$R = \text{Clip1}_Y((1<<(\text{BitDepth}_Y-8))*(219*E'_R+16))$$

$$G = \text{Clip1}_Y((1<<(\text{BitDepth}_Y-8))*(219*E'_G+16))$$

$$B = \text{Clip1}_Y((1<<(\text{BitDepth}_Y-8))*(219*E'_B+16)) \quad (74)$$

The interpretation of matrix_coeffs may be specified as follows, for example, when Flag video_full_range_flag is equal to 1: (i) set of equations in Eq. (75) may be applied when matrix_coeffs is equal to 1, 4, 5, 6, 7, 9, 10, or 11, or 12, (ii) set of equations in Eq. (76) may be applied when matrix_coeffs is equal to 0 or 8, (iii) interpretation of matrix_coeffs syntax element may be unknown or determined by the application when matrix_coeffs is equal to 2, (iv) interpretation of matrix_coeffs syntax element may be reserved when otherwise (e.g., matrix_coeffs is not equal to 0, 1, 2, 4, 5, 6, 7, 8, 9, 10, or 11, or 12):

$$Y = \text{Clip1}_Y(\text{Round}(((1<<\text{BitDepth}_Y)-1)*E'_Y))$$

$$Cb = \text{Clip1}_C(\text{Round}(((1<<\text{BitDepth}_C)-1)*E'_{PB}+(1<<(\text{BitDepth}_C-1))))$$

$$Cr = \text{Clip1}_C(\text{Round}(((1<<\text{BitDepth}_C)-1)*E'_{PR}+(1<<(\text{BitDepth}_C-1)))) \quad (75)$$

$$R = \text{Clip1}_Y(((1<<\text{BitDepth}_Y)-1)*E'_R)$$

$$G = \text{Clip1}_Y(((1<<\text{BitDepth}_Y)-1)*E'_G)$$

$$B = \text{Clip1}_Y(((1<<\text{BitDepth}_Y)-1)*E'_B) \quad (76)$$

Reserved values for matrix_coeffs may not be present in bitstreams. Decoders (e.g., decoding devices) may interpret reserved values of matrix_coeffs as equivalent to the value 2.

Variables $E'_Y$, $E'_{PB}$, and $E'_{PR}$ (e.g., for matrix_coeffs not equal to 0 or 8) or Y, Cb, and Cr (e.g. for matrix_coeffs equal to 0 or 8) may be specified as follows: (i) set of equations in Eq. (77) may be applied when matrix_coeffs is not equal to 0, 8, 10, or 11, or 12, (ii) set of equations in Eq. (78) may be applied when matrix_coeffs is equal to 0, (iii) set of equations in Eq. (79) may be applied when matrix_coeffs is equal to 8 and $BitDepth_C$ is equal to $BitDepth_Y$, (iv) set of equations in Eq. (80) may be applied when matrix_coeffs is equal to 8 and $BitDepth_C$ is not equal to $BitDepth_Y$, (v) signal $E'_Y$ may be determined by application of the transfer characteristics function in Eq. (81) and signals $E'_{PB}$ and $E'_{PR}$ may be determined based on Eq. (82) and (83) when matrix_coeffs is equal to 10, (vi) set of equations in Eq. (84) may be applied when matrix_coeffs is equal to 11 and (vii) set of equations in Eq. (85) may be applied when matrix_coeffs is equal to 12.

$$E'_Y = K_R * E'_R + (1 - K_R - K_B) * E'_G + K_B * E'_B$$

$$E'_{PB} = 0.5 * (E'_B - E'_Y) \div (1 - K_B)$$

$$E'_{PR} = 0.5 * (E'_R - E'_Y) \div (1 - K_R) \quad (77)$$

where $E'_Y$ may be a real number with the value 0 associated with nominal black and the value 1 associated with nominal white. $E'_{PB}$ and $E'_{PR}$ may be real numbers with the value 0 associated with nominal black and nominal white. $E'_Y$ may be a real number with values in the range of 0 to 1 inclusive, for example, when transfer_characteristics is not equal to 11 or 12. $E'_{PB}$ and $E'_{PR}$ may be real numbers with values in the range of −0.5 to 0.5 inclusive, for example, when transfer_characteristics is not equal to 11 or 12. $E'_Y$, $E'_{PB}$ and $E'_{PR}$ may be real numbers with a larger range, for example, when transfer_characteristics is equal to 11 or 12.

$$Y = \text{Round}(G)$$

$$Cb = \text{Round}(B)$$

$$Cr = \text{Round}(R) \quad (78)$$

$$Y = \text{Round}(0.5*G + 0.25*(R+B))$$

$$Cb = \text{Round}(0.5*G - 0.25*(R+B)) + (1 << (BitDepth_C - 1))$$

$$Cr = \text{Round}(0.5*(R-B)) + (1 << (BitDepth_C - 1)) \quad (79)$$

where Cb and Cr of Eq. (79) may be referred to as Cg and Co, respectively, e.g., for purposes of the YCgCo nomenclature used in Table 15. The inverse conversion for Eq. (79) may be calculated, for example, according to Eq. (79i):

$$t = Y - (Cb - (1 << (BitDepth_C - 1)))$$

$$G = \text{Clip1}_Y(Y + (Cb - (1 << (BitDepth_C - 1))))$$

$$B = \text{Clip1}_Y(t - (Cr - (1 << (BitDepth_C - 1))))$$

$$R = \text{Clip1}_Y(t + (Cr - (1 << (BitDepth_C - 1)))) \quad (79i)$$

$$Cr = \text{Round}(R) - \text{Round}(B) + (1 << (BitDepth_C - 1))$$

$$t = \text{Round}(B) + ((Cr - (1 << (BitDepth_C - 1))) >> 1)$$

$$Cb = \text{Round}(G) - t + (1 << (BitDepth_C - 1))$$

$$Y = t + ((Cb - (1 << (BitDepth_C - 1))) >> 1) \quad (80)$$

where Cb and Cr of Eq. (80) may be referred to as Cg and Co, respectively, e.g., for purposes of the YCgCo nomenclature used in Table 15. The inverse conversion for Eq. (80) may be calculated, for example, according to Eq. (80i):

$$t = Y - ((Cb - (1 << (BitDepth_C - 1))) >> 1)$$

$$G = \text{Clip1}_Y(t + (Cb - (1 << (BitDepth_C - 1))))$$

$$B = \text{Clip1}_Y(t - ((Cr - (1 << (BitDepth_C - 1))) >> 1))$$

$$R = \text{Clip1}_Y(B + (Cr - (1 << (BitDepth_C - 1)))) \quad (80i)$$

$$E_Y = K_R * E_R + (1 - K_R - K_B) * E_G + K_B * E_B$$

$$E'_Y = (E_Y)' \quad (81)$$

where $E_y$ may be defined from "linear-domain" signals for $E_R$, $E_G$, and $E_B$, for example, prior to application of the transfer characteristics function, which may be applied to produce the signal $E'_Y$. $E_Y$ and $E'_Y$ may be analog, with the value 0 associated with nominal black and the value 1 associated with nominal white.

$$E'_{PB} = (E'_B - E'_Y) \div (2*N_B) \text{ for } -N_B <= E'_B - E'_Y <= 0$$

$$E'_{PB} = (E'_B - E'_Y) \div (2*P_B) \text{ for } 0 < E'_B - E'_Y <= P_B$$

$$E'_R = (E'_R - E'_Y) \div (2*N_R) \text{ for } -N_R <= E'_R - E'_Y <= 0$$

$$E'_{PR} = (E'_R - E'_Y) \div (2*P_R) \text{ for } 0 < E'_R - E'_Y <= P_R \quad (82)$$

where constants $N_B$, $P_B$, $N_R$, and $P_R$ may be determined, for example, by application of transfer characteristics function to expressions involving the constants $K_B$ and $K_R$, for example, according to Eq. (83):

$$N_B = (1 - K_B)'$$

$$P_B = 1 - (K_B)'$$

$$N_R = (1 - K_R)'$$

$$P_R = 1 - (K_R)' \quad (83)$$

$$E'_Y = E'_G$$

$$E'_{PB} = 0.5 * (0.986566 * E'_B - E'_Y)$$

$$E'_{PR} = 0.5 * (E'_R - 0.991902 * E'_Y) \quad (84)$$

where $E'_{PB}$ may be referred to as $D'_Z$ and $E'_{PR}$ may be referred to as $D'_X$.

$$E' = 0.5 * E'_R + 0.5 * E'_G$$

$$E'_{PB} = 1.6137 * E' - 3.3234 * E'_G + 1.7097 * E'_B$$

$$E'_{PR} = 4.3781 * E'_R - 4.2455 * E'_G - 0.1325 * E'_B \quad (85)$$

where $E'_R$ $E'_Y$ may be referred as I', $E'_{PB}$ may be referred to as P', and $E'_{PR}$ may be referred to as T'.

With respect to a piecewise linear solution, it may be desirable to have zeroth order continuity. Either or both of the terms "reshaping" and "dynamic range adjustment" may be used in the descriptions herein to the extent that both processes may describe modification of HDR video data prior to encoding and/or inversion of the modification following reconstruction at a decoder.

A set of parameters sufficient to describe the piecewise curve may be used to, for example, describe the segments and/or the parameters of each piece. One or more indicators (e.g., flags) may be signaled to indicate properties of the segments such as the use of uniform partitioning with substantially equal size segments. A number of segments may be indicated (e.g., when they are not uniform). One or more flags may be used to indicate that one or more segment lengths are powers of two. Segment length(s) may be signaled. A last segment length may be derived from the component bit depth and/or length of other segments. The derived value of the last segment length may be a power of two when, for example, the power of two flag is set. A flag per component may be used to signal the smoothness of the curve. For instance, when the smoothness flag is false, a piecewise linear continuous curve may be produced by signaling the values at a (e.g., each) segment endpoint; when the smoothness flag is true, a piecewise quadratic model may be used to improve first order smoothness. The value at a (e.g., each) segment endpoint may be signaled along with one or more additional slope values.

A specification (e.g., full specification) of the piecewise curve may be derived, for example, from the set of sufficient parameters described herein. Derivation of segment lengths may be provided, for example, depending upon flags for uniform segment sizes and/or power of two segment sizes. Values may be derived for the polynomial coefficients using, for example, the value of the smoothness flag. For example, when the smoothness flag is zero, the value of the slope parameter on a (e.g., each) segment may be computed from the values at the endpoints and the segment lengths; when the smoothness flag is one, the value of slope parameter may be derived, for example, recursively from the first value and the constant values at a (e.g., each) segment endpoint. The quadratic term at a (e.g., each) segment may be derived from the slope values on either end of the segment.

A piecewise model (e.g., inverse reshaping model) may be applied in various ways. A segment index may be derived from the description of segments and/or a given value x which may be indicated. The segment index may be determined and the value of the piecewise curve may be defined in a fixed point representation.

The determination of parameters from a desired curve may vary. Interpolation may focus on exact or near exact fit to selected points. An algorithm for minimum mean square error fitting may be used that may be subject to continuity constraints. For instance, interpolation may include determining a relevant segment of the curve and/or determining parameters to apply based on the segment determination. A matrix M relating the signaled parameters to the full interpolation LUT may be produced, for example, when given the segment locations. The solution may be then given, for example, by inverse transpose ((M)*M0*transpose(M)*Y), where Y is the desired LUT to approximate. The derivation of matrix M may include the constraints of continuity and smoothness so that the solution may include the smooth curve with minimal mean square error in approximation. One or more strategies for determining segment locations may be used such as uniform partitioning of the x values, or the y values, for example. The segment lengths may be restricted to be powers of 2.

Table 16 provides an example of hdr_reshape_pps_table syntax.

TABLE 16

Example of hdr_reshape_pps_table syntax

| | Descriptor |
|---|---|
| hdr_reshape_pps_table( ) { | |
|   for( c = 0; c < 3; c++ ) { | |
|     uniform_segments_flag[c] | u(1) |
|     power_of_2_segment_length_flag[c] | u(1) |
|     if(power_of_2_segment_length_flag [c]) { | |
|       if(uniform_segments_flag[c]) { | |
|         log2_uniform_segment_length[c][0] | ue(v) |
|       } else { | |
|         number_segments[c] | ue(v) |
|         for( i = 0; i < number_segments[c]−2; i++ ) { | |
|           log2_segment_length[c][i] | ue(v) |
|         } | |
|     } else { | |
|       if(unifom_segments_flag[c]) { | |
|         uniform_segment_length[c] | ue(v) |
|       } else { | |
|         number_segments[c] | ue(v) |
|         for( i = 0; i < number_segments[c]−2; i++ ) { | |
|           segment_length[c][i] | ue(v) |
|         } | |
|     } | |
|     smoothness_flag[c] | u(1) |
|     coeff_log2_offset_minus1[c] | ue(v) |
|     for( i = 0; i < number_segments[c]; i++ ) { | |
|       poly_coef_int[ c ][ i ] [0 ] | ue(v) |
|       poly_coef_frac[ c ][ i ][0 ] | u(v) |
|     } | |
|     if(smoothness_flag [c]) { | |
|       poly_coef_int[ c ][0 ] [1 ] | ue(v) |
|       poly_coef_frac[ c ][ 0 ][1 ] | u(v) |
|     } | |
|   } | |
| } | |

A uniform_segments_flag[c] indicator may be provided for a component. The uniform_segments_flag[c] indicator may indicate if all segments for the component have equal length.

A power_of_2_segment_length_flag[c] indicator may be provided for a component. The power_of_2_segment_length_flag[c] indicator may indicate if one or more segments have a length that is a power of 2.

Syntax element log 2_uniform_segment_length[c] may specify the log 2 length of the segments for component c in the range 0 to 2 inclusive and for i in the range 0 to number_segments[c]−2 inclusive.

Syntax element uniform_segment_length[c] may specify the length of the segments for component c in the range 0 to 2 inclusive and for i in the range 0 to number_segments[c]−2 inclusive.

If uniform_segments_flag[c] is 1, variable UniformSegmentLength[c] may be defined for c in the range 0 to 2 inclusive as follows, for example:

If power_of_2_segment_length_flag[c] is 1, UniformSegmentLength[c]=1<<log 2_uniform_segment_length [c].

Otherwise (e.g. power_of_2_segment_length_flag[c] is 0), UniformSegmentLength[c]=uniform_segment_length[c].

A syntax element number_segments[c] may specify the number of segments used to model the curve for component c.

Variable BitDepth[c] may be defined for c in the range 0 to 2 inclusive. If c=0, then BitDepth[0]=8+bit_depth_luma_minus8. Otherwise, c>0 and BitDepth[c]=8+bit_depth_ chroma_minus8. Variable NumberOfSegments[c] for c in the range 0 to 2 inclusive may be defined as follows:

If uniform_segments_flag[c] is 1, NumberOfSegments[c]= (1<<BitDepth[c]+UniformSegmentLength[c]−1)/UniformSegmentLength[c];

If uniform_segments_flag[c] is 0, NumberOfSegments[c] =number_segments[c].

Syntax element log 2_segment_length[c][i] may specify the log 2 length of the ith segment for component c in the range 0 to 2 inclusive and for i in the range 0 to number_segments[c]−2 inclusive.

Syntax element segment_length[c][i] may specify the length of the ith segment for component c for c in the range 0 to 2 inclusive and for i in the range 0 to number_segments [c]−2 inclusive.

Variable SegmentLength[c][i] may be defined for i in the range 0 to number_segments[c]−1 inclusive and c in the range 0 to 2 inclusive, as follows. If uniform_segments_flag [c] is 1 then SegmentLength[c][i]=UniformSegmentLength [c]. If uniform_segments_flag[c] is 0 and power_of_2_segment_length_flag[c] is 1 then SegmentLength[c][i]=1<<log 2_segment_length[c][i] for i in the range 0 to number_segments[c]−2 inclusive. SegmentLength[c][number_segments[c]−1] may be the smallest power of 2 which gives a sum of lengths greater than or equal to (1<<BitDepth[c]). If uniform_segments_flag[c] is 0 and power of 2_segment_length_flag[c] is 0 then SegmentLength[c][i]=segment_length[c][i] for i in the range 0 to number_segments[c]−2 inclusive. SegmentLength[c] [number_segments[c]−1] equals (1<<BitDepth[c]) minus the sum of lengths of previous segments.

Variable SegmentLowerEndpoint[c][i] may be defined for i in the range 0 to number_segments[c]−1 inclusive and c in the range 0 to 2 inclusive and may be derived as follows:

SegmentLowerEndpoint[c][0]=0

For (i=1;i<NumberOfSegments[c]+1;i++)(SegmentLowerEndpoint[c][i]=SegmentLowerEndpoint[c][i−1]+SegmentLength[c][i−i])

A smoothness_flag[c] indicator may indicate one or more continuity properties of the function for the color component c. If smoothness_flag is equal to 0, zeroth order continuity may be applied to the piecewise linear inverse functions between consecutive segments. If smoothness_flag[c] is equal to 1, first order smoothness may be used to derive the full second order polynomial functions between consecutive segments.

Syntax element coeff_log 2_offset_minus1 [c] may indicate the size of the denominator used for representing polynomial coefficients of order 0 for component c in the range 0 to 2 inclusive.

Variable Order0 Log 2Denom[c] may be defined by Order0 Log 2Denom[c]=1+coeff_log 2_offset_minus1 for component c in the range 0 to 2 inclusive. Variable Order1 Log 2Denom[c] may be defined by Order1 Log 2Denom[c]= 1+coeff_log 2_offset_minus1+BitDepth[c] for component c in the range 0 to 2 inclusive. Variable Order2 Log 2Denom [c] may be defined by Order2 Log 2Denom[c]=1+coeff_log 2_offset_minus1+2*BitDepth[c] for component c in the range 0 to 2 inclusive.

Syntax element poly_coef_int[c][i][j] may indicate the integer value of the i-th piece (e.g., i-th segment) j-th order polynomial coefficient for component c.

Syntax element poly_coef_frac[c][i][j] may indicate the fractional value of the i-th piece (e.g., i-th segment) j-th order polynomial coefficient for component c.

Variables PolyCoef[c][i][0] with c in the range of 0 to 2, inclusive, and i in the range of 0 to NumberOfSegments [c] inclusive, may be derived as follows:

PolyCoef[c][i][0]=((poly_coef_int[c][i][0]<<Order0 Log 2Denom)+poly_coef_frac[c][i][0])

When smoothness_flag[c] is equal to 0, variables PolyCoef[c][i][1] and PolyCoef[c][i][2] with c in the range of 0 to 2, and i in the range of 0 to NumberOfSegments [c] inclusive may be derived as follows:

PolyCoef[c][i][1]=((PolyCoef[c][i+1][0]−PolyCoef[c][i][0])<<(Order1 Log 2Denom−Order0 Log 2Denom)+((SegmentLength[c][i]>>1))/(SegmentLength[c][i])

PolyCoef[c][i][2]=0

Otherwise (e.g. when smoothness_flag[c] is equal to 1), variables PolyCoef[c][0][1] with c in the range of 0 to 2, may be derived as follows:

PolyCoef[c][0][1]=((poly_coef_int[c][0][1]<<Order1 Log 2Denom)+poly_coef_frac[c][0][1])

Variables PolyCoef[c][i][1] with c in the range of 0 to 2, inclusive, i in the range of 1 to NumberOfSegments [c] inclusive, may be derived as follows:

for (i=1, i<NumberOfSegments [c]+1; i++) {PolyCoef[c][i][1]=((PolyCoef[c][i][0]−PolyCoef[c][i−1][0])<<(1+Order1 Log 2Denom−Order0 Log 2Denom)+((SegmentLength[c][i])>>1))/(SegmentLength[c][i])−PolyCoef[c][i−1][1]})

Variables PolyCoef[c][i][2] with c in the range of 0 to 2, inclusive, and i in the range of 0 to NumberOfSegments [c]-1, inclusive, may be derived as follows:

PolyCoef[c][i][2]=((PolyCoef[c][i+1][1]−PolyCoef[c][i][1])<<(Order2 Log 2Denom−Order1 Log 2Denom−1)+(SegmentLength[c][i]>>1))/(SegmentLength[c][i])

The piecewise model may be applied (e.g., in the HDR reconstruction process) to produce the output for a given sample value. A determination may be made regarding the segment index corresponding to a sample and/or a set of segment partitions. The piecewise function may be performed on that segment.

Determining the segment index for a given sample and/or a set of segment partitions may include one or more inputs. The one or more inputs may include a sample value S for component c, the number of segments of component c Number_segments[c], and/or the length of each segment of component c SegmentLength[c][i] for i in the range 0 to Number_segments[c]−1. The output of the segment index determination may include an index idxS of piecewise function. The variable idxS may be derived as follows:

```
SummedLength = SegmentLength [ c ][ 0 ]
for( idxS = 0, idxFound = 0; idxS < NumberOfSegments [c]; idxS++ ) {
    if( S < SummedLength{
        idxFound = 1
        break
    }
    else {
    SummedLength = SummedLength + SegmentLength [ c ][ idxS ]
    }
}
if( ! idxFound)
    idxS = idxS − 1
```

Where uniform_segments_flag[c] is 1 and the segment lengths are equal, the segment index may be found by integer division with truncation:

$$idxS=S/\text{SegmentLength}[c][0]$$

Where uniform_segments_flag[c] is 1, power of 2_segment_length_flag [c] is 1, and the uniform size is a power of 2, the index may be given by an integer shift with truncation:

$$idxS=S>>\log 2\_\text{segment\_length}[c]$$

Segment models may be applied to luma, for example, depending upon the smoothness_flag[c]. Application of the segment models to luma may include one or more inputs. The one or more inputs may include, for example, a luma location (xP, yP) specifying the luma sample location relative to the top-left luma sample of the current picture. Outputs of the application of the segment models to luma may include, for example, a modified luma sample value reshapeLumaSample. The value of reshapeLumaSample may be derived by applying one or more of the following. A variable idxL may be derived by invoking the identification of piece-wise function index as specified herein with the input of sample value recPicture$_L$[xP][yP] for component 0. The value of reshapeLumaSample may be derived as follows:

reshapeLumaSample=((PolyCoef[0][idxL][0]<<(Order2 Log 2Denom[c]−Order0 Log 2Denom[c])+
(PolyCoef[0][idxL][1]*((recPicture$_L$[xP][yP]−SegmentLowerEndpoint[0][idxL])<<(Order2 Log 2Denom[c]−Order1 Log 2Denom[c])))+
(PolyCoef[0][idxL][2]*(recPicture$_L$[xP][yP]−SegmentLowerEndpoint[0][idxL]))*(recPicture$_L$[xP][yP]−SegmentLowerEndpoint[0][idxL]))+
(1<<(Order2 Log 2Denom[c]−1)))>>(Order2 Log 2Denom[c])

reshapeLumaSample=Clip3(0,(1<<BitDepth[0])−1, reshapeLumaSample)

When smoothness_flag[0] is zero, the value of reshapeLumaSample may (e.g., alternatively) be derived as follows:

reshapeLumaSample=((PolyCoef[0][idxL][0]<<(Order1 Log 2Denom[c]−Order0 Log 2Denom[0])+
(PolyCoef[0][idxL][1]*(recPicture$_L$[xP][yP]−SegmentLowerEndpoint[0][idxL]))+(1<<(Order1 Log 2Denom[0]−1)))>>(Order1 Log 2Denom [0])

reshapeLumaSample=Clip3(0,(1<<BitDepth[0])−1, reshapeLumaSample)

The segment models may be applied to chroma. Application of the segment models to chroma may include one or more inputs. The one or more inputs may include a chroma location (xP$_C$, yP$_C$) specifying the chroma sample location relative to the top-left chroma sample of the current picture and/or a variable cIdx specifying the chroma component index. Application of the segment models to chroma may include one or more outputs. The one or more outputs may include, for example, a modified chroma sample value reshapeChromaSample. The value of recPicture$_C$ may be set equal to recPicture$_{C0}$ if cIdx is equal to 0 and may be set equal to recPicture$_{C1}$ otherwise. The value of reshapeChromaSample may be derived by applying one or more of the following. The variables idxC may be derived by invoking the identification of piece-wise function index as specified herein with the input of sample value recPicture$_C$[xP$_C$][yP$_C$] for component cIdx+1. The value of reshapeChromaSample may be derived as follows:

reshapeChromaSample=((PolyCoef[cIdx+1][idxC]
[0]<<(Order2 Log 2Denom[cIdx+1]−Order0 Log 2Denom[cIdx+1])+(PolyCoef[cIdx+1][idxC]
[1]*((recPicture$_C$[xP$_C$][yP$_C$]−SegmentLowerEndpoint[cIdx+1][idxC]))<<(Order2 Log 2Denom[cIdx+1]−Order1 Log 2Denom[cIdx+1])))+(PolyCoef[cIdx+1][idxC][2]*(recPicture$_C$[xP$_C$][yP$_C$]−SegmentLowerEndpoint[cIdx+1][idxC])*(recPicture$_C$[xP$_C$][yP$_C$]]−SegmentLowerEndpoint[cIdx+1][idxC])+(1<<(Order2 Log 2Denom[cIdx+1]−1)))>>(Order2 Log 2Denom[cIdx+1])

reshapeChromaSample=Clip3(0,(1<<BitDepth[cIdx+1])−1,reshapeChromaSample)

In the case when smoothness_flag[cIdx+1] is zero, another expression may be possible:

reshapeChromaSample=((PolyCoef[cIdx+1][idxC]
[0]<<(Order1 Log 2Denom[cIdx+1]−Order0 Log 2Denom[cIdx+1])+(PolyCoef[cIdx+1][idxC]
[1]*(recPicture$_C$[xP$_C$][yP$_C$])]]−SegmentLowerEndpoint[cIdx+1][idxC])+(1<<(Order1 Log 2Denom[cIdx+1]−1)))>>(Order1 Log 2Denom [cIdx+1])

reshapeChromaSample=Clip3(0,(1<<BitDepth[cIdx+1])−1,reshapeChromaSample)

As described herein, a piecewise model may be used for signaling inverse reshaping parameters. For example, an inverse reshaping model may be partitioned into a number of individual segments and expressions such as $1^{st}$ order or $2^{nd}$ order model may be defined at a segment level. A curve may be described via the location of the segments and information which may be used to derive model parameters.

The location of segment boundaries and pivot points may be signaled. For example, the number of pivot points and a list of x-values for each pivot point may be signaled. The model parameters may be described by a reduced set of information. For example, the y-value of a pivot point and a single slope value may be signaled. Additional parameters may be derived from the number of pivot points, x-values, and/or y-values of each pivot point, and/or continuity constraints. When the domain of definition includes S segments, then 3S parameters may be reduced to 3S−2(S−1)=S+2 parameters. For example, a piecewise $2^{nd}$ order model may include 3 parameters per segment. One or more (e.g., 2) constraints may be used to enforce a smoothness relation at an internal pivot point. Details of the syntax are illustrated in Table 17. For example, syntax element reshape_num_pivots_minus2 may indicate the number of pivot points. Syntax element reshape_coded_pivot_value may indicate a list of x-coordinate location of each pivot point. A polynomial coefficient value may be signaled for the pivot point(s) (e.g., each pivot point). A single additional polynomial coefficient may be signaled depending upon the value of syntax element reshap_continuity_flag.

TABLE 17

Example of Syntax

| | |
|---|---|
| reshape_present_flag | ue(v) |
| if( reshape_present_flag ) { | |
|     reshape_input_luma_bit_depth_minus8 | ue(v) |
|     reshape_input_chroma_bit_depth_minus8 | ue(v) |

TABLE 17-continued

Example of Syntax

```
        reshape_output_luma_bit_depth_minus8                              ue(v)
        reshape_output_chroma_bit_depth_minus8                            ue(v)
        coeff_log2_offset_minus2                                          ue(v)
        for( c = 0; c < 3; c++ ) {
            reshape_num_pivots_minus2 [ c ]                               ue(v)
            for( i = 0; i < reshape_num_pivots_minus2 [ c ] + 2 ; i++ ) {
                reshape_coded_pivot_value[ c ][ i ]                       u(v)
            }
            reshape_continuity_flag[c]                                    u(1)
            for( i = 0; i < reshape_num_pivots_minus2 [ c ] + 2; i++ ) {
                poly_coef_int[ c ][ i ] [ 0 ]                             se(v)
                poly_coef_frac[ c ][ i ][0 ]                              u(v)
            }
            if(reshape_continuity_flag[c]==1) {
                poly_coef_int[ c ][ 0 ] [ 1 ]                             se(v)
                poly_coef_frac[ c ][ 0 ][ 1 ]                             u(v)
            }
        }
    } else
        reshape_pps_id                                                    ue(v)
}
```

A piece linear curve may be used to control the reshaping process. The width of a piecewise segment (e.g., each piecewise segment) may be signaled. A global offset value associated with the model parameters may be provided. A slope value for each segment may be signaled. A gain and offset value of each segment may be determined. The gain and offset value of each segment may be carried in an SEI message. Table 18 shows an example syntax of an SEI message signaling inverse reshaping model parameters. The encoder may signal the location of pivot points via the number and length of segments via the syntax elements hdr_recon_num_ranges. For uniformly spaced pivot points, the encoder may signal a single flag via the syntax element hdr_recon_equal_ranges_flag and signal the number of segments via syntax element hdr_recon_num_ranges. Segment length may be calculated based on the number of segments.

TABLE 18

Example of Syntax

| | Descriptor |
|---|---|
| hdr_reconstruction_info( payloadSize ) { | |
|     hdr_recon_id | ue(v) |
|     hdr_recon_cancel_flag | u(1) |
|     if( !hdr_recon_cancel_flag ) { | |
|         hdr_recon_persistence_flag | u(1) |
|         hdr_recon_transfer_characteristics | u(8) |
|         hdr_recon_default_flag | u(1) |
|         if( !hdr_recon_default_flag ) { | |
|             hdr_recon_scale_bit_depth | u(4) |
|             hdr_recon_offset_bit_depth | u(4) |
|             hdr_recon_scale_frac_bit_depth | u(4) |
|             hdr_recon_offset_frac_bit_depth | u(4) |
|             hdr_recon_num_comps_minus1 | ue(v) |
|         } | |
|         for( c = 0; c <= hdr_recon_num_comps_minus1; c++ ) { | |
|             hdr_recon_num_ranges[ c ] | ue(v) |
|             hdr_recon_equal_ranges_flag[ c ] | u(1) |
|             hdr_recon_global_offset_val[ c ] | u(v) |
|             for( i = 0; i <= hdr_recon_num_ranges[ c ]; i++ ) | |
|                 hdr_recon_scale_val[ c ][ i ] | u(v) |
|             if( !hdr_recon_equal_ranges[ c ] ) | |
|                 for( i = 0; i <= hdr_recon_num_ranges[ c ]; i++ ) | |
|                     hdr_recon_range_val [ c ][ i ] | u(v) |
|         } | |
|     } | |

Multiple curves may be signaled in the sequence parameter set. An example of the syntax is shown in Table 19. For example, the number and location of pivot points may be signaled via syntax elements num_lut_reshape_minus2 and reshape_coded_pivot_value. The encoder may allow a different degree to be signaled on each segment. A polynomial coefficient may be signaled for each coefficient in each segment.

TABLE 19

Example of Syntax

| | Descriptor |
|---|---|
| hdr_reshaping_sps_table( ) { | |
|   reshape_present_flag | u(1) |
|   if( reshape_present_flag ) { | |
|     num_lut_reshape_greater1_flag | u(1) |
|     if ( num_lut_reshape_greater1_flag ) | |
|       num_lut_reshape_minus2 | u(4) |
|     for( k = 0; k < NumLutReshape; k++ ) { | |
|       reshape_num_pivots_minus2 [k ] | u(3) |
|       for( i = 0; i < reshape_num_pivots_minus2[ k ] + 2; i++ ) { | |
|         reshape_coded_pivot_value[ k ][ i ] | u(10) |
|       } | |
|       for( i = 0; i < reshape_num_pivots_minus2[ k ] + 1; i++ ) { | |
|         smoothness_degree[ k ][ i ] | ue(v) |
|         poly_degree_of_freedom_minus1[ k ][ i ] | ue(v) |
|         for( j = 0; j < poly_degree_of_freedom_minus1[ k ][ i ] + 1; j++ ) { | |
|           poly_free_coef[ k ][ i ] [ j ] | se(v) |
|         } | |
|       } | |
|     } | |
|   } | |
| } | |

For example, when the lengths of segments are signaled, uniform segments may not exist, and the sum of individual segment lengths may be less than the total intervals used in the domain of definition.

For example, when signaling uniform segments and the number of segments (N), the segment length may be derived from equation 86, where BitDepth may denote the bit depth of the samples used for reshaping.

$$L=2^{\wedge BitDepth}/\text{NumberSegments} \quad (86)$$

The length L may be an integer. The division may be computed with truncation.

The model may be defined to extend the last segment. When $p_{N+1} \leq x$, the model may use equation (87) to extend the last segment. In equation (87), y(x) is the output signal, i is the power polynomial, j is the interval number, Pj is the end point. The coefficient of order i on segment j is denoted by $\text{coeff}_{i,j}$. The variable x denotes the input to the mode. For example, on the ith segment, the model may have a pivot point {pi} and an order {i}. The extension may introduce additional segment(s), pivot point(s), and/or associated coefficients. Output signal y(x) may be defined using, for example, equation (88). N is the number of segments.

$$y(x) = \Sigma_{i=0}^{order(i)} \text{coeff}_{i,j} \cdot x^i \quad p_j \leq x < p_{j+1} \quad (87)$$

$$y(x) = \Sigma_{i=0}^{order(i)} \text{coeff}_{i,N} \cdot p_N^i \quad (88)$$

Uniform segment length may be rounded up in the division. For example, the segment length for the segments may be the quotient of the division, described herein, rounded up to the next integer. The sum of individual segment lengths may equal or exceed the total interval used in the domain of definition.

The segment length may be calculated iteratively when the uniform segment length flag may be signaled as true. The division may be integer division. The sum of the segment lengths may cover the range of x. The segment lengths may be different. For example, the length of each segment may be derived by denoting remaining length as the remaining length of the x value, remaining_num_segment as the number of remaining segments, length[i] as the length of i-th segment, range_x as the range of x that the model is defined, num_segment as the total number of segments, shown as:

```
remaining_length = range_x;
remaining_num_segment = num_segment;
for (i=0; i<num_segment; i++)
{
    length[i]    =    (remaining_length    +
remaining_num_segment/2)/remaining_num_segment;
    remaining_length = remaining_length – length[i];
    remaining_num_segment = remaining_num_segment – 1;
}
```

The possible number of segments may be restricted to an exact divisor of the total length when using uniform segments. For example, when the total length is a power of 2, the model may specify the number of segments as a power of two.

For example, the common length of the segments may be signaled when uniform segments are used. The number of segments may be calculated by integer division with rounding up.

For example, the encoder may define the last segment larger and add the remainder to the last uniform length segment. For example, the number of segments may be signaled as NumberSegments. The total length of the segments may be determined based on the BitDepth and/or the value of a parameter such as hdr_recon_scale_bit_depth. For example, the total length may equal to two raised to the power of the BitDepth, e.g., TotalLength=2^BitDepth. The length of segments 0 through NumberSegments−2 may be calculated, e.g., using equation (86), where integer division may be truncated toward zero. The length of the last segment, segment number NumberSegments−1, may be calculated by subtracting the sum of the lengths of other segments from the total length, for example, by using equation (89). The length of the last segment may be larger than the length of the other segments. The sum of the segment lengths may equal to the total.

$$2^{-BitDepth}-(NumberSegments-2)*(L). \quad (89)$$

When the uniform segment length flag indicates that uniform segments are not used (e.g., flag value is false), the number of segments may be signaled and the lengths of all but the last segment may be signaled. The length of the last segment (e.g., final_segment_length), may be derived from the length of interval used in the domain of definition and the sum of the signaled segment lengths, length[i]. This is shown as:

```
length_of_domain = 2^BitDepth
sum_of_lengths = 0;
for (i=0; i<num_segment-1; i++)
{
    sum_of_lengths = sum_of_lengths + length[i];
}
final_segment_length = length_of_domain − sum_of_lengths
```

The sum of the signaled segment lengths may be constrained to less than the length of interval used in the domain of definition.

Piecewise models may include flat regions. The flat regions may be located at the first and/or last segment while being smooth in the internal segments (e.g., the segments that are greater than the first and less than the last). The presence of sections representing the first and last segments may result in a curve which is non-smooth. An indication may be sent that indicates that the first and/or last segments of the piecewise model are flat. For example, curves with flat segments may be represented via one or more flat region flags. The smoothness in the curve in the internal segments may be exploited using the one or more flat region flags. For example, curves with flat first and/or last segments may be signaled using smoothness properties by using flags to indicate that the first and/or last segment is flat. More than one flag may be signaled to indicate flat regions in the piecewise model. For example, two flat flags may be used to indicate flat regions at the first or last segment. For example, the encoder may signal syntax element first_segment_flat_flag to indicate whether the first segment is flat, and a last_segment_flat_flag to indicate whether the last segment is flat. The encoder may signal the location of segment boundaries and pivot points by signaling the number of pivot points followed by a list of x-values of each pivot point as shown in Table 16. For example, the encoder may send the $0^{th}$ order coefficient for each pivot point and may signal a single $1^{st}$ order coefficient corresponding to the first segment.

A constant coefficient (e.g., a first constant coefficient) of the first piecewise segment may be modified to a value signaled for a second piecewise segment, for example, when an indication that the first piecewise segment is flat is received. A slope coefficient and/or a curvature coefficient for the first piecewise segment may be set to zero, for example, when the indication that the first piecewise segment is flat is received. For example, when the first_segment_flat_flag is received indicating that the first segment is flat, the $0^{th}$ order coefficient may be skipped (e.g., not signaled). The recursive value construction process described herein may start at the second segment, e.g., instead of the first segment. The parameter values for the first segment may correspond to a flat section on the curve representing the function. The $0^{th}$ order coefficient for the first interval may be set to equal to the values associated with the second segment. The $1^{st}$ order and $2^{nd}$ order coefficients of the first segment may be set to equal to zero.

When the last_segment_flat_flag is received indicating that the last segment is flat, the last $0^{th}$ order coefficient may be skipped (e.g., not signaled). The $0^{th}$ order coefficient of the last segment may be set to equal to the $0^{th}$ order coefficient of the $2^{nd}$ to last segment. The $1^{st}$ order and $2^{nd}$ order coefficients of the last segment may be set to equal to zero.

Table 20 is an example syntax table including the syntax elements described herein.

TABLE 20

| Example of Syntax | Descriptor |
|---|---|
| hdr_reshape_pps_table( ) { | |
|   reshape_present_flag | ue(v) |
|   if( reshape_present_flag ) { | |
|     reshape_input_luma_bit_depth_minus8 | ue(v) |
|     reshape_input_chroma_bit_depth_minus8 | ue(v) |
|     reshape_output_luma_bit_depth_minus8 | ue(v) |
|     reshape_output_chroma_bit_depth_minus8 | ue(v) |
|     coeff_log2_offset_minus2 | ue(v) |
|     for( c = 0; c < 3; c++ ) { | |
|       reshape_num_pivots_minus2 [ c ] | ue(v) |
|       for( i = 0; i < reshape_num_pivots_minus2 [ c ] + 2 ; i++ ) { | |
|         reshape_coded_pivot_value[ c ][ i ] | u(v) |
|       } | |
|       first_segment_flat_flag[c] | u(1) |
|       last_segment_flat_flag[c] | u(1) |
|       reshape_continuity_flag[c] | u(1) |
|       for( i = first_segment_flat_flag[c]; i < reshape_num_pivots_minus2 [ c ] + 2 − last_segment_flat_flag[c]; i++ ) { | |
|         poly_coef_int[ c ][ i ] [0 ] | se(v) |
|         poly_coef_frac[ c ][ i ][0 ] | u(v) |
|       } | |

TABLE 20-continued

Example of Syntax

| | Descriptor |
|---|---|
|         if(reshape_continuity_flag[c]==1) {<br>            poly_coef_int[ c ][ first_segment_flat_flag[c]] [ 1 ] | se(v) |
|             poly_coef_frac[ c ][ first_segment_flat_flag[c] ][ 1 ]<br>        }<br>    }<br>  } else | u(v) |
|       reshape_pps_id<br>} | ue(v) |

In Table 19, first_segment_flat_flag[c] may indicate that a first segment of the polynomial model, with c ranging from 0 to 2 inclusive, is flat. The polynomial coefficients poly_coef_int[c][i] [0] and poly_coef_frac[c][i][0] may begin with the first element i=0, if first_segment_flat_flag[c] is equal to 0. Additional coefficients may be derived, beginning with the second segment. If the first_segment_flat_flag[c] is equal to 0, the signalled polynomial coefficients poly_coef_int[c][i] [0] and poly_coef_frac[c][i][0] may begin with the first element i=0. Additional coefficients may be derived, beginning with the first segment. If the first_segment_flat_flag[c] is equal to 1, the signalled polynomial coefficients poly_coef_int[c][i] [0] and poly_coef_frac[c][i] [0] may begin with the second element i=1. Additional coefficients may be derived beginning with the third segment. The model parameters may be set to give a continuous flat model on the first segment.

In Table 19, last_segment_flat_flag[c] may indicate that a last segment of the polynomial model, with c ranging from 0 to 2 inclusive, is flat. If the last_segment_flat_flag[c] is equal to 1, the signalled polynomial coefficients poly_coef_int[c][i] [0] and poly_coef_frac[c][i][0] may end with element i=reshape_num_pivots_minus2 [c]. Additional coefficients may be derived, ending with the last segment i=reshape_num_pivots_minus2 [c]+1. Additional coefficients may be derived, ending with the second to last segment i=reshape_num_pivots_minus2 [c]. The model parameters may be set to give a continuous flat model on the last segment. If the last_segment_flat_flag[c] is equal to 0, the signalled polynomial coefficients poly_coef_int[c][i] [0] and poly_coef_frac[c][i][0] may end with element i=reshape_num_pivots_minus2 [c]+1. Additional coefficients may be derived ending with the last segment i=reshape_num_pivots_minus2 [c]+1.

The first-segment_flat flag may indicate that the coefficient recursion should begin on the second segment. The coefficients on the first segment may be set to derived values. The last_segment_flat flag may indicate that the end of the coefficient derivation is reduced and that the coefficients of the last segment are set to derived values.

The variables PolyCoef[c][i][0] with c in the range of 0 to 2, inclusive, i in the range of first_segment_flat_flag[c] to reshape_num_pivots_minus2[c]+1−last_segment_flat_flag [c] inclusive, may be derived as follows:

$$PolyCoef[c][i][0]=((poly\_coef\_int[c][i][0]<<Reshape\mbox{-}Order0\ Log\ 2Denom)+poly\_coef\_frac[c][i][0]) \quad (7\mbox{-}xx)$$

When reshape_continuity_flag[c] is equal to 0, the variables PolyCoef[c][i][1] and PolyCoef[c][i][2] with c in the range of 0 to 2, and i in the range of first_segment_flat_flag [c] to reshape_num_pivots_minus2[c]−last_segment_flat_ flag[c], inclusive may be derived as follows:

$$PolyCoef[c][i][1]=((PolyCoef[c][i+1][0]-PolyCoef[c][i][0])<<(ReshapeOrder1\ Log\ 2Denom-ReshapeOrder0\ Log\ 2Denom)+((reshape\_coded\_pivot\_value[c][i+1]-reshape\_coded\_pivot\_value[c][i])>>1))/(reshape\_coded\_pivot\_value[c][i+1]-reshape\_coded\_pivot\_value[c][i])) \quad (7\mbox{-}xx)$$

$$PolyCoef[c][i][2]=0 \quad (7\mbox{-}xx)$$

When reshape_continuity_flag[c] is equal to 1, the variables PolyCoef[c][0][1] with c in the range of 0 to 2, may be derived as follows:

$$PolyCoef[c][0][1]=((poly\_coef\_int[c][0][1]<<ReshapeOrder1\ Log\ 2Denom)+poly\_coef\_frac[c][0][1]) \quad (7\mbox{-}xx)$$

The variables PolyCoef[c][i][1] with c in the range of 0 to 2, inclusive, i in the range of 1 to reshape_num_pivots_minus2[c]+1, inclusive, may be derived as follows:

$$\begin{aligned}&\text{for }(i=1;i<\text{reshape\_num\_pivots\_minus2}[c]+2;i++)\\&\{PolyCoef[c][i][1]=((PolyCoef[c][i][0]-Poly\mbox{-}Coef[c][i-1][0])<<(1+ReshapeOrder1\ Log\ 2Denom-ReshapeOrder0\ Log\ 2Denom)+((reshape\_coded\_pivot\_value[c][i]-reshape\_coded\_pivot\_value[c][i-1])>>1))/(reshape\_coded\_pivot\_value[c][i-1]))-PolyCoef[c][i-1][1]\quad(7\mbox{-}xx)\}\end{aligned}$$

The variables PolyCoef[c][i][2] with c in the range of 0 to 2, inclusive, i in the range of 0 to reshape_num_pivots_minus2[c], inclusive, may be derived as follows:

$$PolyCoef[c][i][2]=((PolyCoef[c][i+1][1]-PolyCoef[c][i][1])<<(ReshapeOrder2\ Log\ 2Denom-ReshapeOrder1\ Log\ 2Denom-1)+((reshape\_coded\_pivot\_value[c][i+1]-reshape\_coded\_pivot\_value[c][i])>>1))/(reshape\_coded\_pivot\_value[c][i+1]-reshape\_coded\_pivot\_value[c][i])) \quad (7\mbox{-}xx)$$

If first_segment_flat flag[c]=1
PolyCoef[c][0][0]=PolyCoef[c][1][0]
PolyCoef[c][0][1]=0
PolyCoef[c][0][2]=0
If last_segment_flat_flag[c]=1
LastIdx=reshape_num_pivots_minus2[c]
PolyCoef[c][LastIdx][0]=PolyCoef[c][LastIdx−1][0]
PolyCoef[c][LastIdx][1]=0
PolyCoef[c][LastIdx][2]=0

Figure 13A:
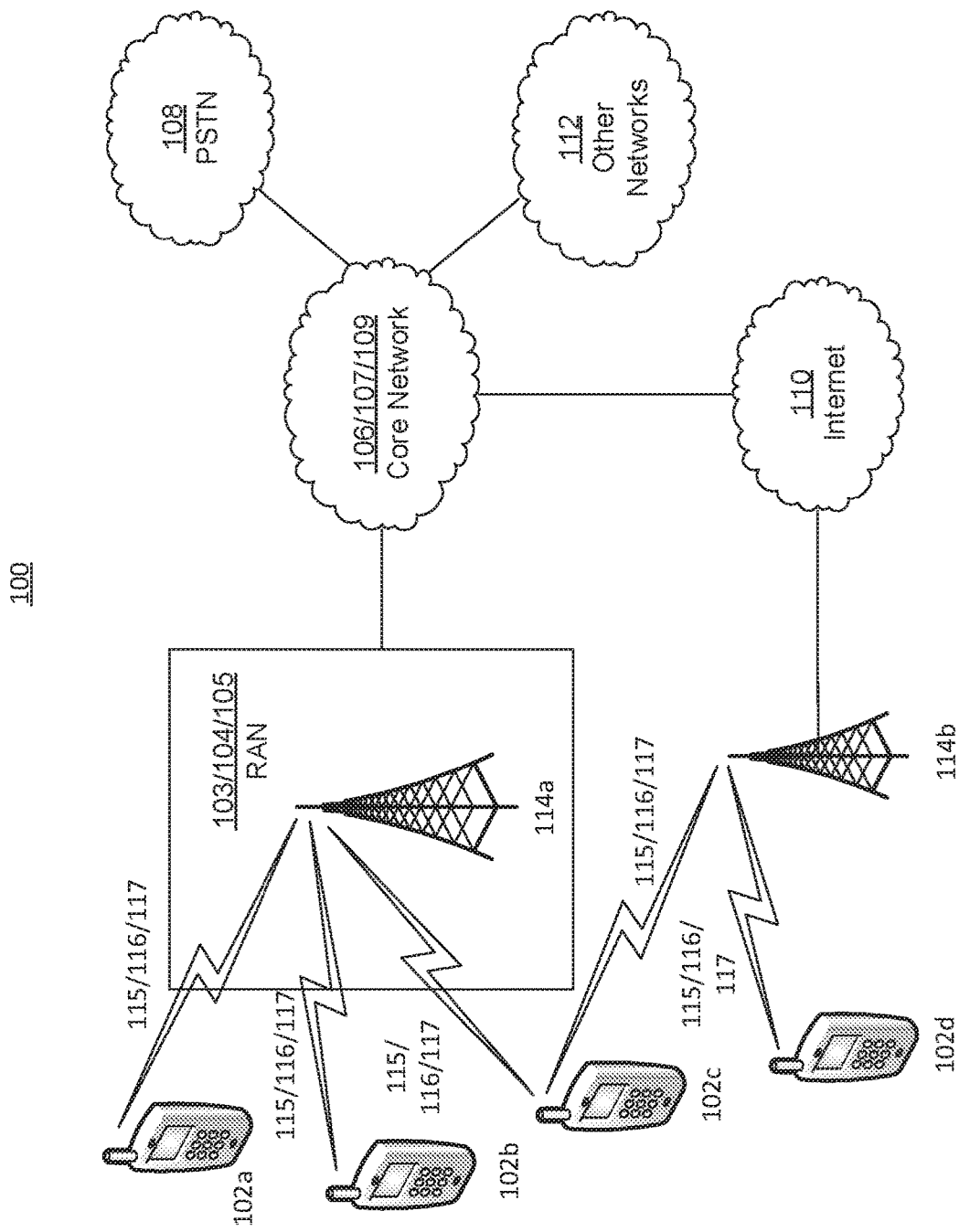
FIG. 13A is a system diagram of an example communications system in which one or more disclosed embodiments may be implemented.

FIG. 13A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 13A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 13A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 13A, the base station 114b may have a direct connection to the Internet 110. Thus, the base station 114b may not be used to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 13A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 13A may be configured to communicate with the base station 114a, which may employ a cellular-based radio technology, and with the base station 114b, which may employ an IEEE 802 radio technology.

Figure 13B:
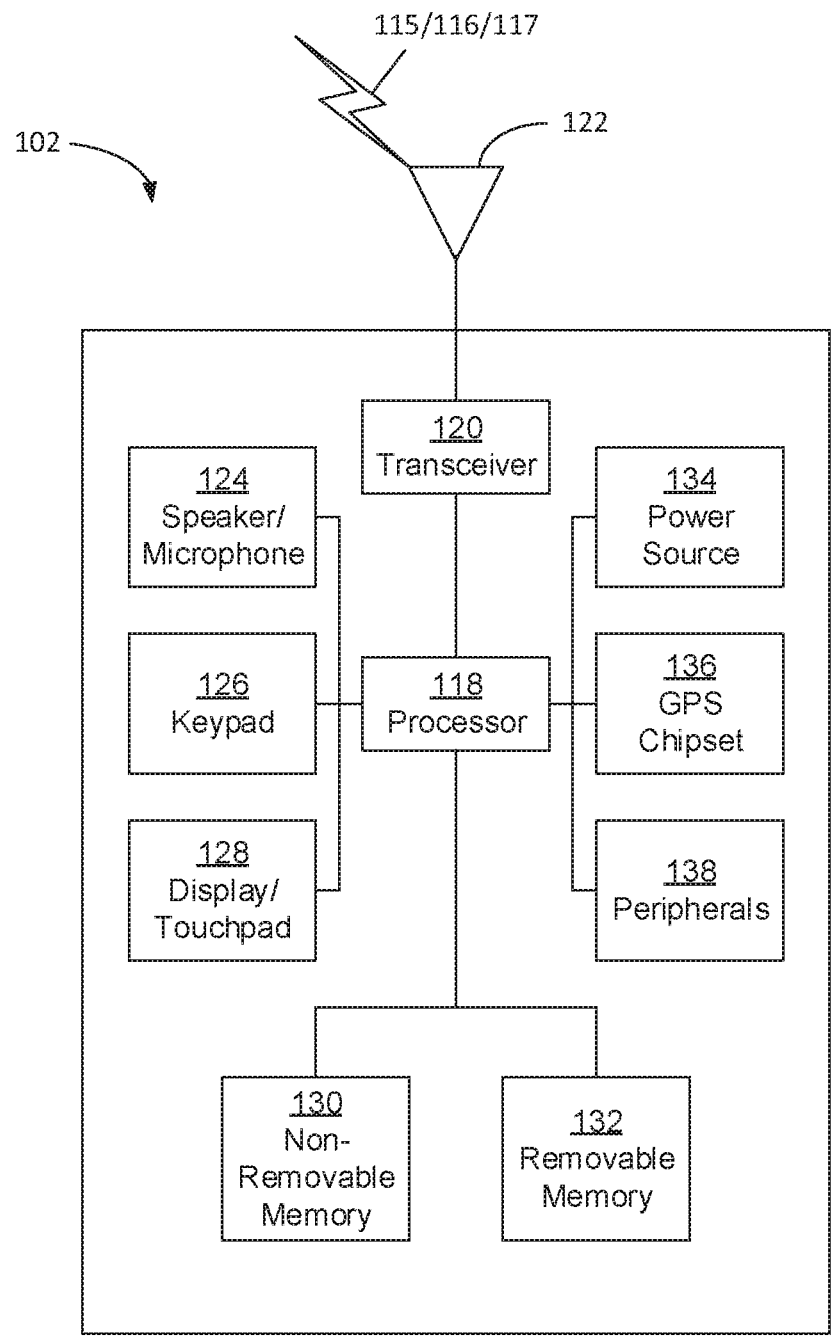
FIG. 13B is a system diagram of an example wireless transmit/receive unit (WTRU) that may be used within the communications system illustrated in FIG. 13A.

FIG. 13B is a system diagram of an example WTRU 102. As shown in FIG. 13B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more of the elements depicted in FIG. 13B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 13B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SiM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM)

radio unit, a digital music player, a media player, a video game player module, an Internet browser, and the like.

Figure 13C:
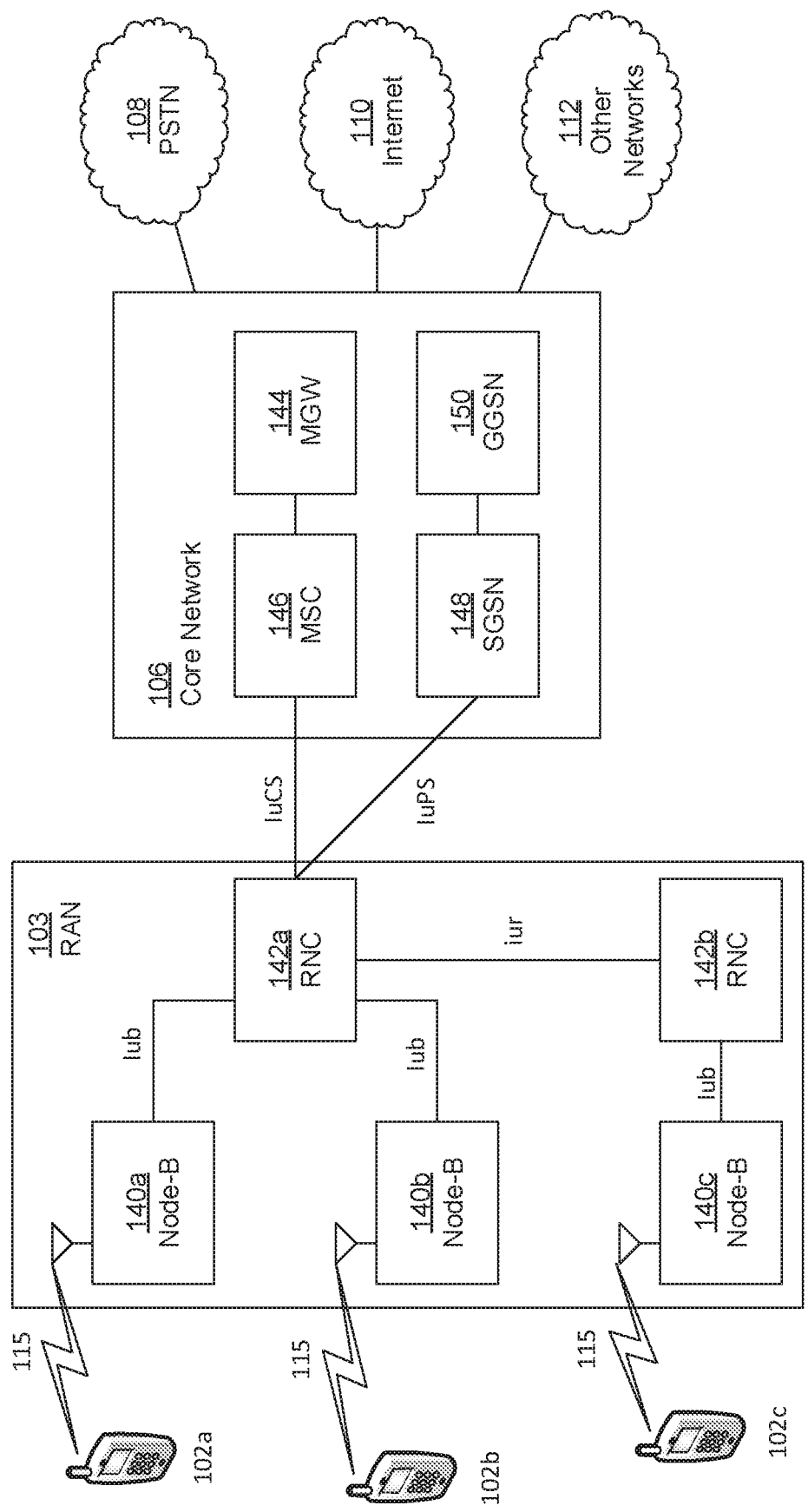
FIG. 13C is a system diagram of an example radio access network and an example core network that may be used within the communications system illustrated in FIG. 13A.

FIG. 13C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 13C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 13C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 13C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 13D:
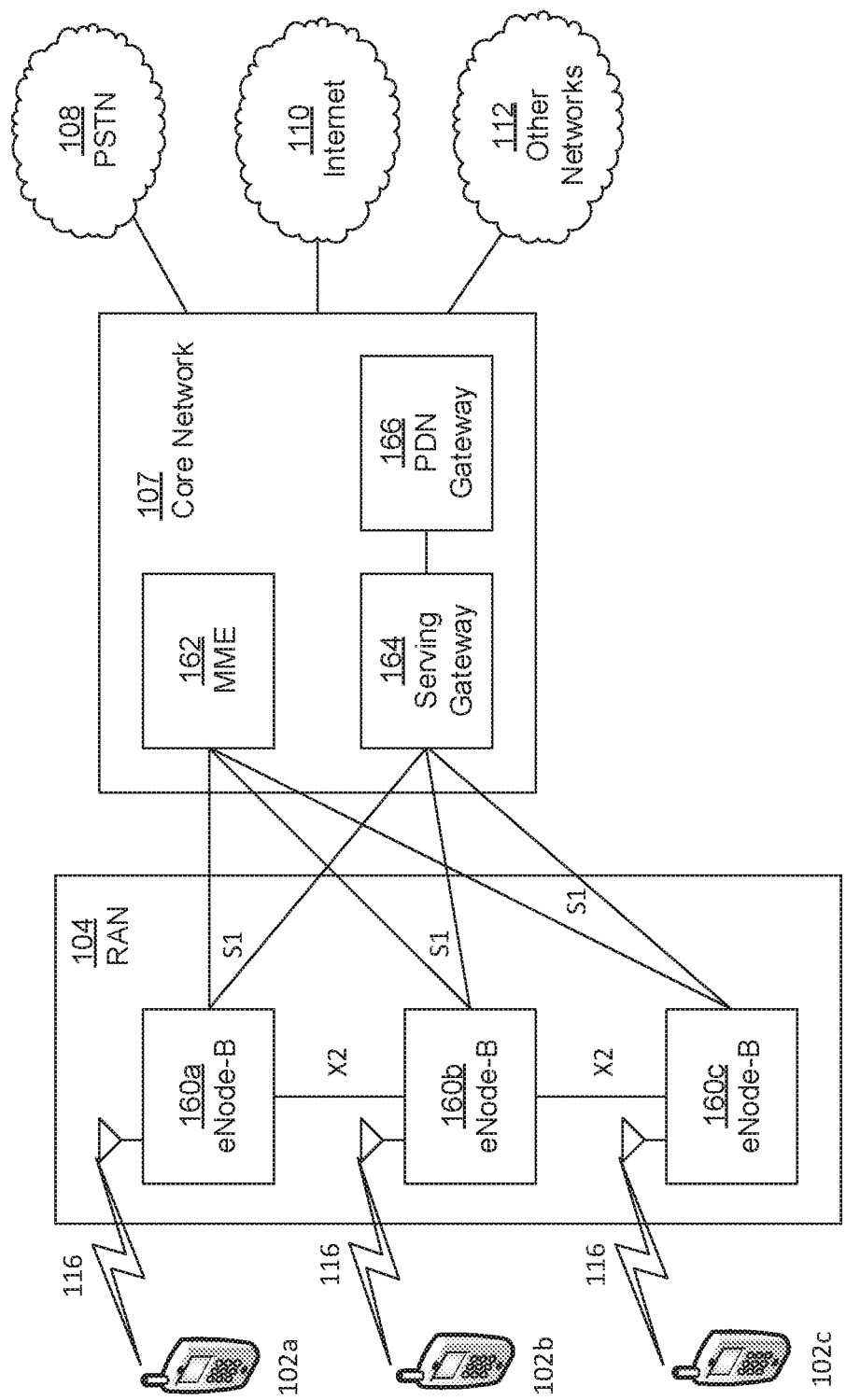
FIG. 13D is a system diagram of another example radio access network and an example core network that may be used within the communications system illustrated in FIG. 13A.

FIG. 13D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 13D, the eNode-Bs 160a, 160b, 160c may communicate with one another over an X2 interface.

The core network 107 shown in FIG. 13D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 13E:
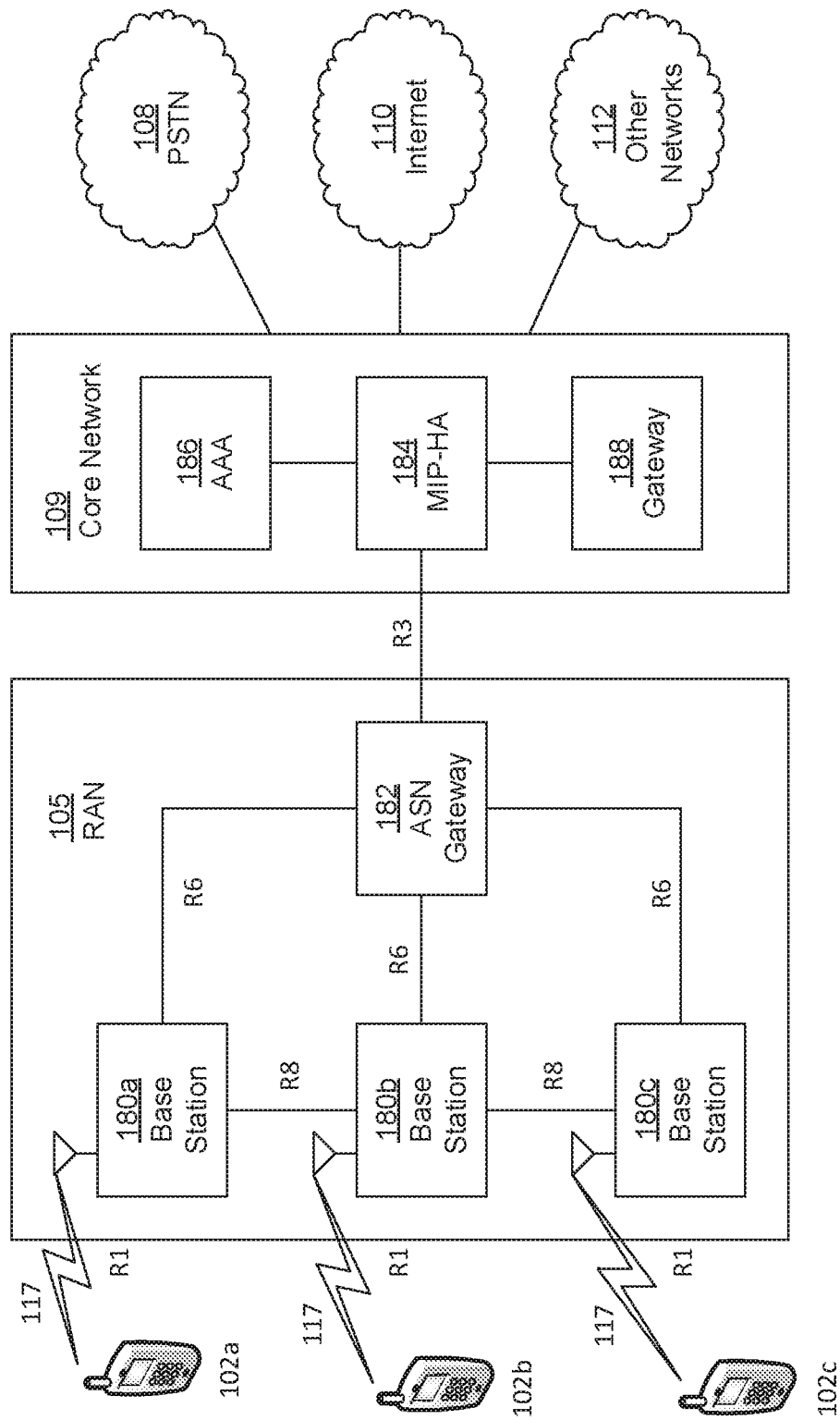
FIG. 13E is a system diagram of another example radio access network and an example core network that may be used within the communications system illustrated in FIG. 13A.

FIG. 13E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 13E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an RI reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 13E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and land-line communications devices. In addition, the gateway 188 may provide the WTRUs 102a, 102b, 102c with access to the networks 112, which may include other wired or wireless networks that are owned and/or operated by other service providers.

Although not shown in FIG. 13E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Systems, methods, and instrumentalities have been disclosed for inverse shaping for HDR video coding. An interpolation model may be implemented efficiently, for example, by improving a curve interpolation model, reducing computational complexity and reducing signaling, e.g., for pivot point locations and parameter values. An interpolation model may be based around a pivot endpoint. Locations of pivot points may be restricted, e.g., uniformly spaced at multiples of a power of 2. Parameters may be determined based on a set of pivot points. Parameters may comprise a function value and slope value at each pivot point. Multiple interpolation models (e.g. cubic and/or quadratic) may be used. Model coefficients may be constrained by continuity. Continuity between segments may be maintained by relationships across segment boundaries. An encoder may exploit constraints, for example, to limit the search space to find optimal parameters.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of inverse reshaping for a high dynamic range (HDR) video, the method comprising:
determining a plurality of pivot points associated with a plurality of piecewise segments, wherein each of the plurality of piecewise segments is defined by a plurality of coefficients that comprise a constant coefficient, a slope coefficient, and a curvature coefficient;
receiving an indication of a first subset of coefficients associated with the plurality of piecewise segments;

calculating, based on the first subset of coefficients and the plurality of pivot points, a second subset of coefficients associated with the plurality of piecewise segments, wherein the second subset of coefficients are calculated using a continuity relation based on a left hand endpoint of one or more of the plurality of piecewise segments;

generating an inverse reshaping model using the plurality of pivot points, the first subset of coefficients, and the second subset of coefficients; and applying inverse reshaping to the HDR video using the inverse reshaping model.

2. The method of claim 1, wherein the plurality of pivot points are determined based on an indication received via a message.

3. The method of claim 1, wherein the first subset of coefficients comprises a first slope coefficient associated with a first piecewise segment of the plurality of piecewise segments and a plurality of constant coefficients associated with the plurality of piecewise segments.

4. The method of claim 3, wherein the second subset of coefficients comprises a plurality of slope coefficients associated with the remaining piecewise segments of the plurality of piecewise segments and a plurality of curvature coefficients.

5. The method of claim 1, wherein determining the plurality of pivot points comprises determining a location for each of the plurality of pivot points.

6. The method of claim 1, wherein the plurality of pivot points are evenly spaced.

7. The method of claim 1, further comprising:

receiving an indication that a first piecewise segment of the plurality of piecewise segments is flat;

modifying a first constant coefficient of the first piecewise segment of the inverse reshaping model to a value signaled for a second constant coefficient of a second piecewise segment of the inverse reshaping model; and setting a first slope coefficient and a first curvature coefficient associated with the first piecewise segment to zero.

8. A video coding device comprising:

a processor configured to:

determine a plurality of pivot points associated with a plurality of piecewise segments, wherein each of the plurality of piecewise segments is defined by a plurality of coefficients that comprise a constant coefficient, a slope coefficient, and a curvature coefficient;

receive an indication of a first subset of coefficients associated with the plurality of piecewise segments;

calculate, based on the first subset of coefficients and the plurality of pivot points, a second subset of coefficients associated with the plurality of piecewise segments, wherein the second subset of coefficients are calculated using a continuity relation based on a left hand endpoint of one or more of the plurality of piecewise segments;

generate, an inverse reshaping model using the plurality of pivot points, the first subset of coefficients, and the second subset of coefficients; and apply inverse reshaping to a high dynamic range (HDR) video using the inverse reshaping model.

9. The video coding device of claim 8, wherein the plurality of pivot points are determined based on an indication received via a message.

10. The video coding device of claim 8, wherein the first subset of coefficients comprises a first slope coefficient associated with a first piecewise segment of the plurality of piecewise segments and a plurality of constant coefficients associated with the plurality of piecewise segments.

11. The video coding device of claim 10, wherein the second subset of coefficients comprises a plurality of slope coefficients associated with the remaining piecewise segments of the plurality of piecewise segments and a plurality of curvature coefficients.

12. The video coding device of claim 10, wherein being configured to determine the plurality of pivot points comprises being configured to determine a location for each of the plurality of pivot points.

13. The video coding device of claim 10, wherein the plurality of pivot points are evenly spaced on the inverse reshaping model.

14. The video coding device of claim 10, wherein the processor is further configured to:

receive an indication that a first piecewise segment of the plurality of piecewise segments is flat;

modify a first constant coefficient of the first piecewise segment of the inverse reshaping model to a value signaled for a second constant coefficient of a second piecewise segment of the inverse reshaping model; and set a first slope coefficient and a first curvature coefficient associated with the first piecewise segment to zero.

15. A video coding device comprising:

a processor configured to:

determine a plurality of pivot points associated with a plurality of piecewise segments, wherein each of the plurality of piecewise segments is defined by a plurality of coefficients that comprise a constant coefficient, a slope coefficient, and a curvature coefficient;

receive a first indication of a first subset of coefficients associated with the plurality of piecewise segments;

calculate, based on the first subset of coefficients and the plurality of pivot points, a second subset of coefficients associated with the plurality of piecewise segments;

generate, an inverse reshaping model using the plurality of pivot points, the first subset of coefficients, and the second subset of coefficients;

receive a second indication that a first piecewise segment of the plurality of piecewise segments is flat;

modify a first constant coefficient of the first piecewise segment of the inverse reshaping model to a value signaled for a second constant coefficient of a second piecewise segment of the inverse reshaping model;

set a first slope coefficient and a first curvature coefficient associated with the first piecewise segment to zero; and apply inverse reshaping to a high dynamic range (HDR) video using the inverse reshaping model.

16. The video coding device of claim 15, wherein the plurality of pivot points are determined based on an indication received via a message.

17. The video coding device of claim 15, wherein the first subset of coefficients comprises a first slope coefficient associated with a first piecewise segment of the plurality of piecewise segments and a plurality of constant coefficients associated with the plurality of piecewise segments.

18. The video coding device of claim 17, wherein the second subset of coefficients comprises a plurality of slope coefficients associated with the remaining piecewise segments of the plurality of piecewise segments and a plurality of curvature coefficients.

19. The video coding device of claim 17, wherein being configured to determine the plurality of pivot points comprises being configured to determine a location for each of the plurality of pivot points.

20. The video coding device of claim 17, wherein the plurality of pivot points are evenly spaced on the inverse reshaping model.

* * * * *